US006242895B1

(12) United States Patent
Fujii et al.

(10) Patent No.: US 6,242,895 B1
(45) Date of Patent: Jun. 5, 2001

(54) CONTROLLER OF ADJUSTABLE DC VOLTAGE FOR A TRANSFORMERLESS REACTIVE SERIES COMPENSATOR

(75) Inventors: Toshiyuki Fujii, Tokyo (JP); Andreas Beer, Gruet (CH)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/671,156

(22) Filed: Sep. 28, 2000

(30) Foreign Application Priority Data

Mar. 31, 2000 (EP) .................................. 00107015

(51) Int. Cl.[7] ....................................... G05F 1/70
(52) U.S. Cl. .............................................. 323/207
(58) Field of Search ..................... 323/207, 265; 363/40; 307/102, 165

(56) References Cited

U.S. PATENT DOCUMENTS

| 5,198,746 | 3/1993 | Gyugyi et al. . |
| 5,513,090 | 4/1996 | Bhattacharya et al. . |
| 5,754,035 | 5/1998 | Sen . |
| 6,075,350 | * | 6/2000 | Peng ..................................... 323/207 |

OTHER PUBLICATIONS

Okayama et al.; "Large Capacity High Performance 3–Level GTO Inverter System for Steel Main Rolling Mill Drives", Industry Applications Conference, 31st IAS Annual Meeting IEEE, pp. 174–178, Sep. 1996.

* cited by examiner

Primary Examiner—Shawn Riley
(74) Attorney, Agent, or Firm—Leydig, Voit & Mayer, Ltd.

(57) ABSTRACT

A controller for controlling a reactive series compensator serially inserted at compensator terminals into a power transmission line for controlling the line current. The controller includes a current control loop and a voltage control loop. A current controller outputs a control voltage ($cc_{out}$) indicating a desired compensator terminal output voltage ($u_c$). A control method selector means generates, in a low output voltage region, a constant reference voltage ($u_{DC}^{ref}$) for the voltage control loop and a variable modulation index $mq$ of a modulation signal $m=m_d \cos(\omega t) - m_q \sin(\omega t)$. In a high output voltage range, the control method selector outputs a constant modulation index $m_q$ and a variable reference voltage ($u_{DC}^{ref}$). The voltage controller outputs the modulation index $m_d$ of the modulation signal m. Furthermore, the control method selector can include a rate limiter for limiting the change rate of the reference voltage ($u_{DC}^{ref}$). In connection with the control method selection and/or the rate limiter, a decoupling control for making the voltage and current control loops independent from each other can be used. The controllers find particular application in transformerless reactive series compensators for single-phase or three-phase control.

20 Claims, 36 Drawing Sheets

PRINCIPLE OF THE INVENTION (SINGLE PHASE)

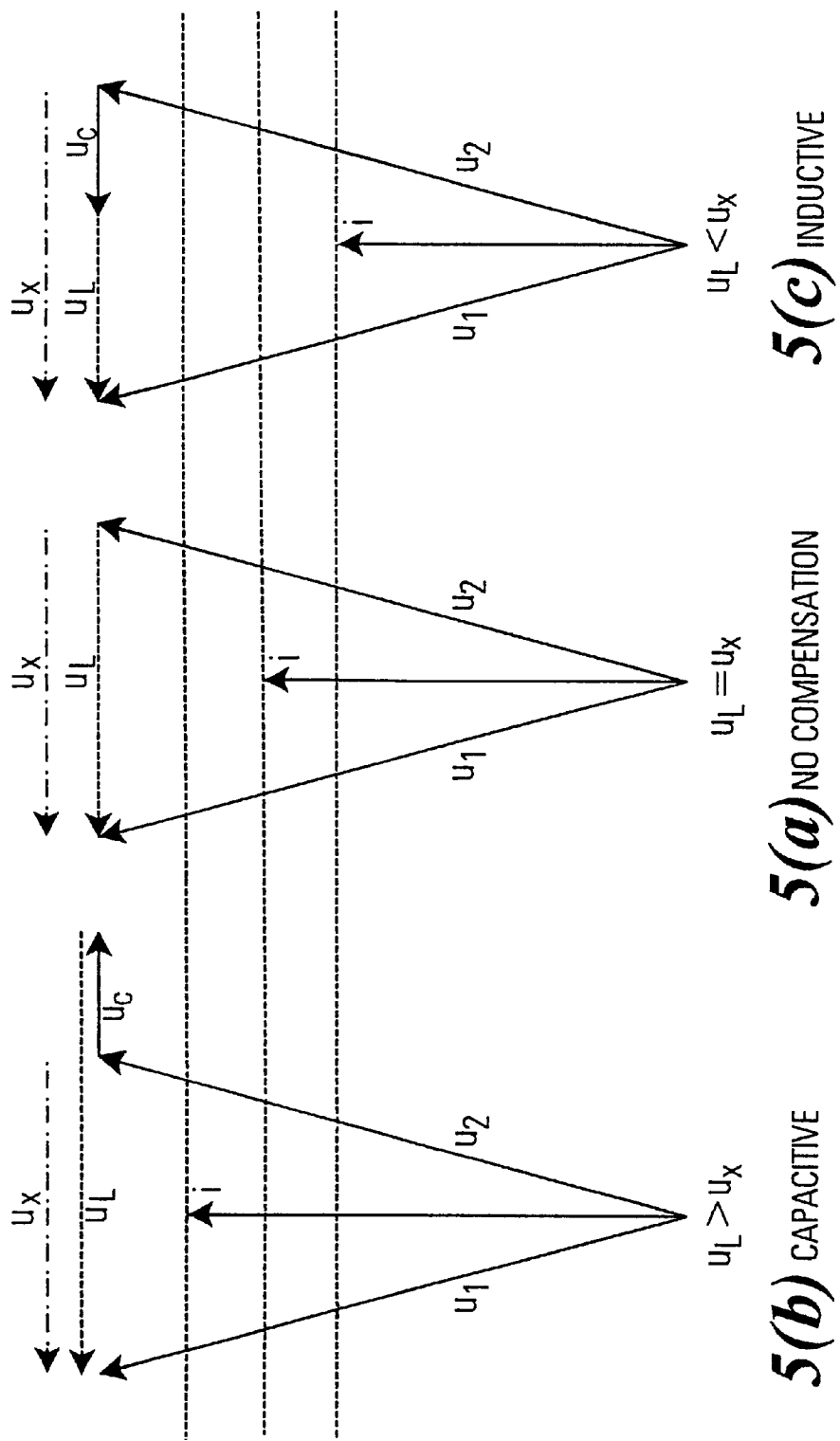

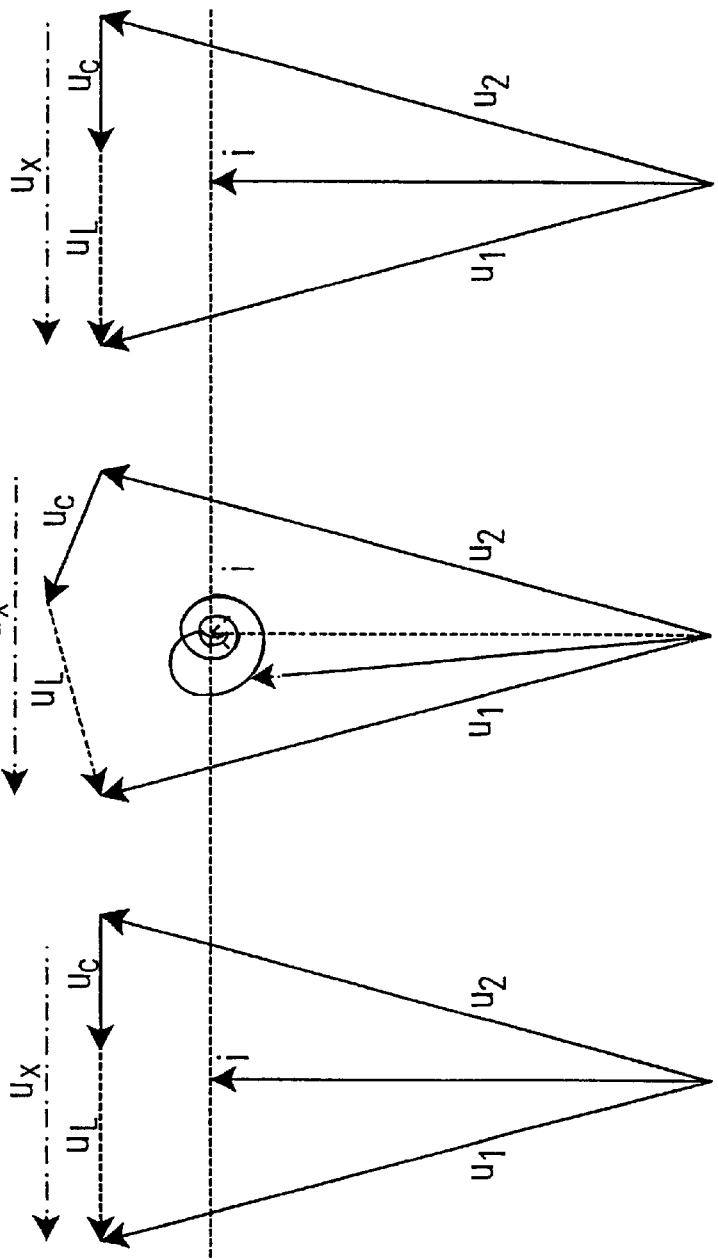

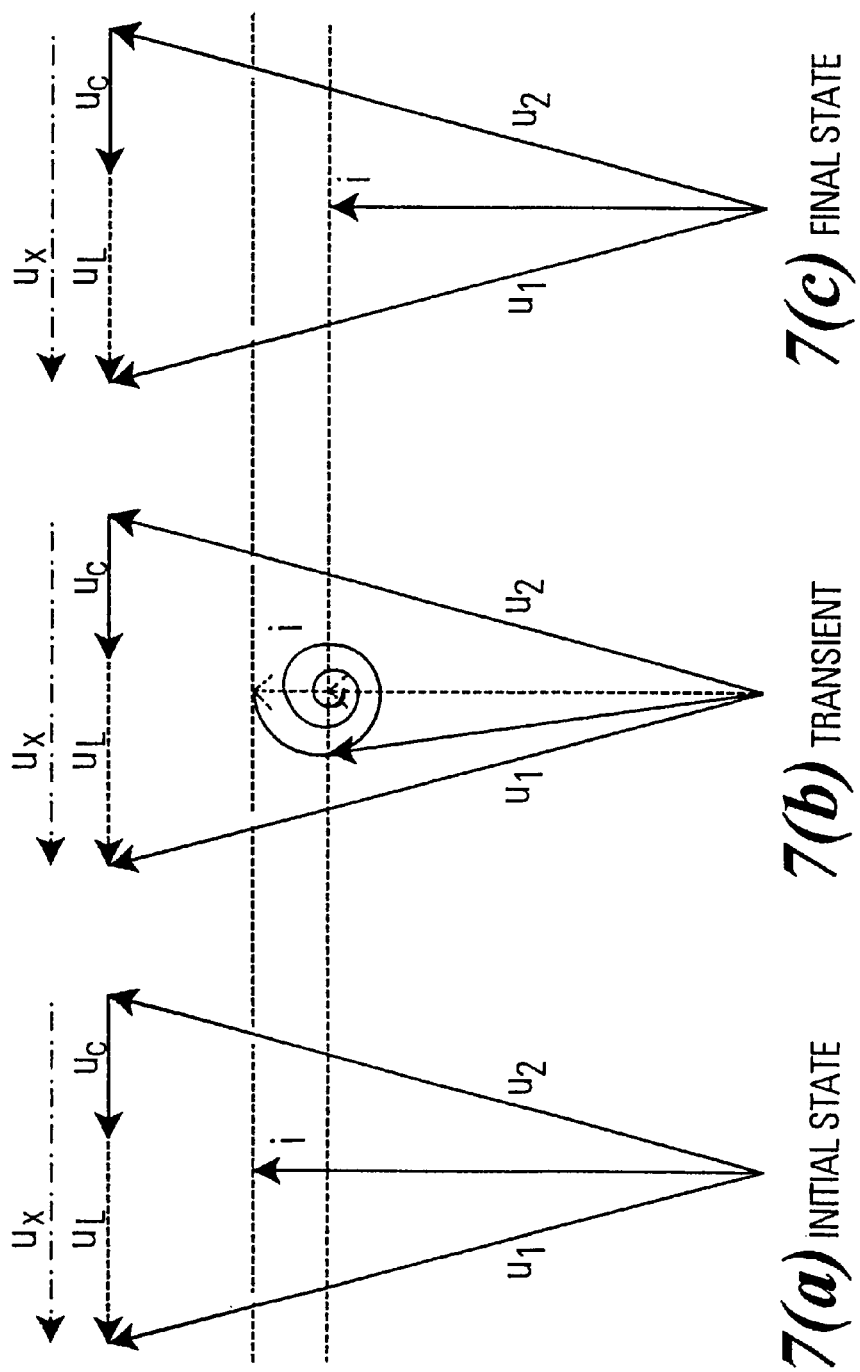

SINGLE PHASE SYSTEM

THREE PHASE SYSTEM

FIG.15
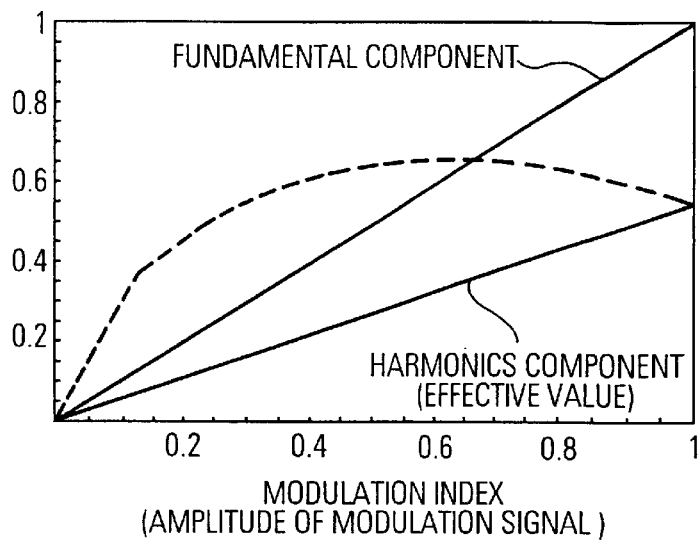
FIG.13
CONSTANT DC VOLTAGE CONTROL
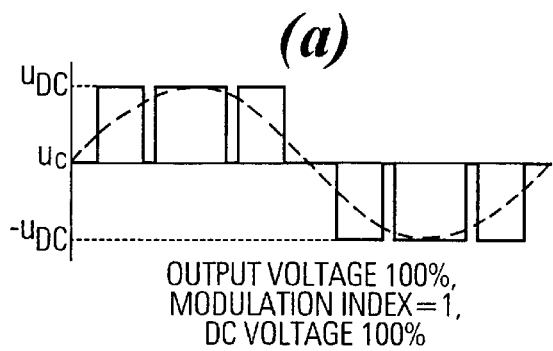
(a) OUTPUT VOLTAGE 100%, MODULATION INDEX=1, DC VOLTAGE 100%
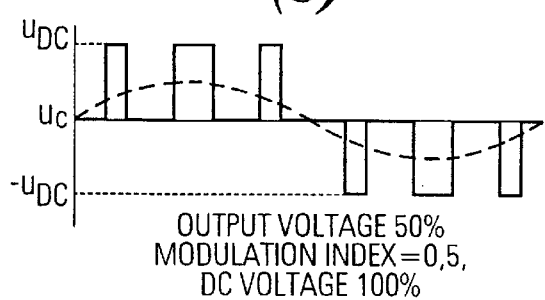
(b) OUTPUT VOLTAGE 50%, MODULATION INDEX=0.5, DC VOLTAGE 100%
FIG.14
ADJUSTABLE DC VOLTAGE CONTROL
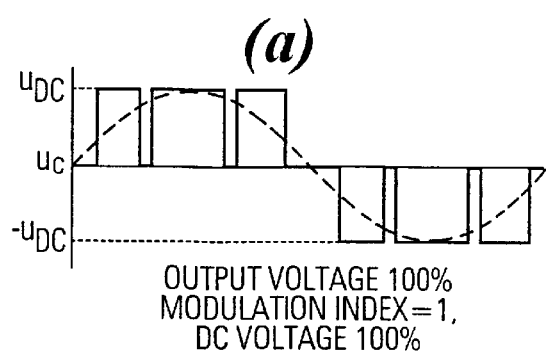
(a) OUTPUT VOLTAGE 100%, MODULATION INDEX=1, DC VOLTAGE 100%
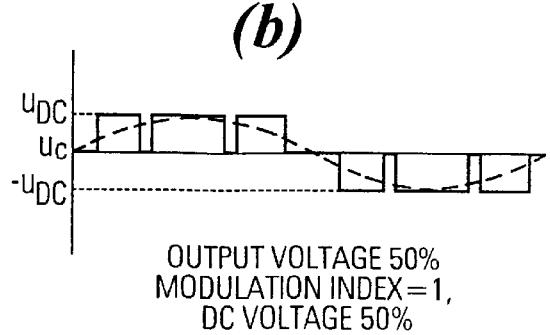
(b) OUTPUT VOLTAGE 50%, MODULATION INDEX=1, DC VOLTAGE 50%

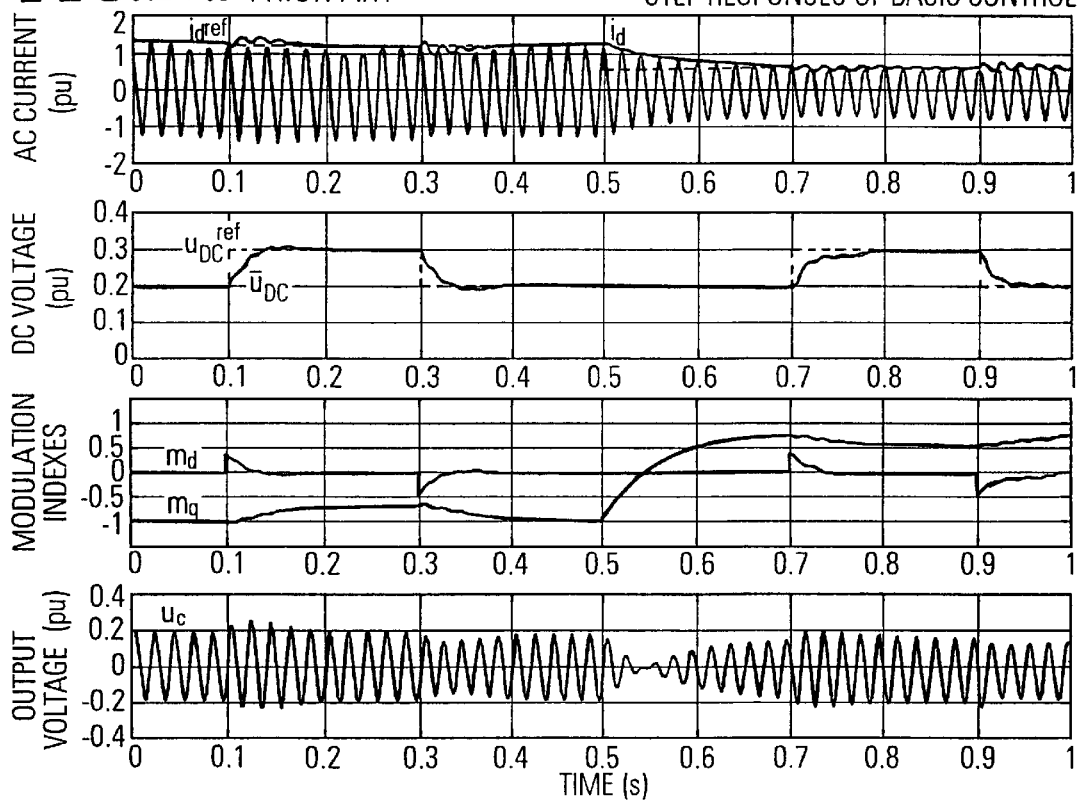
FIG. 17a PRIOR ART — STEP RESPONSES OF BASIC CONTROL
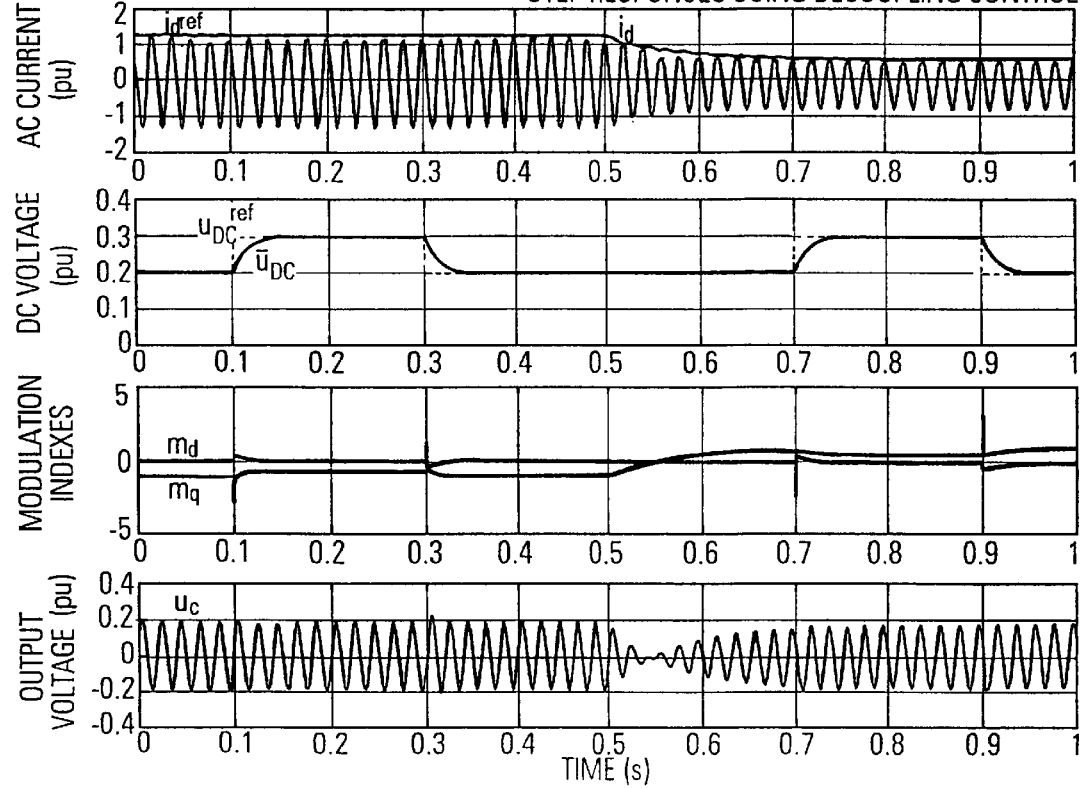
FIG. 31a — STEP RESPONSES USING DECOUPLING CONTROL

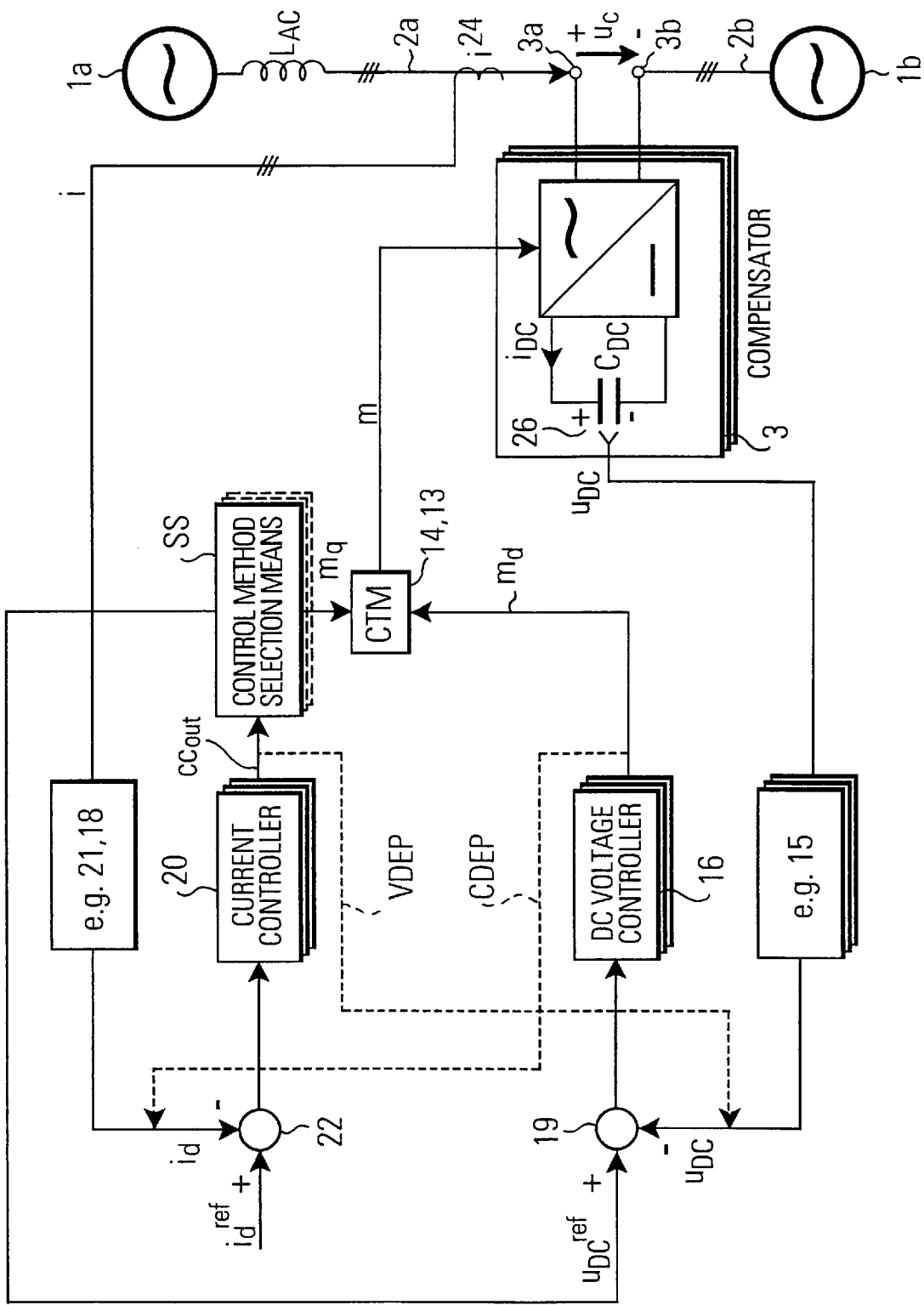
FIG. 18a PRINCIPLE OF THE INVENTION

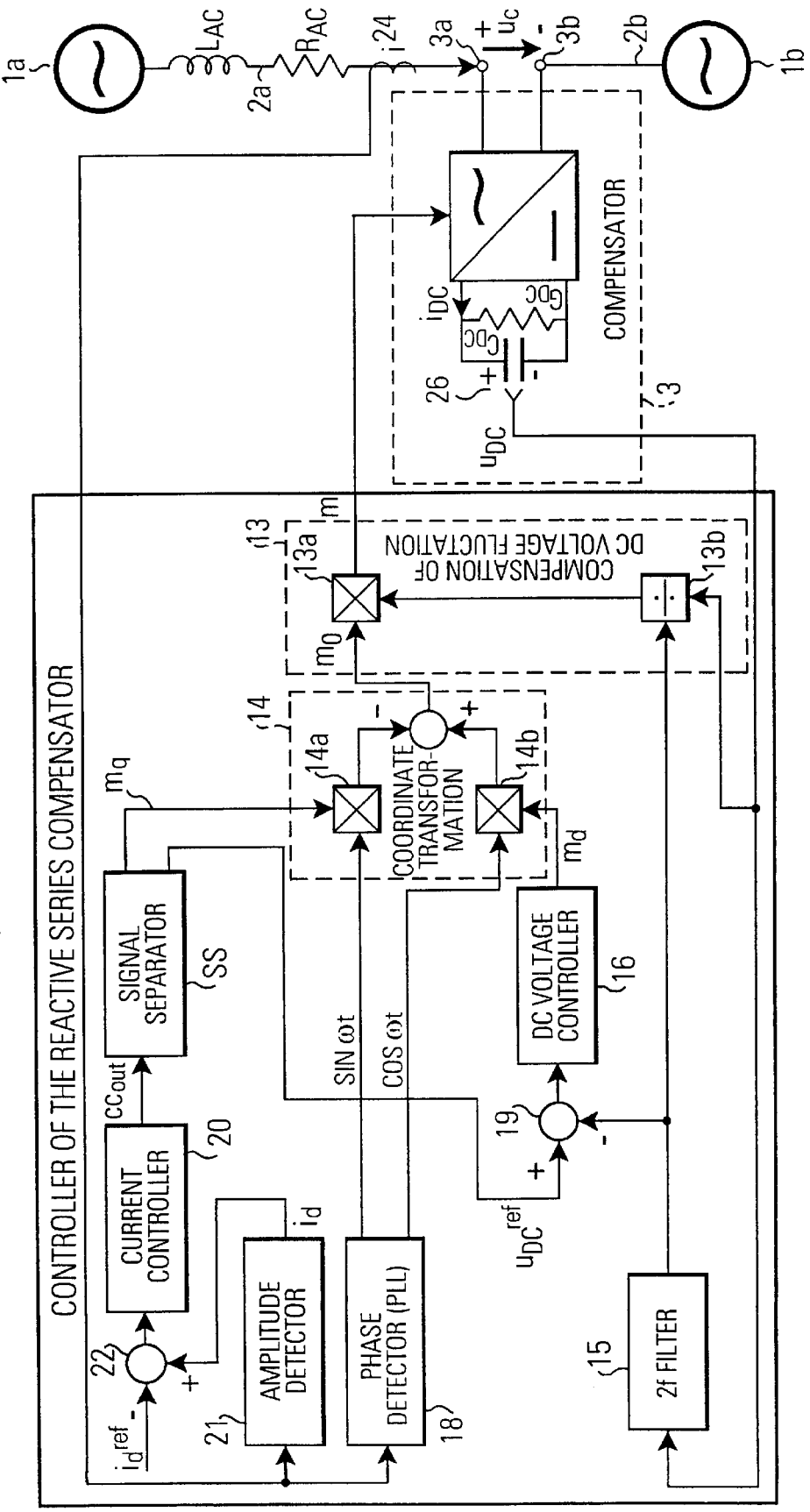
FIG.18b PRINCIPLE OF THE INVENTION (SINGLE PHASE)

FIG.22
STATIC CHARACTERISTICS
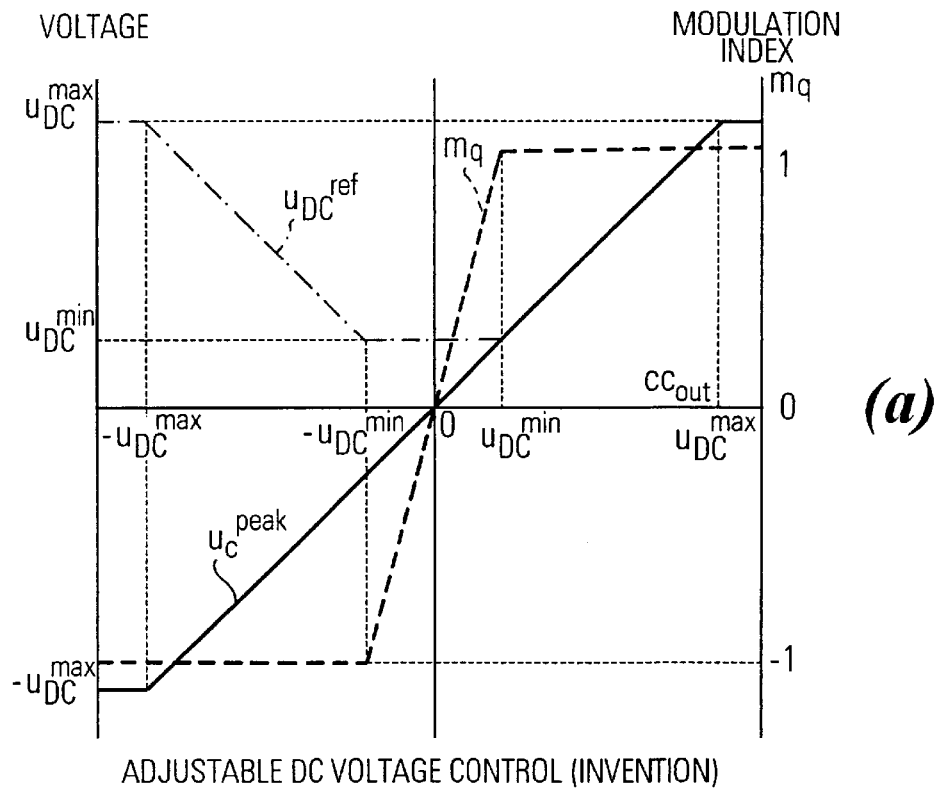
(a) ADJUSTABLE DC VOLTAGE CONTROL (INVENTION)
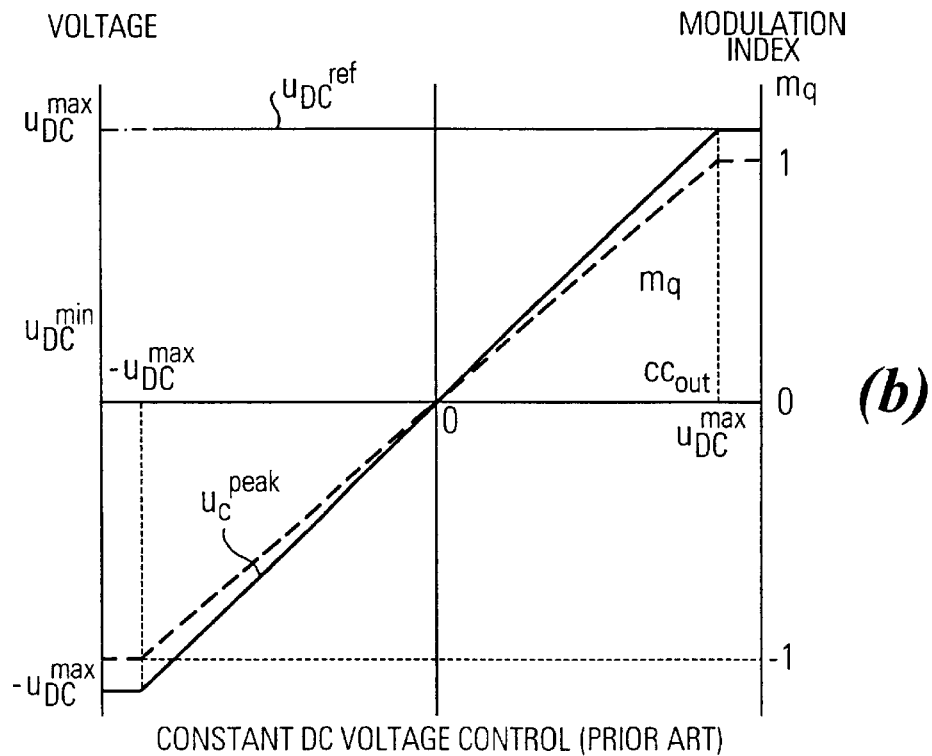
(b) CONSTANT DC VOLTAGE CONTROL (PRIOR ART)

FIG.24
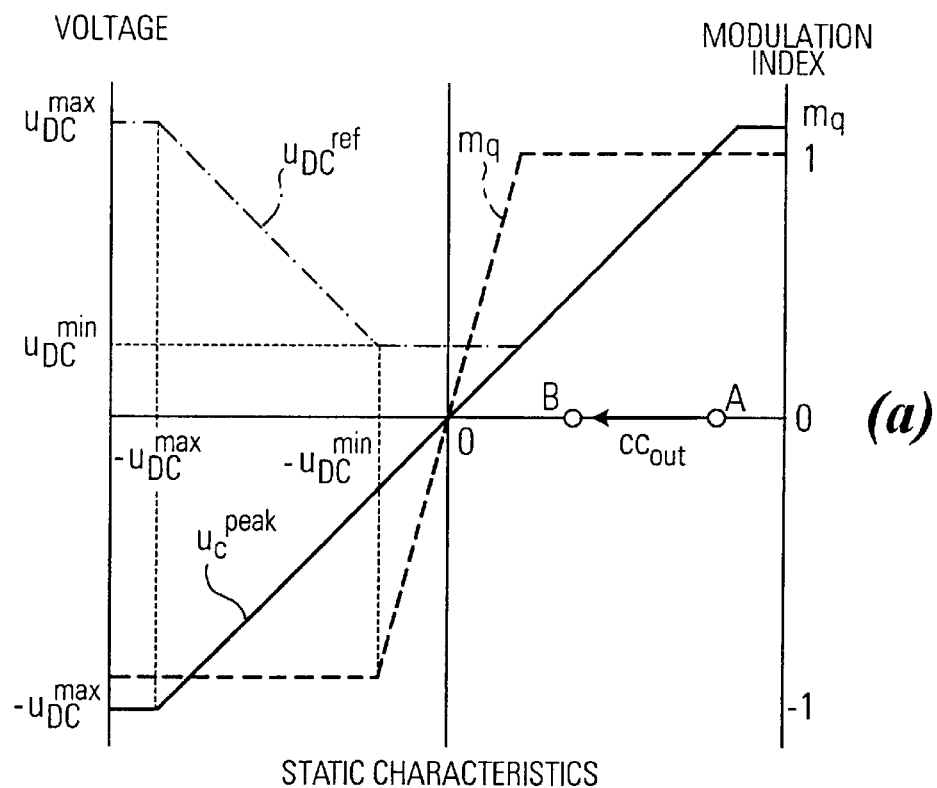
(a) STATIC CHARACTERISTICS
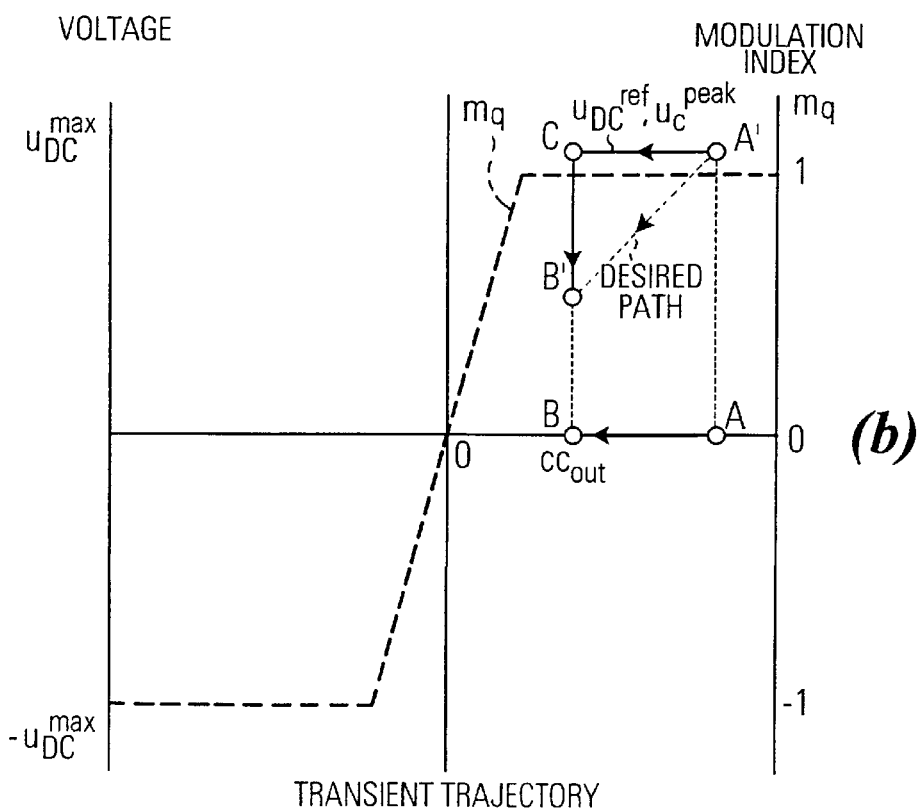
(b) TRANSIENT TRAJECTORY

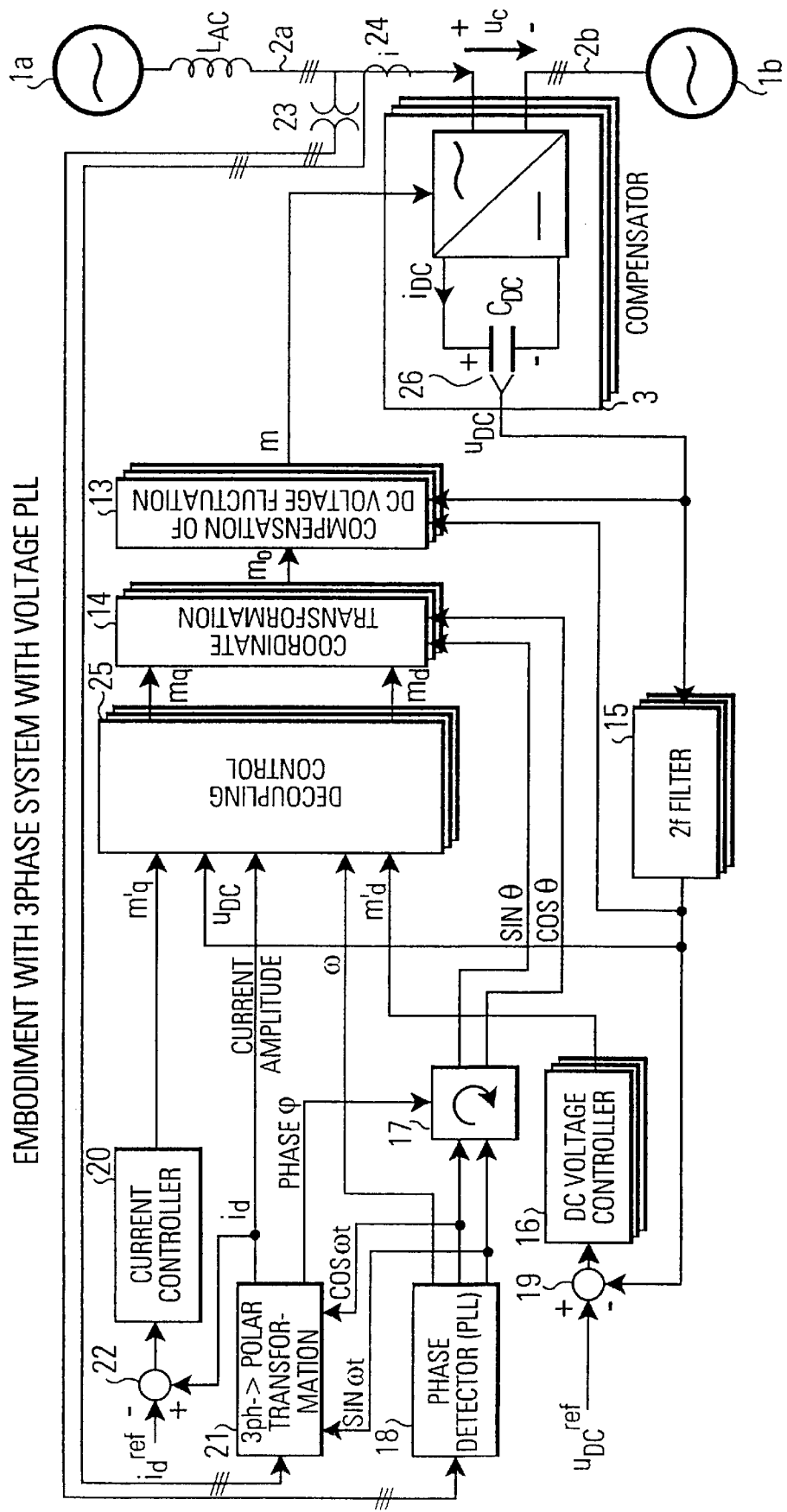
FIG.28 EMBODIMENT WITH 3PHASE SYSTEM WITH VOLTAGE PLL

DECOUPLING CONTROL

COMPONENT DETECTOR

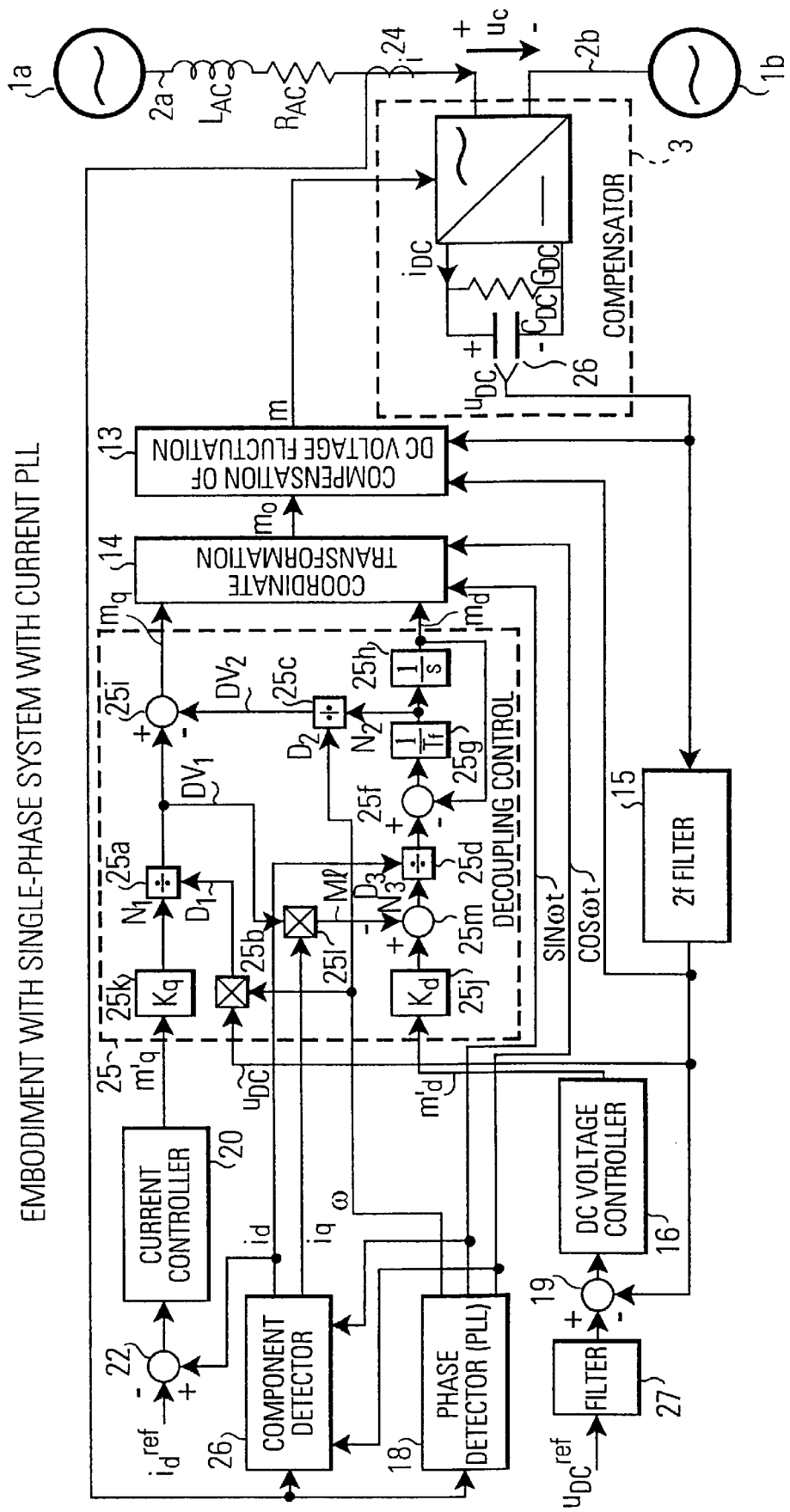
FIG.30a EMBODIMENT WITH SINGLE-PHASE SYSTEM WITH CURRENT PLL

FIG.31b
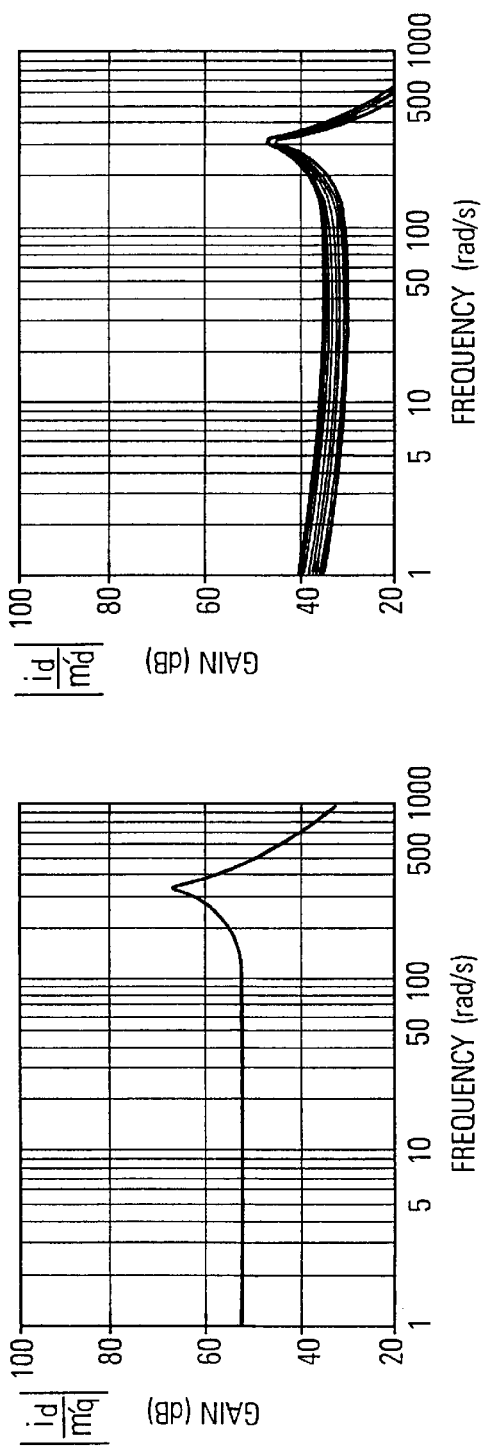
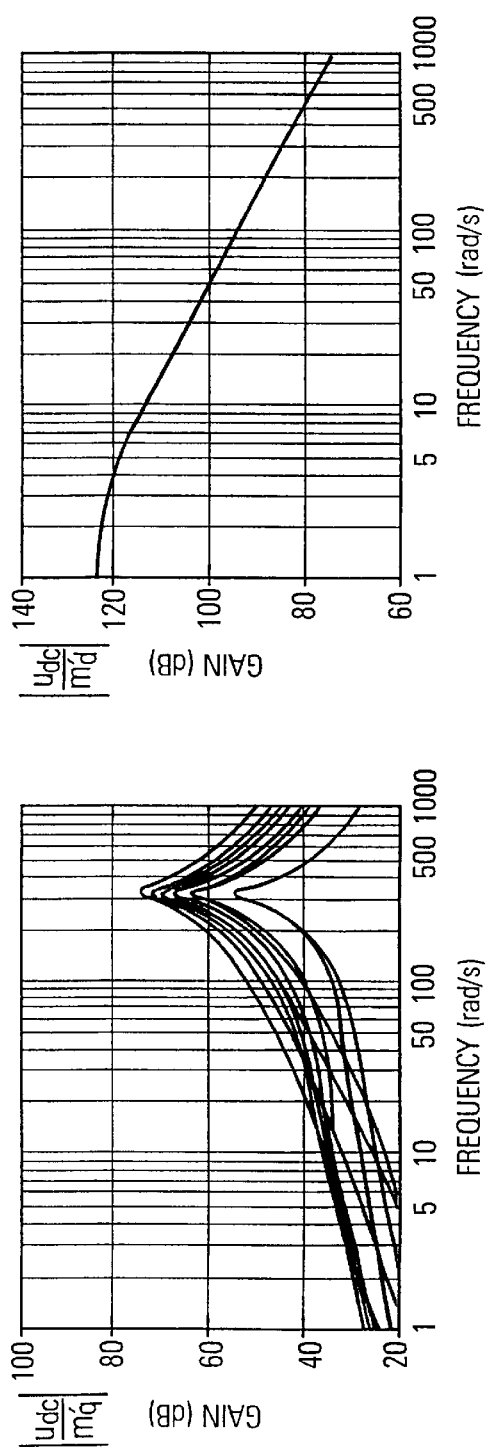

EMBODIMENT WITH SINGLE PHASE SYSTEM WITH VOLTAGE PLL

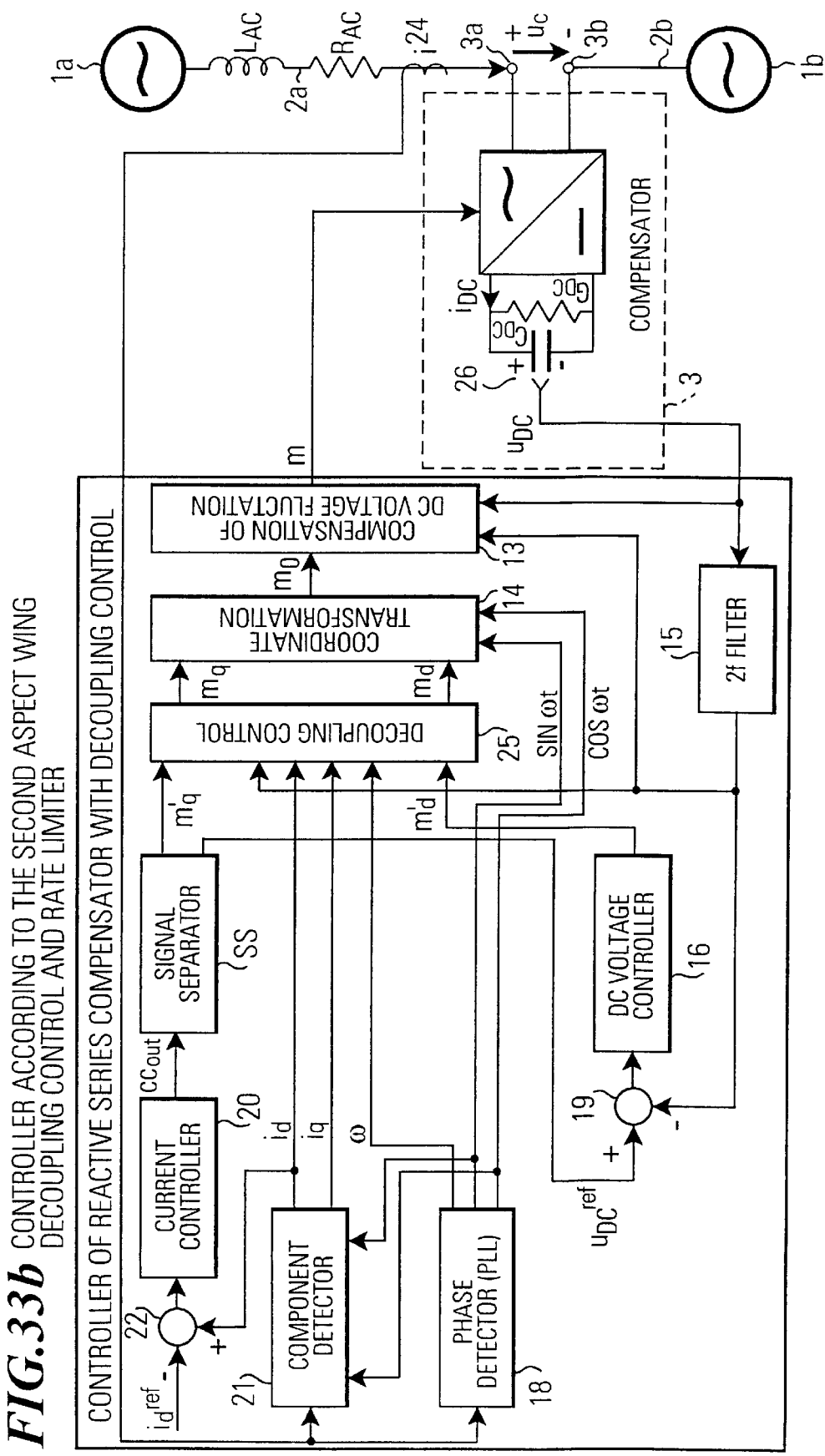
*FIG.33b* CONTROLLER ACCORDING TO THE SECOND ASPECT WING DECOUPLING CONTROL AND RATE LIMITER

TRANSIENT TRAJECTORY

US 6,242,895 B1

CONTROLLER OF ADJUSTABLE DC VOLTAGE FOR A TRANSFORMERLESS REACTIVE SERIES COMPENSATOR

BACKGROUND OF THE INVENTION

FIELD OF THE INVENTION

The invention relates to a controller for controlling a reactive series compensator serially inserted at compensator terminals into a power transmission line. Typically, in such a transformerless reactive series compensator an inverter control is performed in order to control the line current and/or the voltage applied from the compensator to the transmission line. The voltage/current control enables control of the flow of power from one end to the other end of the transmission line and a power flow into the inverter of the compensator in order to charge a capacitor which provides a compensator terminal output voltage at the compensator terminals.

Typically, as will be explained below with more details, a current feedback control loop and a voltage feedback control loop are employed in order to respectively control the reactive and the active part of the line current. For doing so, the modulation signal based on which the PWM control of the inverter is performed, is a sinusoidal signal of a particular phase. Adjusting the amplitude and the phase of the modulation signal allows the power control.

Using such control loops, the output voltage of the compensator can be controlled by a modulation index with a constant DC voltage. Alternatively, the output voltage can be controlled by the DC voltage only using a constant modulation index, as the paper by A. Beer, H. Stemmler, H. Okayama, "A Hybrid Transformerless Reactive Series Compensators", EPE 1999—Lausanne describes (see page 8 of this paper). However, using constant DC voltage, the injection of harmonics into the transmission line by the inverter cannot be reduced even if the fundamental component is smaller than the DC voltage. Furthermore, using constant modulation index control, the controllability of the DC voltage is degraded in zero or very low DC voltage region since the active voltage cannot be sufficiently injected into the transmission line. Therefore, this method is not applicable to a full range operation. Furthermore, with the aforementioned two different control methods it is also difficult to reduce DC voltage dependent losses such as the switching loss of switching elements of the inverter and leakage loss of the DC capacitor of the compensator.

The present invention in particular addresses the problem as to how the injection of harmonics by a compensator controlled by a controller including a current and voltage control loop can be reduced. The present invention also addresses the other aforementioned problems.

Hereinafter, first the general background of transformerless reactive series compensators and of controllers for controlling a compensator and comprising a current and voltage control loop will be described.

DESCRIPTION OF THE RELATED ART

Recently, power electronics equipments for flexible AC power transmission systems (FACTS) have been investigated and applied to practical systems. A transformerless reactive series compensator is one of these equipments and is effective to perform a power flow control as was explained above. Since the transformerless reactive series compensator does not comprise the transformer its size is small and it can be advantageously used.

FIGS. 1a and 1b respectively show a typical configuration of a power transmission system comprising two AC power systems 1a, 1b coupled to each other through power transmission lines 2a, 2b having a respective inductance $L_{AC}$ and resistance $R_{AC}$. As indicated in FIG. 1a and FIG. 1b, the power transmission system may be a single phase system or a three-phase system. Whilst in the single phase system only one series compensator 3 need to be provided, in the three-phase system a plurality of series compensators 3 are respectively serially inserted as shown in FIG. 1b. Reference numerals 3a, 3b respectively show the terminals at which the respective series compensator (or compensators) are serially inserted.

As shown in FIG. 2, a typical series compensator 3 comprises a starting switch 4, a filter 12, an inverter 7, a DC capacitor $C_{DC}$, a control means C, a saw-tooth generator 10 and a modulation signal generation means 11. The inverter 7 comprises four thyristors 5a, 5b, 5c, 5d respectively controlled by a PWM control signal $SW_{5a}$, $SW_{5b}$, $SW_{5c}$, $SW_{5d}$ output by the control means C.

Whilst the expression "thyristor" is usually a device whose turn-off is not controllable, in FIG. 2, since a PWM is used for the inverter, a gate turn-off type thyristor is employed. Since a GTO (gate turn-off thyristor), a GCT (gate commutated thyristor) and an IGBT (insulated gate bipolar transistor) are also generally be possible for operating as the kind of switching power device in FIG. 2, hereinafter it is assumed that the expression "thyristor" comprises all such switching power devices.

Each thyristor has connected anti-parallely thereto a diode 6a, 6b, 6c, 6d. The filter 12 comprises two reactors 9b, 9a and a capacitor 8 for filtering higher order harmonics which are generated by the PWM control of the inverter 7. The filter terminals are connected to the respective interconnections of the thyristors 5a, 5b and of the diodes 6a, 6b and the thyristors 5c, 5d and the diodes 6c, 6d. The DC capacitor $C_{DC}$ is connected at the other terminals of the thyristors and the diodes.

The circuit configuration of the series compensator 3 is conventional and is for example described in the European patent applications No. 98 116 096.3, No. 98 106 780.4 and No. 99 124 851.9 by the same applicant. These patent applications in particular describe the start and stop control of the series compensator 3 and a decoupling control.

A PWM control of the inverter 7 is carried out as principally shown in the diagram of FIG. 3. A modulation signal generation means 11 in FIG. 2 generates a sinusoidal modulation signal m and the saw-tooth generator 10 outputs two saw-tooth carrier signals cs1, cs2. A PWM control signal $SW_{5a}$, $SW_{5d}$ is generated by comparing the modulation signal m with the respective carrier signal cs1, cs2. That is, when the modulation signal amplitude is larger than the carrier signal cs1 amplitude then the PWM switching signal $SW_{5a}$ is on and it is off if the modulation signal amplitude is smaller. Similarly, if the amplitude of the modulation signal is larger than the inverted carrier signal cs2 then the other PWM switching signal $SW_{5d}$ is switched from ON to OFF. The PWM signals $SW_{5a}$, $SW_{5d}$ are used to trigger the thyristor 5a, 5d. It should be noted that of course a similar control applies to the thyristors 5b, 5c which is however not described here for simplicity.

Assuming that the DC capacitor $C_{DC}$ was charged to $u_{DC}$ the output voltage $u_c$ at the connection terminals 3a, 3d will have a waveform as shown in FIG. 3 in the bottom graph. It will be appreciated that by changing the respective amplitudes of the modulation signal and/or the carrier signal and/or by changing the phase of the modulation signal and/or the carrier signal, different waveforms of the output voltage $u_c$ (hereinafter also called the inverter terminal voltage or compensator output voltage) can be achieved. Comparing FIG. 3 with FIG. 2 it can be seen that essentially the output voltage $u_c$ is the voltage applied to the terminal 3a, 3b.

Whilst from FIG. 3 it only appears as if the terminal voltage uc changes due to the PWM control of the inverter 7, of course the line current i would also change since current and voltage are linked through the coupling effects due to the line impedance $L_{AC}$. The simultaneous effects of the PWM control on the line voltage and the line current will be explained now.

FIG. 4a shows a summary diagram of the essential parts of FIG. 2 necessary for explaining the current and voltage control. FIG. 4b shows the principle phasor diagram for FIG. 4a. As was the case in FIG. 1a, also in FIG. 4a the compensator 3 is serially connected between the power transmission lines 2a, 2b which are connected to the AC power systems 1a, 1b. For the purpose of explaining the current and the voltage control with respect to their phase relationships it is not necessary to consider explicitly the line impedance $R_{AC}$, although it should be understood that of course the line impedance $R_{AC}$ is also present in FIG. 4a. The inverter control is schematically illustrated with the block to which the reference numeral 7 has been attached. A modulation signal m is applied in order to perform the PWM control. $u_L$ is the voltage occurring as a result of the line impedance $L_{AC}$, i is the line current, $i_{DC}$ is the current flowing through the DC capacitor $C_{DC}$, $u_{DC}$ is the voltage over the DC capacitor $C_{DC}$ and $u_c$ is the output voltage of the series compensator 3. Furthermore, $u_x$ is the overhead voltage which is a difference voltage between the AC sources. For simplicity reasons the leakage conductance in the DC side which could include the switching losses, leakage losses of capacitors and/or losses of DC filters (essentially a parallel resistance to the DC capacitor $C_{DC}$ is not necessary to be considered for the phase relationships.

FIG. 4b shows a principle phasor diagram and the voltages explained with reference to FIG. 4a are shown therein. The compensator 3 can output an output voltage $u_c$ of arbitrary phase with limited amplitude using the DC capacitor voltage $u_{DC}$.

FIGS. 5(a), 5(b) and FIG. 5(c) respectively show the cases for no compensation, capacitive operation and inductive operation when controlling the line current i. That is, when the compensator 3 injects a zero voltage $u_c$ into the line, then the inductance voltage $u_L$ is the same as the overhead voltage $u_x$ (FIG. 5 (a)). In this case, the line current i flows through the transmission line with a 90° phase lag with respect the inductance voltage $u_L$.

When the compensator 3 injects a capacitive voltage $u_c$ which leads 90° to the line current i, then the inductance voltage $u_L$ increases and therefore also the line current i is increased (FIG. 5(b)).

On the other hand, when the compensator 3 injects an inductive voltage to the line ($u_c$ is in-phase with the inductance voltage $u_L$), the inductance voltage $u_L$ is decreased and therefore also the line current i is decreased (FIG. 5(c)). Thus, the first purpose of the compensator 3 is that the line current i can be controlled (increased/decreased) by the voltage (by the amplitude and the phase of the compensator output voltage $u_c$) output by the compensator 3. Furthermore, of course a skilled person realizes what has been described above for a single phase can be performed in the same manner for a three-phase system.

Of course, the control in FIGS. 5(a)–(c) can only be carried out if the DC capacitor $C_{DC}$ has been charged to the predetermined voltage $U_{DC}$ since otherwise no injection of voltage would be possible into the line. Instead of using a battery or another power source, it is advantageous to also control the compensator 3 such that a power flow from the line to the DC capacitor $C_{DC}$ is effected. Such a charging or active power flow from the line to the capacitor is explained with reference to FIG. 6 and FIG. 7. As mentioned before, a charging of the DC capacitor $C_{DC}$ requires an active power flow from the transmission lines 2a, 2b to the DC capacitor $C_{DC}$ through the inverter 7. In order to take the active power from the power system 1a, 1b, the compensator 3 has to feed the active component of the applied AC voltage $u_c$ to the DC capacitor $C_{DC}$.

In steady state conditions, as already explained with reference to FIG. 5(c) and as shown also in FIG. 6(a), the compensator 3 outputs a reactive voltage $u_c$ which has a 90° difference phase to the line current i. This situation is present in the initial state and the final state of charge control as shown with FIGS. 6(a) and 6(c).

When the compensator 3 outputs the active component in a short duration for taking in active power, the inductance voltage is also changed transiently as shown in FIG. 6(b). The transient inductance voltage includes a di/dt component and a ωLi component. When the di/dt component is generated, the ωLi component is influenced. Then, the variation of the ωLi component influences the di/dt component and the line current fluctuates in an oscillation manner as shown in FIG. 6(b). Consequently, the charging process does not only influence the capacitor voltage but also the line current. The reason is the coupling effect through the line inductance $L_{AC}$ as can be understood from considering the dynamic behaviour of the currents and voltages.

Namely, a voltage equation of the inductance $L_{AC}$ can be written as follows.

$$L_{AC} (di/dt) = u_{AC} \tag{1.1}$$

where $L_{AC}$, i and $u_{AC}$ are the line inductance, a line current and the inductance voltage. If a rotational reference frame is introduced whose frequency is ω in a steady-state condition as $$i = I_d \cos(\omega t) - I_q \sin(\omega t) \tag{1.2}$$

$$u_{AC} = U_d \cos(\omega t) - U_q \sin(\omega t) \tag{1.3}$$

the voltage equation (1.1) can be decomposed in component equations as follows:

$$L (dI_d/dt) = \omega L\, I_q + U_d \tag{1.4}$$

$$L (dI_q/dt) = -\omega L\, I_d + U_q \tag{1.5}$$

It can now be understood, as shown in FIG. 6(b) that if $U_d$ (the active part of the applied voltage) is changed, then also $I_d$ (the active part of the current) varies and $I_q$ (the reactive part of the current) is also influenced. The coupling of a line current control to a DC voltage is illustrated in FIG. 7. A rapid change of the reactive component of the compensator voltage by the line current controls generates a di/dt component of an inductor voltage. Therefore, the line current phasor i moves towards the direction of the change first. Then, the ωLi component and di/dt component influence each other with the same mechanism but opposite coupling. As a result, the line current has a fluctuation and an active component which is a in-phase component to the compensator voltage. This active component now causes an active power flow from the power transmission line to the DC capacitor $C_{DC}$ in the transient state as shown in FIG. 7(b). However, if the line current is controlled, obviously also the DC voltage is influenced by the line current control.

As can be understood from the above description of FIGS. 4, 5, 6, 7, the main purpose of a controller for the series compensator is to perform a control to increase/decrease the line current as shown in FIG. 5 and to charge the DC capacitor $C_{DC}$ by allowing an active power flow to the DC capacitor $C_{DC}$ as in FIGS. 6, 7. Such controllers will be explained hereinafter.

PRIOR ART OF CURRENT AND VOLTAGE CONTROL

FIG. 8 and FIG. 9 show controllers for a single phase and three-phase system, respectively. Such controllers comprising essentially a current loop and a voltage loop are known from "Hybrid transformerless reactive series compensators" Proceedings of the 8th European Conference on Power Electronics and Applications Conference (EPE)—Lausanne 1999, pages 1–10. The principle control scheme of a single phase system will be explained below with reference to FIG. 8.

The series compensator 3 has the configuration as already explained above with respect to FIG. 2 or 4. It is connected serially into the power transmission lines 2a, 2b at the compensator terminals 3a, 3b. The compensator 3 is controlled by a modulation signal m. A current sensor 24 senses the line current i and a voltage sensor 26 senses the DC capacitor voltage $U_{DC}$.

The following relationship between the currents and voltages exist (where also the line resistance $R_{AC}$ is included) as illustrated with the following equations.

$$L_{AC}\frac{di}{dt} = -R_{AC}i + u_x - u_c \quad (2.1)$$

$$C_{DC}\frac{du_{DC}}{dt} = -G_{DC}u_{DC} + i_{DC} \quad (2.2)$$

Again introducing the reference frame (o in the steady state case as in equation (1.2) and (1.3) leads to:

$$i = i_d \cos \omega t - i_q \sin \omega t \quad (2.3)$$

$$u_c = u_{cd} \cos \omega t - u_{cq} \sin \omega t \quad (2.4)$$

$$u_x = u_{xd} \cos \omega t - u_{xq} \sin \omega t \quad (2.5)$$

Of course, a skilled person realizes that these equations are the same as phasor expressions in the complex plane in the form of e.g. $i=\text{Re}[(i_d+ji_q) e^{j\omega t}]$. Inserting equations (2.3)–(2.5) into equation (2.1), the following equation can be obtained:

$$\left[L_{AC}\frac{di_d}{dt} - \omega L_{AC}i_q\right]\cos\omega t - \left[L_{AC}\frac{di_q}{dt} - \omega L_{AC}i_d\right]\sin\omega t = \quad (2.6)$$
$$[R_{AC}i_d + u_{xd} - u_{cd}]\cos\omega t - [R_{AC}i_d + u_{xq} - u_{cq}]\sin\omega t$$

In order to obtain the dynamic equation of the AC current in the rotational reference frame ω the coefficients of the cosine and sine functions are derived:

$$L_{AC}\frac{di_d}{dt} = -R_{AC}i_d + \omega L_{AC}i_q + u_{xd} - u_{cd} \quad (2.7)$$

$$L_{AC}\frac{di_q}{dt} = -R_{AC}i_q - \omega L_{AC}i_d + u_{xq} - u_{cq} \quad (2.8)$$

Equations (2.7) and (2.8) respectively describe the current dynamics. The DC voltage dynamics in equation (2.2) can be related to the AC current dynamics using a balance of power on the AC and DC side. Of course, the output voltage $u_c$ at the output terminals 3a, 3b of the compensator 3 is directly related to the modulation m applied to the inverter 7. Therefore, in principle the output voltage $u_c$ of the compensator 3 has the following relationship with the modulation signal m:

$$u_c = m u_{DC} \quad (2.9)$$

Again introducing the reference frame ω and applying the reference frame also to the modulation signal as $m = m_d \cos(\omega t) - m_q \sin(\omega t)$ the following relationship for the amplitudes must exist:

$$u_{cd} = m_d u_{DC} \quad (2.10)$$

$$u_{cq} = m_q u_{DC} \quad (2.11)$$

Inserting equations (2.10) and (2.11) into equations (2.7) and (2.8) leads to:

$$L_{AC}\frac{di_d}{dt} = -R_{AC}i_d + \omega L_{AC}i_q + u_{xd} - m_d u_{DC} \quad (2.12)$$

$$L_{AC}\frac{di_q}{dt} = -R_{AC}i_q - \omega L_{AC}i_d + u_{xq} - m_q u_{DC} \quad (2.13)$$

Since the instantaneous AC active power of the compensator $p_{AC} = u_c * i$ and the DC power $p_{DC} = u_{DC} * i_{DC}$ must be balanced under the condition of no losses in the converter, the DC current can be written as:

$$i_{DC} = \frac{u_c i}{u_{DC}} = mi = \frac{1}{2}(m_d i_d + m_q i_q) + \Delta\tilde{i}_{DC} \quad (2.14)$$

where $\Delta i_{DC}$ represents the current fluctuation caused by varying the AC power in a single phase. $\Delta I_{DC}$ can be represented as follows:

$$\Delta\tilde{i}_{DC} = \left\{\frac{1}{2}(m_d i_d - m_q i_q)\cos2\omega t - \frac{1}{2}(m_q i_d + m_d i_q)\sin2\omega t\right\} \quad (2.15)$$

The DC voltage dynamics can thus be obtained by substituting equation (2.14) into equation (2.2) leading to equation (2.16) as follows:

$$C_{DC}\frac{du_{DC}}{dt} = -G_{DC}u_{DC} + \frac{1}{2}(m_d i_d + m_q i_q) + \Delta\tilde{i}_{DC} \quad (2.16)$$

The above equations in particular equations (2.12) and (2.13) show that the AC current ($i_d$ and $i_q$) and the DC voltage ($u_{DC}$) can indeed be controlled via the modulation signal ($m_d$ and $m_q$), that is via the modulation indexes $m_d$ and $m_q$. Also equation (2.16) shows that this is possible.

A basic controller consisting of two feedback control loops in a system where one is the AC current amplitude control and another one is the DC voltage control based on the modulation indices as derived with the preceding equations is shown in FIG. 8. Since the reactive series compensator can control only reactive power in steady state and the q-axis component in the AC current is kept zero by a phase locked loop 18, $m_q$ is related to inductive and capacitive voltage and is used for controlling the AC line current amplitude. The DC voltage is controlled by $m_d$ because it is related to active power and is the only available signal at $i_q=0$ in equation (2.16).

FIG. 8 shows a block diagram of a basic control of the series compensator. This controller consists of the current controller 20 with the amplitude detector 21, the DC voltage controller 16 with the filter 15, the current phase detector (PLL) 18, the coordinate transformation unit 14 and the compensation of a DC voltage fluctuation by the DC voltage fluctuation compensation means 13.

In principle, the controller shown in FIG. 8 performs a control as specified with the above mentioned equations (2.12), (2.13), (2.16). The amplitude detector 21 detects the current amplitude of the line current i as sensed by the current detector 24. Reference numeral 22 designates a subtractor which subtracts the command value $i_d^{ref}$ from the amplitude detector output value $i_d$. Reference numeral 20 designates the current controller, e.g. a PI or PID controller which outputs the real part $m_q$ of the modulation signal.

Reference numeral 15 designates a filter for filtering the second harmonics of the fundamental frequency. Reference numeral 19 designates a subtractor for subtracting the output of the filter 15 from the voltage command $u_{DC}^{ref}$. Reference numeral 16 denotes a DC voltage controller, i.e. a PI or PID controller which outputs the imaginary part $m_d$ of the modulation signal m.

As explained above, reference numeral 18 designates a phase detector (e.g. a phase locked loop PLL) which outputs reference signals sin($\omega$t), cos($\omega$t) locked to the phase of the line current i as detected by the current detector 24. As explained above, basically the reactive series compensator 3 outputs a reactive voltage $u_c$ and for this reason somehow the control system needs an input about the phase of the AC line current i. In FIG. 8, in the single phase system, a direct measurement of phase using AC current i is employed. The phase detector 18 is contains a phase locked loop PLL which produces the cosine and sine function of the phase.

Reference numeral 14 designates a coordinate transformation means including a first and second multiplier 14a, 14b for respectively multiplying the real and imaginary parts $m_q$, $m_d$ of the modulation signal m with the reference signals cos($\omega$t), sin($\omega$t). Reference numeral 14c designates a subtractor which subtracts the output of the first multiplier 14a from the output of the second multiplier 14b. The output is a modulation signal $m_0$ which is a complex signal.

Reference numeral 13 designates as mentioned before, a DC voltage fluctuation means which includes a. multiplier 13a and a divider 13b. The multiplier 13a multplies the output signal from the subtractor 14c with the output from the divider 13b and outputs the modulation signal m. The divider 13b divides the output from the filter 15 by the input of the filter 15. The filter 15 and the unit 13 are optional although their use can advantageously reduce the effect of harmonics.

The above described units form two control loops for the current and the voltage based on the sensed current i and the sensed DC capacitor voltage $u_{DC}$.

The current control loop outputs the q-axis modulation index $m_q$ to control the amplitude of the AC current using a feedback control. The current controller 20 modifies $m_q$ in a positive direction when the measured current amplitude $i_d$ is larger than the reference value to move to a smaller current operating point. When the measured current amplitude $i_d$ is smaller than the reference value, the operation is performed in an opposite direction. Therefore, the subtractor 22 just before the current controller 20 has a negative sign for the reference signal $i_d^{ref}$. The amplitude detector 21 is preferably a peak detector, a rectifier and so on for a single phase compensator.

The voltage controller 16 on the other hand outputs the active component $m_d$ of the modulation signal m for controlling the DC voltage of the compensator 3. When the DC voltage goes down, the voltage controller 16 will increase $m_d$ such that the active power component of the AC voltage of the compensator 3 increases and a power influx from the AC system into the DC capacitor is effected. When the DC voltage $u_{DC}$ increases, $m_d$ will be modified by the DC voltage controller 16 in a negative direction. There is a fluctuation which has two times the fundamental frequency in the DC voltage caused by varying of a single phase AC power in one cycle. To reduce the fluctuation in the controller, the detection filter 15 can preferably be provided, because this frequency is normally much higher than the dominant frequencies of the voltage control loop.

The phase detector 18 detects or follows the phase of the AC current i in order to provide one reference sinusoidal signal sin ($\omega$t) in phase and another one cos($\omega$t) orthogonal to the AC current. In FIG. 8 cos($\omega$t) is the reference signal in phase and sin($\omega$t) is the 90° difference signal.

When $m_q$ and $m_d$ are output from the current and voltage control loop, the combiner 14, i.e. the coordinate transformation means, transforms $m_d$ and $m_q$ to a single phase AC modulation signal. In this case $m_q$ is the 90° advanced component to the AC current, such that the subtraction in the transformation has a minus sign for $m_q$sin($\omega$t).

As explained above, a DC voltage fluctuation compensation means 13 is provided downstream of the coordinate transformation means 14. For the single phase AC/DC converters, the DC power fluctuation has two times the fundamental frequency of the AC power transmission system. In addition, the output AC voltage of the compensator is designated by $m^*u_{DC}$. If the modulation signal m is sinusoidal, it would be distorted by the fluctuation. Therefore, the compensation of the fluctuation is preferably carried out in order to keep the output voltage free from the second harmonic. The division of the filtered DC voltage (without fluctuation) output by the filter 15 by the instantaneous DC voltage $u_{DC}$ (with fluctuation ) provides the compensation signal to the subtractor 19. The output of the coordinate transformation is multiplied by this compensation signal. Therefore, the compensation signal input to the subtractor 19 can be expressed as $u_{DC0}/u_{DC}$ where $u_{DC0}$ is the DC component of the capacitor voltage $u_{DC}$. Therefore, the modulation signal can be written as $$m = u_{DC0}\, m_0 / u_{DC} \qquad (3.1)$$

where $m_0$ is the output of transformation unit 13 and the output voltage of $u_c$ of the compensator is proportional to $m_0$ as $$u_c = u_{DC0} * m_0 \qquad (3.2)$$

Whilst FIG. 8 shows the principle configuration of a controller for a single phase system, the three-phase system controller of FIG. 9 is completely analogous to the single-phase system in FIG. 8. In addition to the units in FIG. 8, FIG. 9 also includes the three-phase polar transformation unit 21 and the phase rotation unit 17. The phase detector 18 receives a signal from the voltage detector 23 which detects the phases of the three line voltages with respect to a reference frame ω. Essentially, the three-phase polar transformation unit 21 outputs the current amplitude $i_d$ on a three-phase current value detected by the current detector 24. Likewise, the reference signals sin θ, cos θ output by the phase detector 18 in FIG. 8 are here output by the current phase detector 17. The coordinate transformation means 14 receives, as in FIG. 8, the modulation indexes $m_q$, $m_d$ as well as the detected current amplitude $i_d$ output by the three-phase-polar transformation unit 21. The other units in FIG. 9 entirely correspond to the units already described with reference to FIG. 8 with the difference that the compensator 3, the DC voltage fluctuation compensation means 13, the coordinate transformation means 14, the DC voltage controller 16 and the 2f-filter are respectively provided for each phase.

As explained above, basically the reactive series compensator 3 outputs a reactive voltage $u_c$ and for this reason somehow the control system also in the three phase system needs an input about the phase of the AC line current i. In FIG. 9, in the three phase system, a indirect measurement of phase using the AC voltage is employed. The phase detector 18 containing a phase locked loop PLL first produces the phase of the AC voltage. However, the phase of the AC voltage is not identical to the phase of the AC current such that a modification is required. This modification is made by the phase difference detection unit 21 and the phase rotation unit 17. Using these units 21, 17, the modified signals sin θ cos θ are synchronized to the AC current i. The function of these units is as follows.

The unit 21 receives a three phase AC current as detected by the current sensor 24 and outputs its amplitude and phase difference to the phase of the AC voltage (as supplied by the outputs sin ωt, cos ωt from the phase detector 18 which senses the phase of the AC line voltage). Therefore, the unit 21 outputs the current amplitude $i_d$ on the basis of an amplitude detection and the phase Φ via the phase difference detection.

The unit 18, as explained, is basically responsible for the phase detection. It outputs the sine and cosine functions of the corresponding phase. Therefore, cosine and sine functions represent a unity amplitude signal of the input AC voltage. For example, one phase of AC voltage and the cosine function have the same phase and the other phase has ±120° difference. The unit amplitude AC signals are employed in unit 14. The phase rotation unit 17 receives the cosine and sine functions of the voltage PLL unit 18 which each have the same phase as the AC line voltage. However, the coordinate transformation means 14 needs the AC current phase and not the AC voltage phase. Therefore, the phase rotation means 17 modifies the output by the voltage PLL unit 18 such that the cosine and sine functions has the same phase as the AC current. This is basically achieved by a rotational transformation of the vector which is represented in Cartesian coordinates by the Cartesian components, namely cosine and sine.

The above described control systems for the current and voltage control are summarized in a block diagram in FIG. 10. That is, a current control loop is provided by the units 24, 21, 18, 22, 20 and a voltage control loop is provided by the units 26, 15, 19, 16. A combiner 14, 13 can be identified which combines the modulation index $m_q$ and $m_d$ in order to eventually output the modulation signal m to the compensator 3.

Problems of Constant DC Voltage and Constant Index Control

As explained above with reference to FIGS. 1–10, a controller, as for example shown in FIG. 8, produces a modulation signal $m = m_d \cos(\omega t) - m_q \sin(\omega t)$ and via the carrier signals CS1, CS2 the application of the capacitor voltage $u_{DC}$ to the compensator terminals 3a, 3b is controlled in order to perform a line current control as essentially shown in FIG. 5. If the carrier signals CS have a constant amplitude and frequency, then the shape of the compensator terminal output voltage (as shown in FIG. 11a) is a pulsewidth-modulated signal, the shape of which is determined by the modulation signal amplitude (and of course by a frequency which is here the line frequency and is assumed to be constant). Since the compensator terminal output voltage has been generated on the basis of the modulation signal, the fundamental component of the output voltage looks the same as the modulation signal, as shown in FIG. 11b. However, the compensator terminal output voltage also contains harmonics, as shown in FIG. 11c. These harmonics are undesirable because actually the feeding of the voltage from the compensator terminals should only contain the fundamental component as shown in FIG. 11b.

The amount of harmonic component generation will of course depend on the modulation signal amplitude. For example when the amplitude of the modulation signal increases, there finally exists a case where the amplitude of the modulation signal exceeds the amplitude of the respective carrier signal all times such that the application of the capacitor voltage to the terminals 3a, 3b will be a square wave entirely corresponding to the shape of the fundamental component. That is, when the modulation index equals 1 then of course the content of the fundamental component will be larger than any harmonics components.

FIG. 12 shows the fundamental amplitude and effective value (root mean square) of harmonics and it can be seen that the harmonics component varies in accordance with the modulation signal (fundamental component), i.e. more precisely with respect to the modulation index. As can be seen from FIG. 12, for any modulation index larger than≈0.65 the higher harmonics have a lower value than the fundamental component such that in a region between 0.65–1 (for the example investigated in FIG. 12) a modulation index control of the compensator output voltage can be used, i.e the amplitude of the modulation signal should be varied in accordance with the output voltage desired to be produced. However, it is noted that the harmonics effective value is larger than the fundamental component in a low modulation index region (low fundamental component region) of ≦0.65. Therefore, it would be preferable to select a constant modulation index control with a high modulation index of ≧0.65 since then a sufficient harmonic suppression can be achieved.

However, the constant modulation index control has other problems such as that the controllability of the DC voltage is degraded in zero or very low DC voltage region since the active voltage cannot be injected sufficiently into the line. Therefore, the constant modulation index control is not applicable for all values of the compensator terminal output voltage. In particular, in the constant modulation index control method a current controller 20 adjusts the DC voltage. However, if the compensator terminal output voltage is zero, then also the DC control voltage is zero. In such a case it is not possible any longer to draw active power from the transmission line to the DC capacitor and the DC voltage cannot be controlled any more. Thus, the DC capacitor $C_{DC}$ must be charged by a battery or a pre-charge circuit. In order to avoid zero line voltage $u_c$ the United States Patent U.S. Pat. No. 5,198,746 uses an absolute value circuit which clamps the voltage to a predetermined value even at the zero output terminal voltage of the inverter. Thus, controllability is maintained.

Therefore, in cases of low compensator output terminal voltages for a continuous operation the constant modulation index control cannot be used, i.e. a minimum limit for the DC control voltage must be ensured.

In addition, when applying the constant modulation index control method, the DC capacitor voltage goes to zero at a low compensator output terminal voltage if the DC voltage has perturbations in a single phase inverter. Thus, controllability of the output terminal voltage is reduced. The reason for these perturbations is that the DC current of a single phase inverter comprises second harmonic perturbations due to instantaneous power variations. Consequently, in the absence of a second harmonic filter in the DC circuit, also the DC voltage has a perturbation of the same frequency. If the amplitude of the DC voltage perturbation is larger than the mean value of the DC capacitor voltage, the instantaneous DC capacitor voltage goes to zero. Due to the use of anti-parallel diodes the inverter cannot provide a negative DC voltage and therefore the compensator terminal output voltage is not controllable when perturbations cause the DC capacitor voltage to drop below zero.

However, the compensator terminal output voltage $u_c$ cannot only be controlled by the modulation index (i.e. the amplitude of the modulation signal) but also by changing the DC capaciter voltage $u_{DC}$ instead of the modulation index. The reason is that the compensator terminal output voltage $u_c$ depends on the magnitude of the capacitor voltage $u_{DC}$. Therefore, not only a change of the pulsewidth (modulation index change) but also the change of the capacitor DC voltage $u_{DC}$ can lead to different generations of output voltages $u_c$. Thus, the compensator terminal output voltage $u_c$ can be controlled by the capacitor DC voltage and/or the amplitude of the modulation signal.

As already explained above with reference to FIGS. 5(a), 5(b) and 5(c), the line current i can be controlled (increased/decreased) by the voltage (by the amplitude and the phase of the compensator terminal output voltage $u_c$) output by the compensator 3. The amplitude of the (fundamental wave) can be changed either by changing the pulsewidth (done by changing the amplitude of the modulation signal= modulation index control) or by changing the actual $u_{DC}$ voltage of the DC capacitor (done by adjusting the reference voltage $u_{DC}^{ref}$) or by a combination of both methods. FIG. 13 and FIG. 14 show examples of output voltage waveforms respectively for the constant DC voltage method and the adjustable DC voltage method. FIG. 15 shows the effects of the adjustable DC voltage control method.

When the compensator output terminal voltage is controlled by the DC voltage (see FIG. 14) with high modulation index, the harmonics component of the output voltage of the inverter is reduced, as can be seen from FIG. 15. FIG. 15 shows the fundamental component and the harmonics component of the adjustable DC voltage with unitary modulation index. Since the waveform is similar to that of the unity modulation index in the whole region, the ratio of the fundamental wave and the harmonics component is the same for all modulation indices. Consequently, the harmonics component is always lower than a fundamental component and is less than that of the constant DC voltage control (i.e. variable modulation index control as shown with the dashed lines in FIG. 12 and 15). If no harmonics injection is assumed from the transmission line system sources 1a, 1b, the harmonics of the line current entirely depend on the harmonics of the output voltage of the inverter. If the adjustable DC voltage method (i.e. constant modulation index) is used, the content of the harmonics will always be lower than the content of the fundamental component such that no problem arises.

Independent as to whether a constant or adjustable DC voltage control method is used, the current in the inverter components is the same since this current is actually a line current i flowing through the line. The losses of the inverter components such as the tyristors and diodes intrinsically depend on the flowing current. If the switching frequency is reduced, the device losses are also reduced. However, if the switching frequency is reduced, the harmonics in the compensator terminal output voltage $u_c$ will be increased. Thus, the switching frequency cannot be reduced under a predetermined limit set by the maximum harmonics generation. Thus, during low loss operation of the inverter (lower switching frequency the value of which is limited to a lower limit) only the reducing of DC capacitor voltage can further reduce harmonics (if a constant temperature condition is assumed). In addition, the reduction of the DC capacitor voltage also reduces a leakage loss in a DC capacitance or components of the filters in the compensator.

Transient Problems

If the power sources 1a, 1b in the transmission line 2a, 2b have constant voltage amplitude and phase, the current amplitude of the current i is mainly proportional to voltage $u_L$ over the inductance of the simplified transmission line 2a, 2b. As explained with reference to FIG. 5, the compensator 3 can change the voltage $u_L$ by injecting a compensation voltage $u_c$ at the compensator terminal output voltage. The change of the current amplitude is therefore proportional to the amplitude of injected voltage $u_c$. This means that the output of the current controller should have a linear relationship with the injection voltage $u_c$. If the controller's output of the current control is proportional to the compensation voltage $u_c$, the controller can operate linearity. For example, if a required change of the current amplitude is two times higher, the current controller can simply change its output $m_q$ ($cc_{out}$) to twice the value it had before. That is, the current amplitude is proportional to the (overhead voltage $u_x$)–(injected voltage $u_c$). However, if there is a sudden deep drop in the reference voltage, the DC voltage at the capacitor may go to zero on this transient state. As explained above, zero voltages must be avoided since the switching elements of the inverter can only handle positive voltages. Therefore, during a transient decrease of the reference voltage when using an adjustable DC voltage control of the line current, there is the additional problem of zero voltages at the capacitor.

Problems With the Coupled Control

As can already be detected from equation (2.12), (2.13) and (2.16), the intrinsic problem of the controller is that— due to the coupling of the current and the voltage due to the line reactance $L_{AC}$—the control is intrinsically performed in a manner such that the voltage $u_{DC}$ is also dependent on the modulation index $m_q$ (as indicated with the schematic line VDEP) and that the detected current $i_d$ is intrinsically also dependent on the modulation in $m_d$ (as schematically indicated with the schematic line CDEP). That is, as can clearly be seen from the above-coupled equations (1.1)–(1.5) and (2.1)–(2.16), the control in the controller in FIGS. 8, 9 performs a current and a voltage control which is not independent.

The schematic drawing in FIG. 16 shows the same dependency as indicated with the schematic lines in VDEP, CDEP in FIG. 10. FIG. 17b shows examples of the frequency characteristics of the transfer functions of FIG. 16 and different current amplitudes of the power transmission lines. As shown in FIG. 17a, the coupling from the active component of the modulation index $m_d$ to the current amplitude $i_d$ is larger than the main transfer function of the current amplitude. The other coupling has a larger gain at high frequency region compared to the main transfer function. Furthermore, the main transfer functions are varied by the operation point (in this case current amplitude), thus the control performance will be degraded using a control system as in FIG. 16. Furthermore, it should be noted that the coupling control of FIGS. 10, 16 takes place independently as to whether a single-phase system or a three-phase system is considered.

FIG. 17a shows the step responses of the basic control including the coupling control. As is shown at the time point 0.1 in FIG. 17a, when the DC voltage is changed in a step function (in order to determine the dynamic coupling of the voltage to the current) there is a large pulse in the AC line current. Likewise, when a step function—similar change of the DC line current ed is performed, then—at time point 0.5—a variation of the DC voltage also occurs. Therefore, also FIG. 17a illustrates that the voltage and current control cannot be performed independently in the conventional controllers for the transformerless reactive series compensator.

SUMMARY OF THE INVENTION

As explained above, the conventional controllers either operate with a variable modulation index and constant DC voltage or with a constant modulation index and variable DC voltage. However, the problem of harmonic generation in the compensator terminal output voltage still remains. Furthermore, there is the problem of the DC voltage dropping to zero which makes control impossible. Furthermore, there is the problem of switching losses and leakage losses of the capacitor. There is also the problem of zero voltage in transient behaviours. Furthermore, there is the principle problem of voltage and current control loops being coupled.

The present invention has been devised to overcome the aforementioned problems. The main object of the present invention is to provide a controller which reduces the generation of harmonics in the compensator terminal output voltage and nonetheless avoids zero voltages.

This object is solved (claim 1) by a controller for controlling a reactive series compensator inserted into a power transmission line, comprising a line current detection means for detecting the line current flowing in the power transmission line; a DC voltage detection means for detecting a DC voltage of a capacitor connected to a modulator of the inverter of the reactive series compensator; a modulation signal generation means for generating an inverter modulation signal in the form of $m = m_d \cos(\omega t) - m_q \sin(\omega t)$, $\omega$=line frequency to be supplied as a modulation signal to the modulator of the compensator; a current control loop for controlling the line current to a reference value, a current controller of said current control loop outputting a modulation index $m_q'$ for the modulation signal; and a voltage control loop for controlling the DC voltage of the DC capacitor to a predetermined reference voltage, a DC voltage controller of said voltage control loop outputting a modulation index $m_d'$ for said modulation signal.

That is, according to a first aspect of the invention the control is performed on such a manner that the adjustable DC voltage control is used for a high output voltage region and the constant DC voltage control is used for the low output voltage region. Thus, in the high output voltage region the harmonics are reduced and in the low output voltage region the harmonics are still reduced compared to a constant high DC voltage control. Such a controller also avoids zero DC voltages at the DC capacitor and maintains a minimum DC voltage also for the continuous operation from capacitive to inductive mode or vice versa. The controller according to the invention also has the advantage of reducing the switching losses since at least at the adjustable DC voltage control a constant modulation index can be selected such that the switching frequency is as small as possible.

According to a second aspect of the invention, the controller comprises a rate limiter for restricting the change rate of the predetermined voltage applied to the voltage control loop. This avoids steep drops of the capacitor DC voltage to zero in transient. Therefore, the rate limiter in the adjustable DC voltage region in particular solves the object of avoiding zero DC voltages in transient conditions, especially at a sudden change of the current reference.

According to a third aspect of the invention, in particular with respect to the usage of the rate limiter in the adjustable DC voltage region, the controller according to the invention further comprises decoupling control means receiving a modulation index $m_q'$ from the current controller and a modulation index $m_d'$ of the DC voltage controller and outputting new modulation indices $m_q$ and $m_d$ to the modulation signal generation means such that the line current is independent from the output $m_d'$ of the DC voltage controller and the DC capacitor voltage is independent from the output $m_q'$ of the current controller, wherein the AC current amplitude and the DC capacitor voltage can be controlled independently. The decoupling control means is provided within the voltage and current control loops and is adapted to make the current control independent of the modulation index of the voltage control and to make the voltage control independent of the current modulation index. In combination with the rate limiter, this improves further the dynamic behaviour of the controller during sudden changes of the reference voltage in transient conditions.

Further advantageous embodiments and improvements of the invention are listed in the attached dependent claims. Hereinafter, the invention will be described with reference to its advantageous embodiments. However, it should be understood that what is described below in the figure description only relates to what the inventors presently conceive as best mode of the invention. In particular, the invention may comprise embodiments which consist of features which have been independently described and claimed in the claims and the description.

BRIEF DESCRIPTION OF THE DRAWINGS

In the drawings, the same or similar reference numerals denote the same or similar parts throughout. In the drawings:

FIGS. 5(a)–(c) show phasor diagrams for controlling the line current;

FIGS. 6(a)–(c) show phasor diagrams of the voltage and current dependency when charging the DC capacitor $C_{DC}$;

FIGS. 7(a)–(c) show the charging of a DC capacitor in a transient state;

FIG. 13 shows an example of a constant DC voltage control;

FIG. 14 shows an example of an adjustable DC voltage control;

FIG. 15 is a diagram comparing the effective value of the harmonics component with the effective value of a fundamental component for a controller using an adjustable DC voltage control method;

FIG. 17a shows step responses of the basic controller shown in FIGS. 8, 9;

FIGS. 18a, 18b show controllers in accordance with the invention which in particular contain a control method selection means SS (signal separator);

FIG. 22 shows the controller characteristics in accordance with the invention, in particular comparing them with the constant DC voltage control in accordance with the prior art;

FIG. 24 shows the static characteristics and the transient trajectory when the rate limiter according to the second aspect of the invention is used in the constant modulation index control method;

FIG. 27b shows a principle block diagram of a controller according to an embodiment including the decoupling control means according to FIG. 27a.

FIG. 28 shows a block diagram of the controller including a decoupling control according to an embodiment of the invention of a three-phase system with a voltage PLL;

FIG. 30a shows a block diagram of a single phase controller according to an embodiment of the invention;

FIG. 31a shows the step responses using a decoupling control according to an embodiment of the invention;

FIG. 31b shows the gain characteristics with a simplified decoupling control according to an embodiment of the invention;

DESCRIPTION OF THE PREFERRED EMBODIMENTS FIRST ASPECT (CONTROL METHOD SELECTION)

Figure 1A:
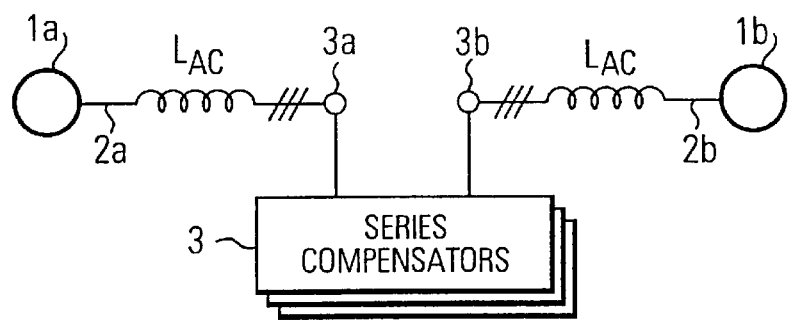
FIG. 1a shows a principle configuration of a series compensator in a power transmission system.
Figure 2:
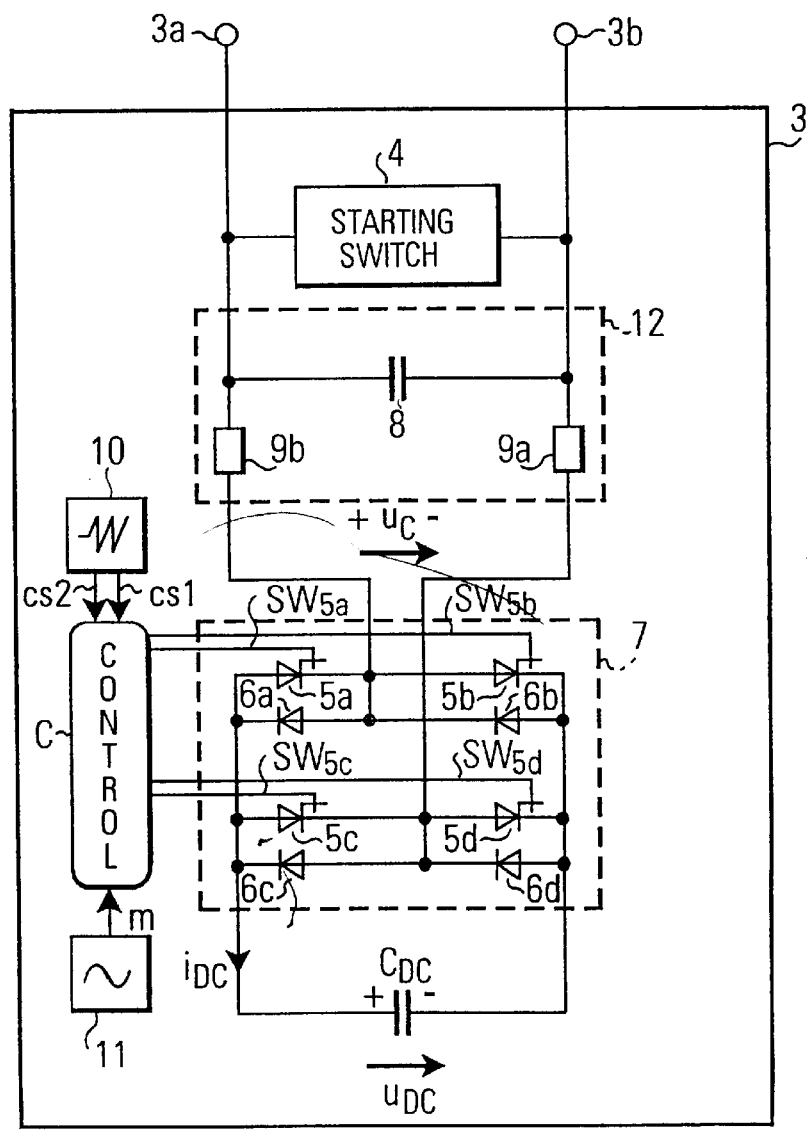
FIG. 2 shows a detailed block diagram of a typical compensator used in FIGS. 1a, 1b.
Figure 1B:
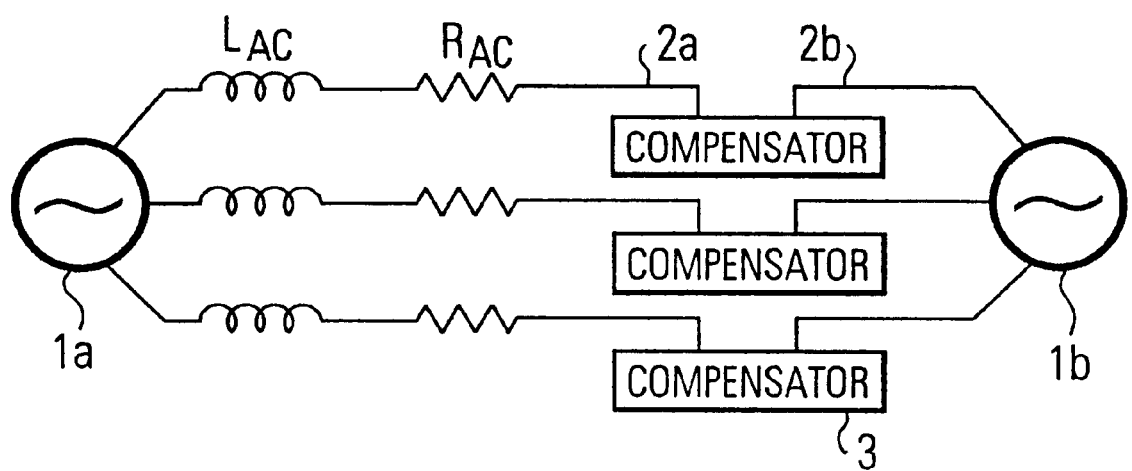
FIG. 1b shows a three-phase system incorporating compensators for each phase.
Figure 3:
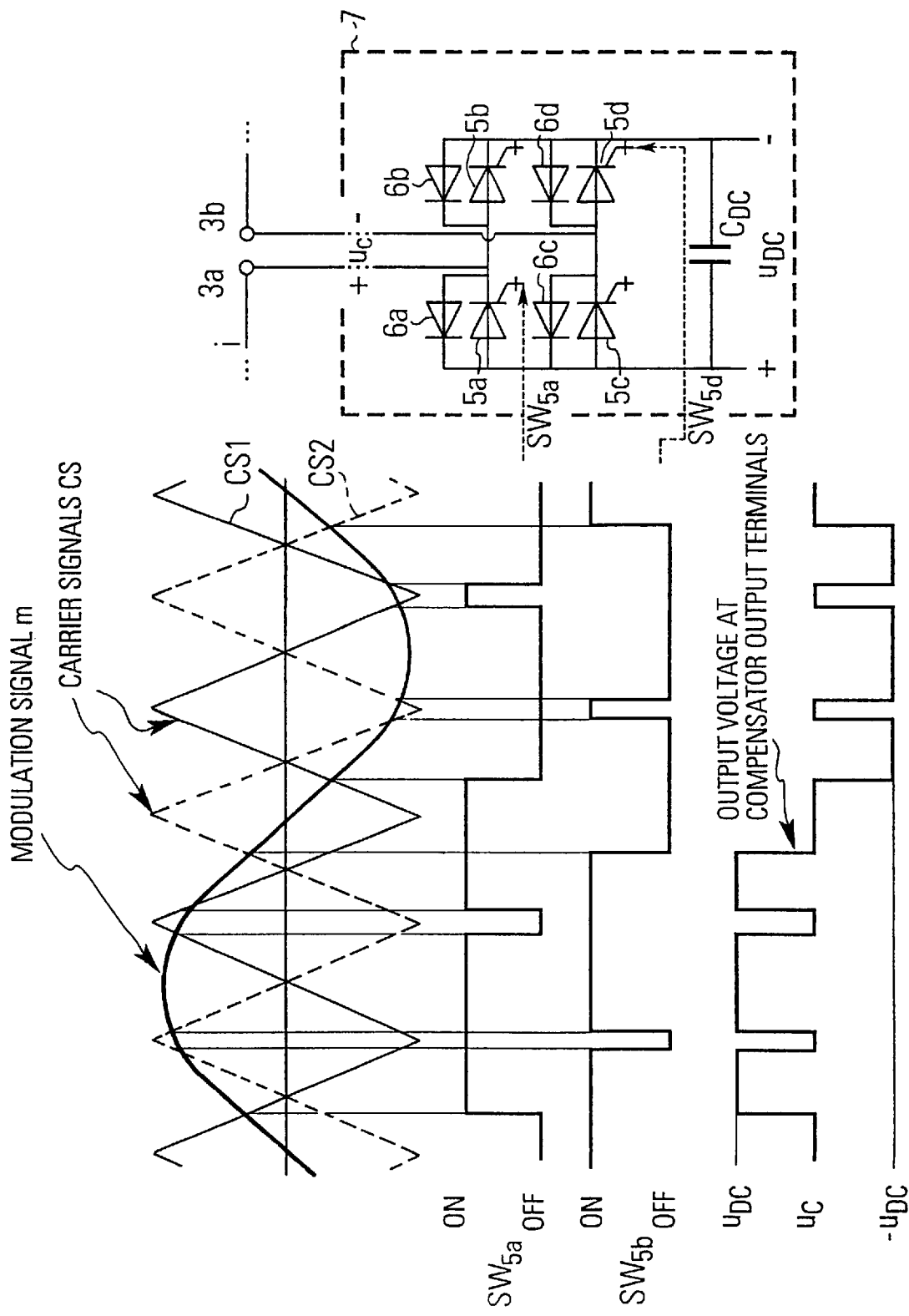
FIG. 3 shows a PWM control of the inverter shown in FIG. 2.
Figure 4A:
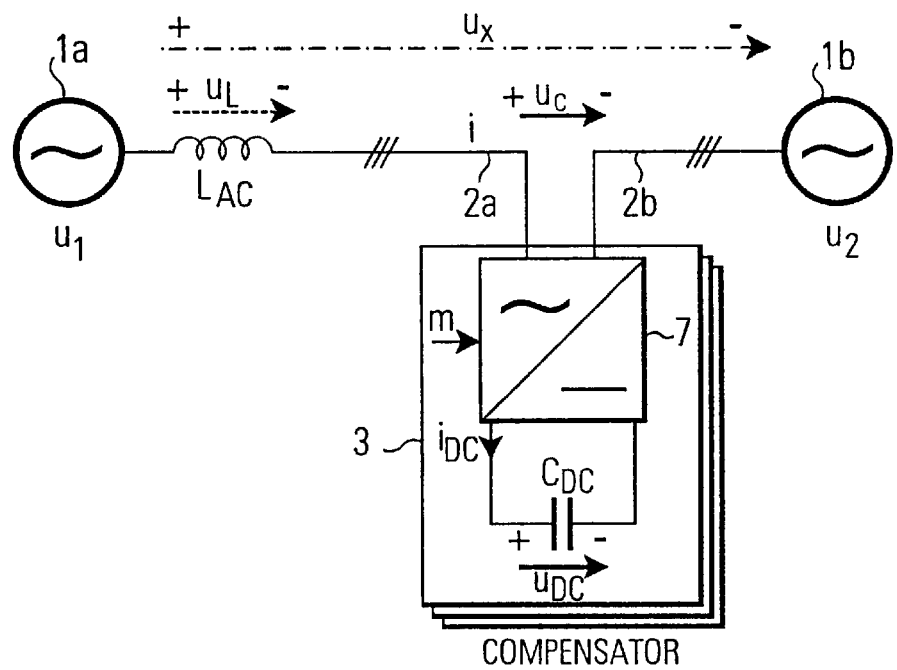
FIGS. 4(a)–(b) show a principle relationship of voltages and currents in the power transmission system including a compensator according to FIGS. 1a, 1b.
Figure 4B:
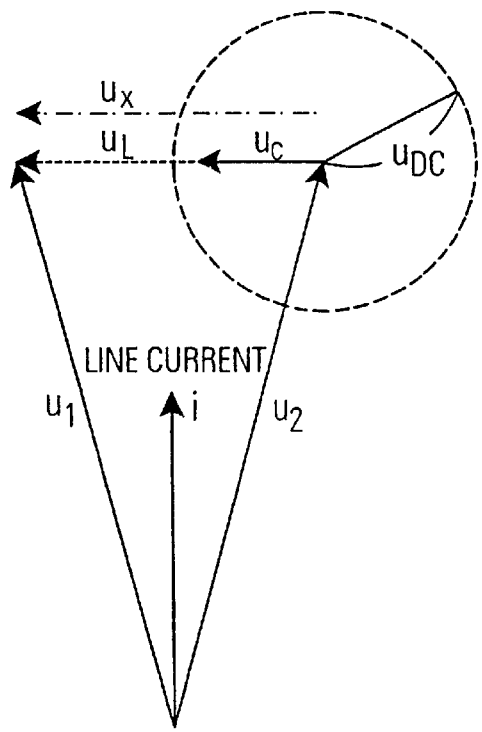

As explained above, according to the prior art the output voltage $U_c$ at the compensator terminals 3a, 3b can be controlled with two different control methods. A first control method is a technique where the amplitude of the modulation signal m is changed which leads to a variation of the pulsewidth and thus to a variation of the output voltage $u_c$ (see FIG. 13). A second control method is a technique in which the output voltage $u_c$ is changed by changing the DC capacitor voltage $u_{DC}$. Both methods have their problems regarding the generation of harmonics, the falling below zero of the DC capacitor voltage (preventing control and the taking of active power from the line) and switching losses. Hereinafter, a controller according to the first aspect of the invention for avoiding these problems will be described with reference to FIG. 18a, FIG. 18b and FIG. 19.

FIG. 18a shows a block diagram of the controller including a line current detection means 24, a DC voltage detection means 26, a modulation signal generation means 13, 14, a current control loop 18, 21, 22, 20 and a voltage control loop 15, 19, 16 as already described with reference to FIG. 10. That is, the modulation signal generation means 13, 14 generates a modulation signal in the form of $m = m_d \cos(\omega t) - m_q \sin(\omega t)$ which is used for controlling the application of the capacitor DC voltage $u_{DC}$ of the DC capacitor CDC to the compensator terminals 3a, 3b. The current controller 20 outputs a control signal corresponding to the desired compensator terminal output voltage $u_c$ of the compensator. Furthermore, dependent on a predetermined reference voltage $u_{DC}^{ref}$ the voltage controller 16 outputs the modulation index $m_d$ for said modulation signal.

According to the invention, such a controller furthermore comprises a control method selection means SS (hereinafter also called "signal separator") receiving as input the control signal $cc_{out}$ outputted by the current controller 20 and having a first output which outputs the modulation index $m_q$ of said modulation signal m and having a second output which is connected to the subtracter 19 of the voltage control loop and outputting said predetermined reference voltage $u_{DC}^{ref}$. As shown in FIG. 18a, the modulation index $m_q$ outputted by the control method selection means SS is applied to the means 13, 14 etc. in the same manner as in FIG. 10. However, the coupling of the control method selection means SS to the voltage control loop allows to adjust the predetermined reference voltage $u_{DC}^{ref}$ dependent on the current controller output $cc_{out}$ which indicates the desired compensator terminal output voltage. Thus, dependent on the current controller output $cc_{out}$ a combined control of the compensator terminal output voltage $u_c$ is possible by adjusting the modulation index $m_q$ (changing the amplitude of the modulation signal) and/or the reference voltage $u_{DC}^{ref}$ (adjusting the amplitude of the DC capacitor voltage $u_{DC}$). The technique of how to generate $m_q$, $u_{DC}^{ref}$ by the control method selection means SS will be explained below.

Figure 8:
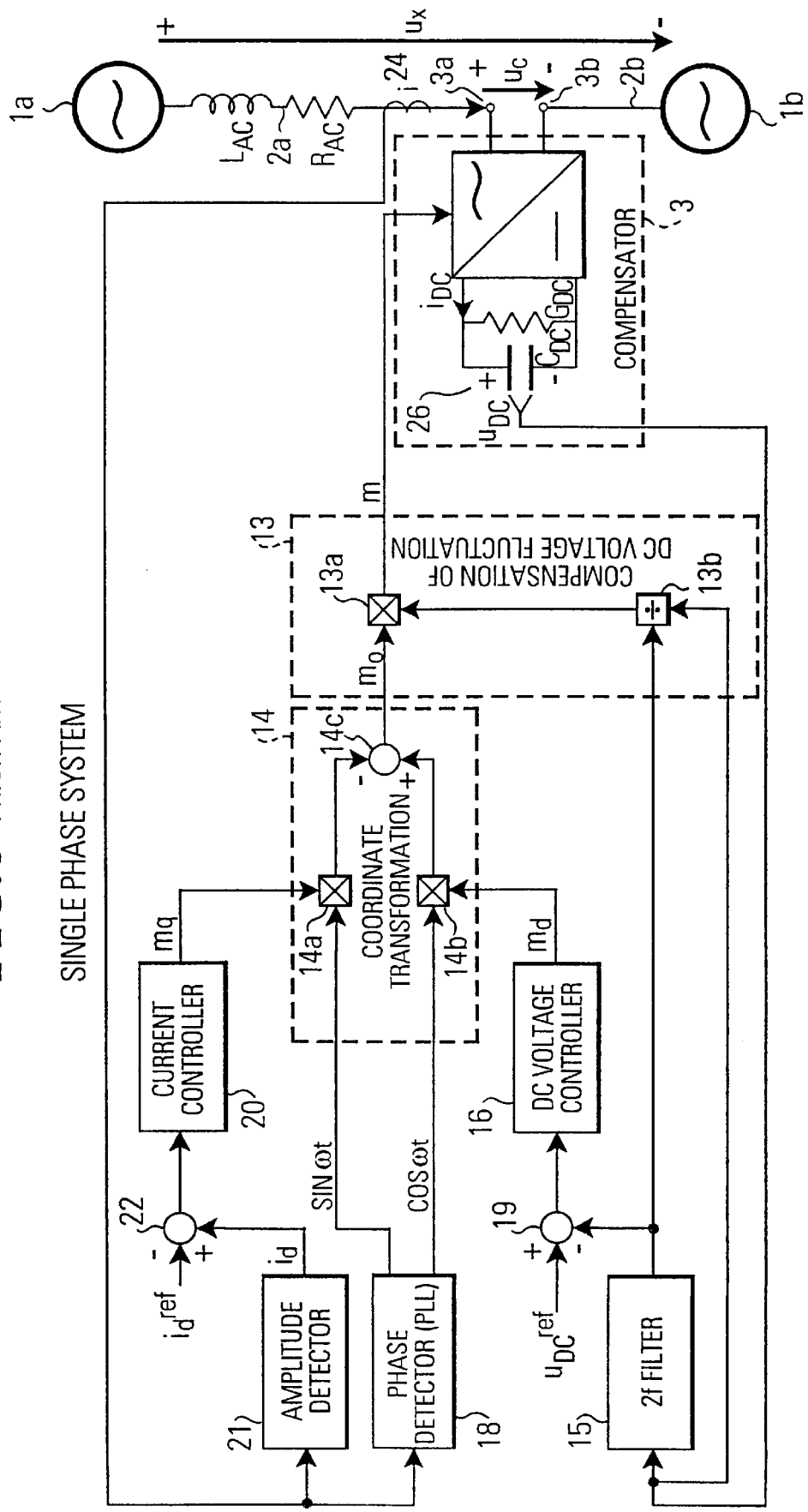
FIG. 8 shows a conventional single-phase controller.
Figure 9:
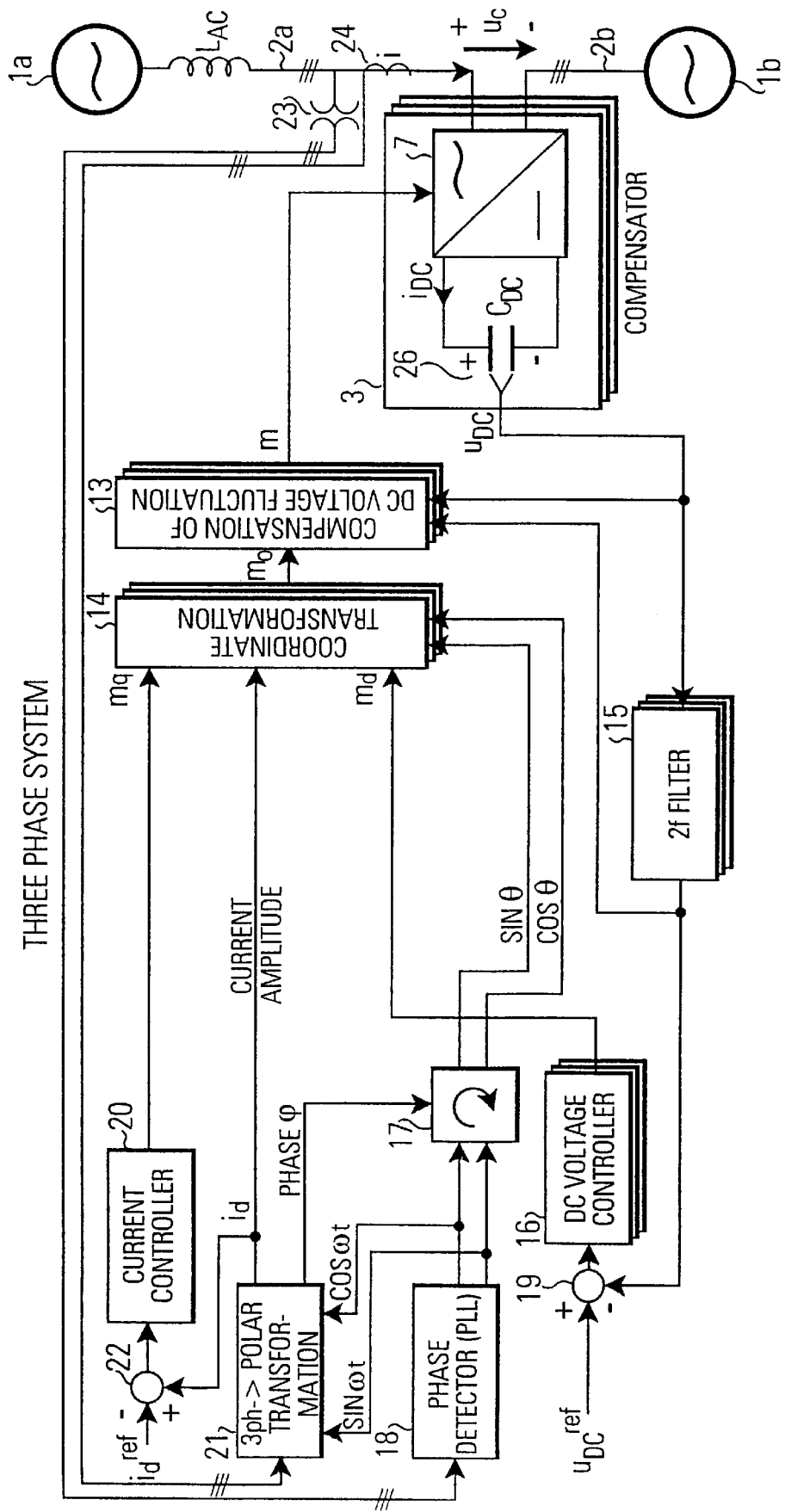
FIG. 9 shows a conventional three-phase controller.

First, however, it should be understood that the current control selection means SS in accordance with the invention can be used in a single-phase system or a three-phase system illustrated for example in FIG. 8 or in FIG. 9. FIG. 18b shows an implementation in a single phase system where of course the control method selection means SS is only provided once. In a three-phase system as in FIG. 9 a single current controller 20 is used and, therefore, in case of a 3-phase system the control method selection means SS is also provided only once (inserted between the current controller 20 and the modulation signal generation means 14, 13). In this case, $m_q$ and the DC voltage reference $u_{DC}^{ref}$ are the same for all three phases. Alternatively, if each single phase is controlled with a separate controller as in FIG. 18b, then of course the current controller and the control method selection means SS are provided three times. The use of one or three control method selection means SS is indicated in FIG. 18a with the dashed lines around the block designated SS.

Figure 19:
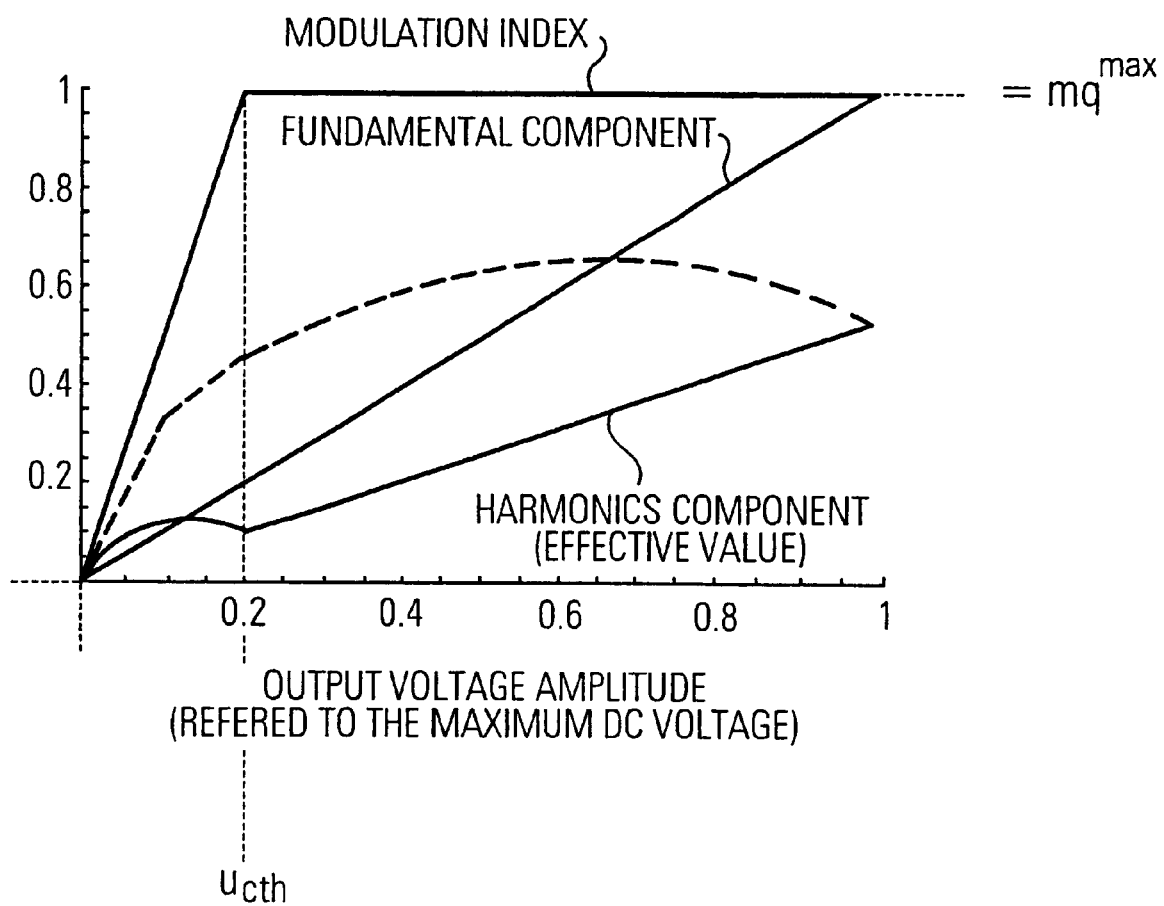
FIG. 19 illustrates the functioning of the control method selection means as shown in FIG. 18.

FIG. 19 shows the function of the control method selection means SS. Since the output voltage can be controlled by both the DC voltage $u_{DC}$ as well as the modulation index $m_q$, the selection means SS provides that the adjustable DC voltage control is used for a high output voltage region and the constant DC voltage control is used for a low output voltage region. The high voltage and low voltage region are separated by a predetermined compensator terminal output voltage threshold $u_{cth}$, e.g. 20% of the maximum DC voltage. That is, the control method selection means SS outputs a constant modulation index $m_q$ and a reference voltage $u_{DC}^{ref}$ increasing and decreasing dependent on an increase or decrease of the compensator terminal output voltage $u_c$ as indicated by the current controller output $cc_{out}$ when the compensator terminal output voltage $u_c$ is larger than a predetermined compensator terminal output voltage threshold $u_{cth}$. As already explained with reference to FIG. 15 and as indicated with the line "harmonics component" also in FIG. 19, in the control region $u_c > u_{cth}$ the harmonics are reduced and thus there is no problem with the harmonics generation, i.e. the effective value of the harmonics component is always lower than the effective value of the fundamental component.

When the compensator terminal output voltage $u_c$ is smaller than said predetermined compensator terminal output voltage threshold $u_{cth}$, i.e $u_c \leq u_{cth}$, then the control method selection means SS outputs a substantially constant reference voltage $u_{DC}^{ref}$ and a modulation index $m_q$ increasing and decreasing a depending on an increase or decrease of the compensator terminal output voltage $u_c$ as indicated by said current controller output $cc_{out}$. In the low output voltage region $u_c \leq u_{cth}$ the harmonics content is not as reduced as shown in FIG. 15, however, it is still reduced compared to the constant high DC voltage method indicated with the dashed line in FIG. 19. Thus, for $u_c > u_{cth}$ the harmonics line is the same as in FIG. 15. Since the DC voltage is reduced, e.g. 20% of maximum, the harmonics component is also 20% of the constant DC voltage method with the maximum DC voltage in the lower region. Since the adjustable DC voltage control (constant modulation index) is used for the high output voltage region and the constant DC voltage control (a variable modulation index) is used for the low output voltage region and since both methods are matched at the threshold voltage $u_{cth}$ a low harmonics component can be achieved over the entire output voltage range.

Besides the keeping low of the harmonics content over the entire control range the control method according to the invention also has further advantages. As explained above, in the control range $u_c < u_{cth}$ a constant DC capacitor voltage (FIG. 13) is set. In particular, it is set to the voltage which at $u_{cth} = 0.2 \cdot u_{DC}^{max}$ (the lowest value of the adjustable DC voltage control) achieves a low harmonic content. Even if then the control method is switched to the variable modulation index control (whilst keeping the capacitor voltage $u_{DC}$ to the constant level of $0.2\ u_{DC}^{max}$) no problem occurs when there is a zero compensator output voltage $u_c$. If there is a sudden requirement to increase the output voltage from zero then first the modulation index $m_q$ is increased and then the capacitor voltage is increased. Therefore, even at zero output voltage a control is possible.

As explained above, when going from 100% to 20% of the output voltage the capacitor voltage $u_{DC}$ is reduced by reducing the reference voltage $u_{DC}^{ref}$ of the voltage control loop. The DC capacitor voltage obtained at e.g. 20% of the maximum output voltage is then used as the constant capacitor voltage $u_{DC}$ in the lower output voltage range (where the modulation index is changed instead of the capacitor voltage). The minimum DC voltage can be designed such that the instantaneous DC capacitor voltage keeps a positive value even if there exist perturbations in the DC voltage. As explained above, in particular a transformerless configuration for a three-phase system has single phase inverters in each phase and therefore the DC voltage may have such a voltage perturbation. That is, if the constant DC capacitor voltage used in the lower terminal output region is set to such a value that even a maximum perturbation cannot cause a zero voltage, then a minimum DC voltage is maintained and thus the controllability of the output terminal voltage is ensured for the whole operating range.

Furthermore, when changing from capacitive to inductive mode and vice versa (FIG. 5b←→FIG. 5c) in accordance with the inventive control method selection a minimum DC voltage is kept. The modulation index is controlled to freely change from 90° lagging to 90° leading to the current including the zero point. This would not be possible using the variable capacitor voltage control over the entire region since at $u_c = 0$ (the point where the inductive mode is changed into the capacitive mode) the capacitor voltage would have to be zero and no control is possible. Therefore, in the prior art this control condition had to be avoided.

Figure 12:
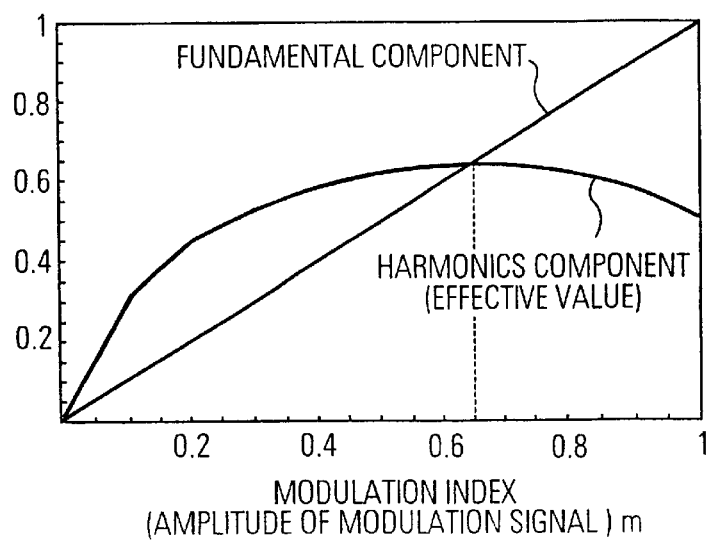
FIG. 12 shows a diagram comparing the effective value of the harmonics components with the effective value of the fundamental component if a control with a variable modulation index is used.

As shown in FIG. 19, in the constant modulation index control range a constant modulation index is used which is set to a maximum modulation index $m_q^{max}$. As explained with reference to FIG. 12, of course this maximum modulation $m_q^{max}$ must be an index which allows to reduce the effective value of the harmonics component to be smaller than the effective value of the fundamental component, and therefore, at such a modulation index $m_q^{max}$ the harmonics component is always smaller than the fundamental component in the constant modulation index range. The constant modulation index $m_q$ can therefore be selected to be the maximum possible modulation index $m_q^{max}=1$ or any value where the harmonics component is still smaller than the fundamental component as shown in FIG. 12. On the other hand, the constant DC capacitor voltage used in the low output voltage region is preferably set to the voltage achieved at the "corner voltage" $u_{cth}$. The modulation index can also be set larger than 0.65 in the example of FIG. 12. When the compensation of DC voltage fluctuation (13) is applied for a single phase converter without DC filter, DC voltage fluctuation should be taken in to account to set maximum modulation index for preventing clip of voltage peak. On the other hand, in order to keep advantage of harmonics reduction, the minimum DC voltage can be set below 0.65 in the example of FIG. 12. Further the minimum DC voltage has to be set larger than amplitude of DC voltage fluctuation in a single phase converter without DC filter.

Hereinafter, embodiments of the control method selection means SS according to the first aspect of the invention will be described with reference to the drawings.

FIRST EMBODIMENT

As explained above with reference to FIGS. 18a, 18b, according to the invention the main control loops of line current control and DC voltage control are interconnected via the signal separator SS which receives the output of the current controller $cc_{out}$ and which outputs the modulation $m_q$ and the DC voltage reference $u_{DC}^{ref}$. Thus, the line current is controlled by adjusting the output voltage and the control output signal $cc_{out}$ of the current controller 20 is separated to the DC voltage reference and the modulation index by the signal separator SS. By this configuration the line current i is controlled not only by the modulation index but also by the DC voltage.

Thus, the control method selection means (signal separator SS) must ensure the minimum DC capacitor voltage by some limiting means and must adjust the modulation index to control the output voltage at the minimum DC voltage. In the higher output voltage region the current is controlled by DC voltage only and in the lower output voltage region it is controlled by the modulation index with the minimum constant DC voltage. These two control methods are automatically and continuously switched with respect to the threshold voltage $u_{th}$.

Figure 20:
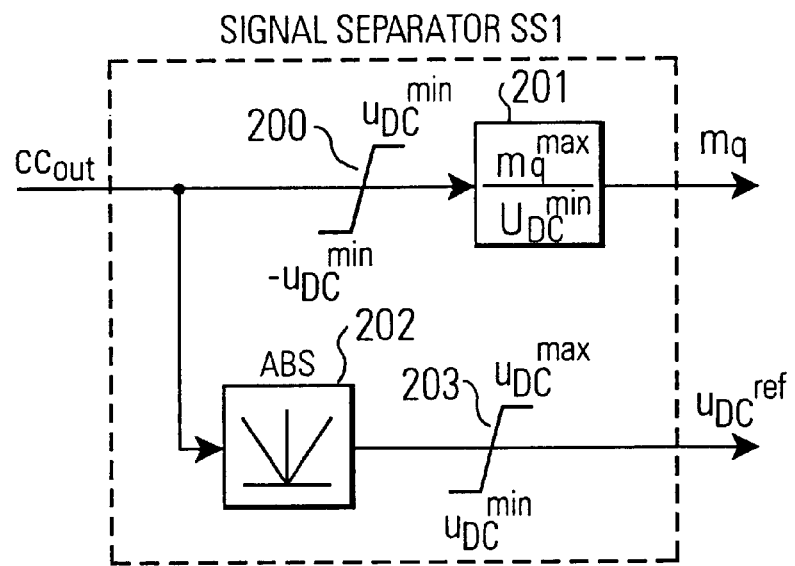
FIG. 20 shows a first embodiment of the signal separator.

FIG. 20 shows a first embodiment of a signal separator SS1. As explained above, the control signal $cc_{out}$ of the current controller 20 which is input to the signal separator SS1 is the amplitude of the compensator terminal output voltage $u_c$. Since the maximum output voltage $u_c$ of the compensator is basically the maximum DC capacitor voltage, also the output of the current controller $cc_{out}$ has a maximum value determined by the maximum DC capacitor voltage.

In FIG. 20 a first limiter 200 is provided for limiting the control voltage $cc_{out}$ to a voltage level $u_{DC}^{min}$ when the control voltage $cc_{out}$ exceeds this predetermined limit voltage $u_{DC}^{min}$. Likewise, if the control voltage $cc_{out}$ falls below the negative limit voltage $-u_{DC}^{min}$ then the control voltage $cc_{out}$ will be limited to this negative limit voltage $u_{DC}^{min}$.

Furthermore, a first divider 201 is provided for multiplying the output of the first limiter 200 with the maximum modulation index $m_q^{max}$ and for dividing the result by the first limit voltage $u_{DC}^{min}$. The output of the first divider 201 is the modulation index $m_q$. Thus, in the upper signal part 200, 201 in FIG. 20 a constant modulation index $m_q = m_q^{max}$ is output if the control voltage $cc_{out}$ exceeds or falls below the limit voltages $u_{DC}^{max}$; $-u_{DC}^{min}$. Within the control voltage range $[-u_{DC}^{min}, u_{DC}^{min}]$ a variable modification index $m_q$ increasing and decreasing (e.g. linearity) with an increase or decrease of the control voltage $cc_{out}$ is output. Of course, the limit voltage $u_{DC}^{min}$ corresponds to the threshold voltage $u_{cth}$ as explained with reference to FIG. 19.

Thus, for positive control voltages $cc_{out}$ exceeding the limit voltage the modulation index will be $+m_q^{max}$ and for control voltages $cc_{out}$ lower than the negative limit voltage the modulation index will be $-m_q^{max}$. If the maximum modulation index $m_q^{max}=1$ then the modulation index is limited within +1 in these cases. +1 means 90° leading voltage to the line current i and −1 means a 90° lagging of the voltage to the line current i. Thus, the control selection in FIG. 19 is of course mirrored on the negative value side (which is indicated with the dashed axis designations for a point symmetry with respect to the 0,0 coordinate).

In the lower signal path 202, 203 in FIG. 20, a first absolute value circuit 202 is provided for determining the absolute value of the control voltage $cc_{out}$. A second limiter 203 is provided for setting the reference voltage $u_{DC}^{ref}$ to a minimum voltage $u_{DC}^{min}$ if the output of the absolute value circuit 202 falls below this lower voltage value $u_{DC}^{min}$. Preferably, the second limiter 203 is also adapted for limiting the output of the absolute value circuit 202 to an upper threshold value $u_{DC}^{max}$. Thus, in the lower signal path 202, 203 whenever the control voltage $cc_{out}$ is larger than $-u_{DC}^{min}$ or smaller than $u_{DC}^{min}$ than the minimum voltage $u_{DC}^{min}$ will be output as the reference voltage $u_{DC}^{min}$ in to the voltage control loop.

FIG. 22 compares the controller characteristic of the present invention with the controller characteristic of a constant DC voltage control of a prior art. If $m_q^{max}=1$ and the control voltage $cc_{out}$ is larger than the minimum DC voltage $u_{DC}^{min}$, the signal separator SS1 always outputs 1 for the modulation index and the limiter 203 of the lower path outputs the absolute value of $cc_{out}$ for the reference voltage $u_{DC}^{ref}$. The DC voltage control loop maintains the DC voltage of the capacitor to $cc_{out}$ and the modulation index equals one, so that the amplitude of the compensator output terminal voltage $u_c$ is adjusted to $cc_{out}$ which is actually the desired output terminal voltage.

When the control voltage $cc_{out}$ is smaller than the negative minimum DC voltage $-u_{DC}^{min}$ the signal separator SS1 outputs −1 and the output terminal voltage $u_c$ is adjusted to the desired value. On the other hand, when the absolute value of the control voltage $cc_{out}$ is smaller than the minimum voltage $-u_{DC}^{min}$, then the signal separator SS1 outputs the control voltage $cc_{out}$ with a gain as determined by the limiter 200.

At the same time, the limiter 203 in the lower path outputs the minimum DC voltage which thus corresponds to the constant DC voltage control method, i.e. a variable modulation index depending on the gain of the limiter 200 is output whilst a constant DC voltage is set via the constant reference voltage $u_{DC}^{ref}$. On the other hand, for a control voltage $cc_{out}$ exceeding the minimum voltage $u_{DC}^{min}$ the control voltage $cc_{out}$ multiplied with the gain of the second limiter 203 is output as the reference voltage $u_{DC}^{ref}$. The adjustment of the gain of the limiters 200, 203 is preferably adapted to the control behaviour of the current control loop and the voltage control loop (PI, PID etc.).

In FIG. 22 the horizontal axis is $cc_{out}$ which is the desired output terminal voltage. The left vertical axis is the DC capacitor voltage and the output terminal voltage and the right vertical axis is the modulation index. The DC capacitor voltage is adjusted to a sufficient value (the same value as the output voltage in this case) for the output voltage and is kept larger than the minimum value $u_{DC}^{min}$. It is noted that the output terminal voltage is proportional to the desired value. For comparison, characteristics of the constant DC voltage control with the maximum DC voltage is shown in FIG. 22b for the prior art.

Figure 11:
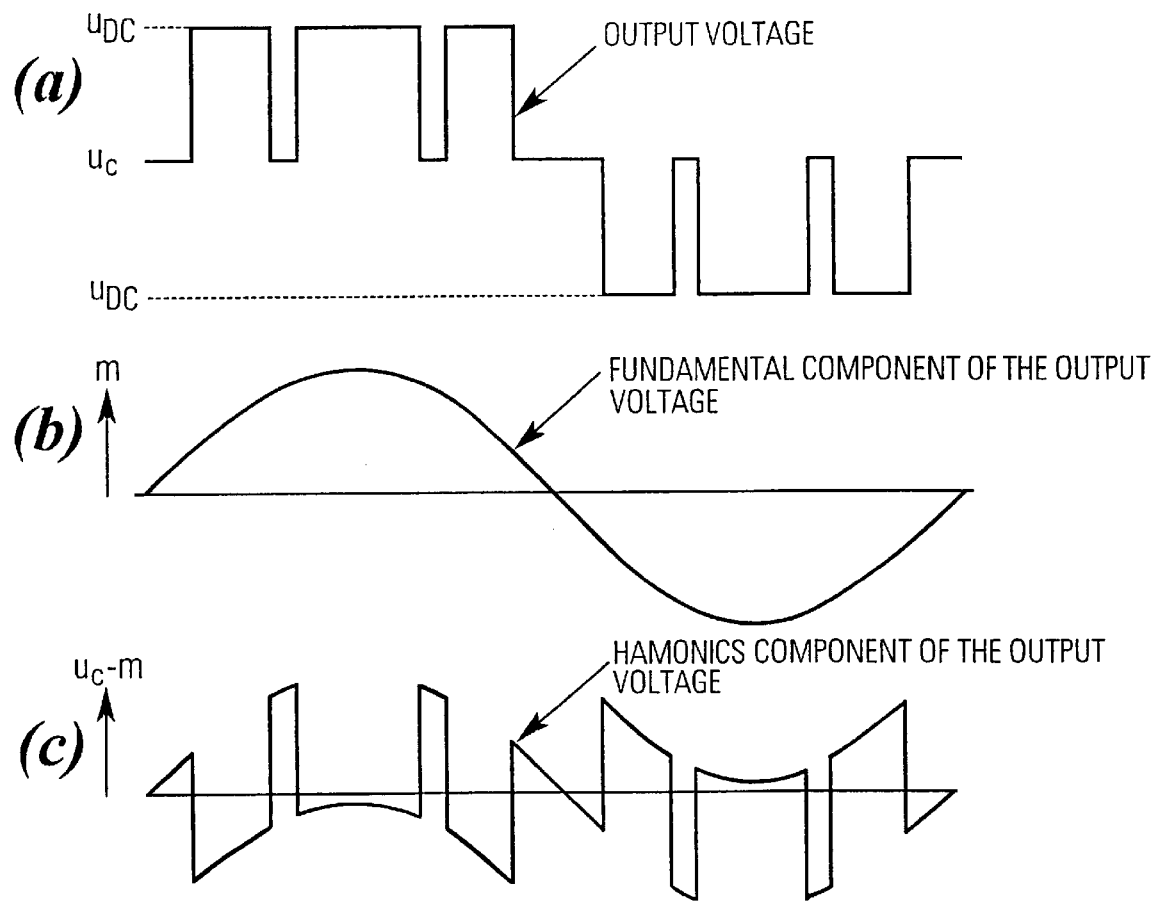
FIG. 11 shows the generation of harmonics components in the compensator terminal output voltage.

As already mentioned above, $m_q^{max}$ is preferably selected to be +1. However, other values are possible. If $m_q^{max}<1$ the modulation index for the current control is limited less than 1 and the inverter can additionally output voltage for the DC voltage control. That is, the maximum output voltage is limited by the DC capacitor voltage and the output voltage is maximum at the modulation index being one in the PPM method as shown in FIG. 11. If the current controller 20 outputs the maximum modulation index and the DC capacitor voltage requires to take power from the transmission line, a sinusoidal modulation signal m in FIG. 11 will exceed 1 and as a result the output voltage will be distortet. Therefore, if the modulation index $m_q^{max}$ is selected to be less than one, a control margin to control the DC voltage is possible. Of course, the modulation index maximum value must be selected to be a value which ensures that the effective value of the harmonics component is smaller than the effective value of the fundamental component (see FIG. 12 and FIG. 19).

SECOND EMBODIMENT

Figure 21:
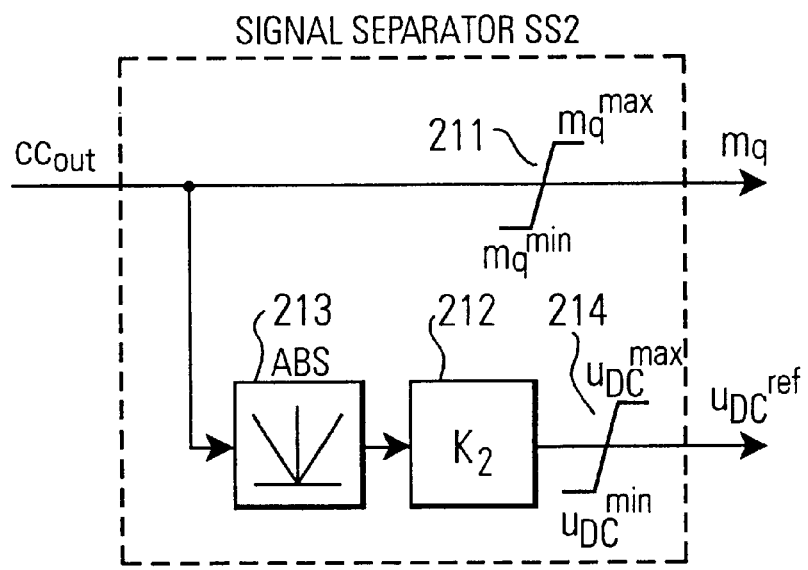
FIG. 21 shows a second embodiment of the signal separator.

A second embodiment of a signal separator SS2 having the control characteristics as shown in FIG. 22a is shown in FIG. 21. This signal separator SS2 comprises a third limiter 211 for limiting the control voltage $cc_{out}$ output by the current controller to a maximum modulation index $m_q^{max}$ and a minimum modulation index $m_q^{min}$ when the control voltage $cc_{out}$ respectively exceeds or falls below the maximum and minimum modulation indices, respectively. Thus, $cc_{out}$ is the modulation index level. The maximum modulation index $m_q^{min}$ may be the negative value of $m_q^{max}$.

Furthermore, the signal separator SS2 comprises a second absolute value circuit 213 for determining the absolute value of the control voltage $cc_{out}$. A first multiplier 212 multiplies the output of the absolute value circuit with a predetermined constant $K_2$. A fourth limiter 214 limits the output of the second multiplier 212 to an upper threshold value $u_{DC}^{max}$ and a lower threshold voltage $u_{DC}^{min}$ when the output of the second multiplier 212 respectively exceeds said upper and lower threshold voltages $u_{DC}^{max}$, $u_{DC}^{min}$. The first multiplier 212 uses a predetermined constant $K_2$ for converting the control voltage $cc_{out}$ into the DC voltage reference level. Of course, the predetermined constant $K_2$ can also be incorporated as part of a gain of the fourth limiter 214. Furthermore, it is also possible that the constant $K_2$ is part of the absolute value circuit 213 which in this case comprises a gain factor corresponding to the constant $K_2$.

Thus, in FIG. 21 the modulation index $m_q$ will be directly the control voltage $c_{out}$ and the characteristics are the same as in FIG. 22a.

As explained above, the signal separators SS1, SS2 enable a control with the constant DC capacitor voltage and a variable modulation index in a low voltage output region and with a constant modulation index and variable DC capacitor voltage in the higher output voltage region thus avoiding harmonics in the output voltage at the terminals 3a, 3b. At least in the higher output voltage region a selection of a modulation index will also allow to reduce switching losses. In any case zero DC capacitor voltage is avoided thus allowing the taking of active power from the transmission system into the DC capacitor.

The current controller output $cc_{out}$ designates the desired terminal voltage at the compensator and the DC voltage controller will maintain the DC capacitor voltage such that the control voltage $cc_{out}$ equals the compensator terminal output voltage $u_c$ in the adjustable DC voltage region.

Second Aspect of the Invention (Rate Limiting)

According to the first aspect of the invention the avoidance of harmonics, the avoidance of zero voltages and the improvement of switching losses can be achieved by the static characteristics of the controller as shown in FIG. 22a. In other words, the DC voltage reference can be changed from minimum to maximum in an adjustable DC voltage control region and the reference voltage in the constant DC voltage region is set to a minimum value. The minimum value can be designed such that a DC voltage fluctuation due to an undershooting in a transient condition, in particular for a single phase converter without DC filter, is restricted not to cause a zero voltage.

However, in particular in the region where a constant modulation index is used, a steep change in the reference voltage $u_{DC}^{ref}$ could cause an undershoot of the DC capacitor voltage and a zero DC capacitor voltage could occur as a result of the undershoot. Such a situation is illustrated in FIG. 24a. A change of the control voltage $cc_{out}$ (horizontal axis) and hence a change of the reference voltage $u_{DC}^{ref}$ from A→B may cause (depending on the dynamic behaviour of the voltage control loop)—an undershoot such that the DC capacitor voltage $u_{DC}$ may become zero. The undershoot is a result of the steep and fast decrease of the controller voltage $cc_{out}$. This is in particular a problem in the control region where the reference voltage and thus the capacitor voltage is changed since in the lower output voltage region a constant and minimum DC capacitor voltage is anyway employed such that fluctuations in the DC voltage cause d by perturbations (or a sudden decrease of the modulation index due to a sudden decrease of the control voltage $cc_{out}$) can never result in a zero voltage.

Figure 25A:
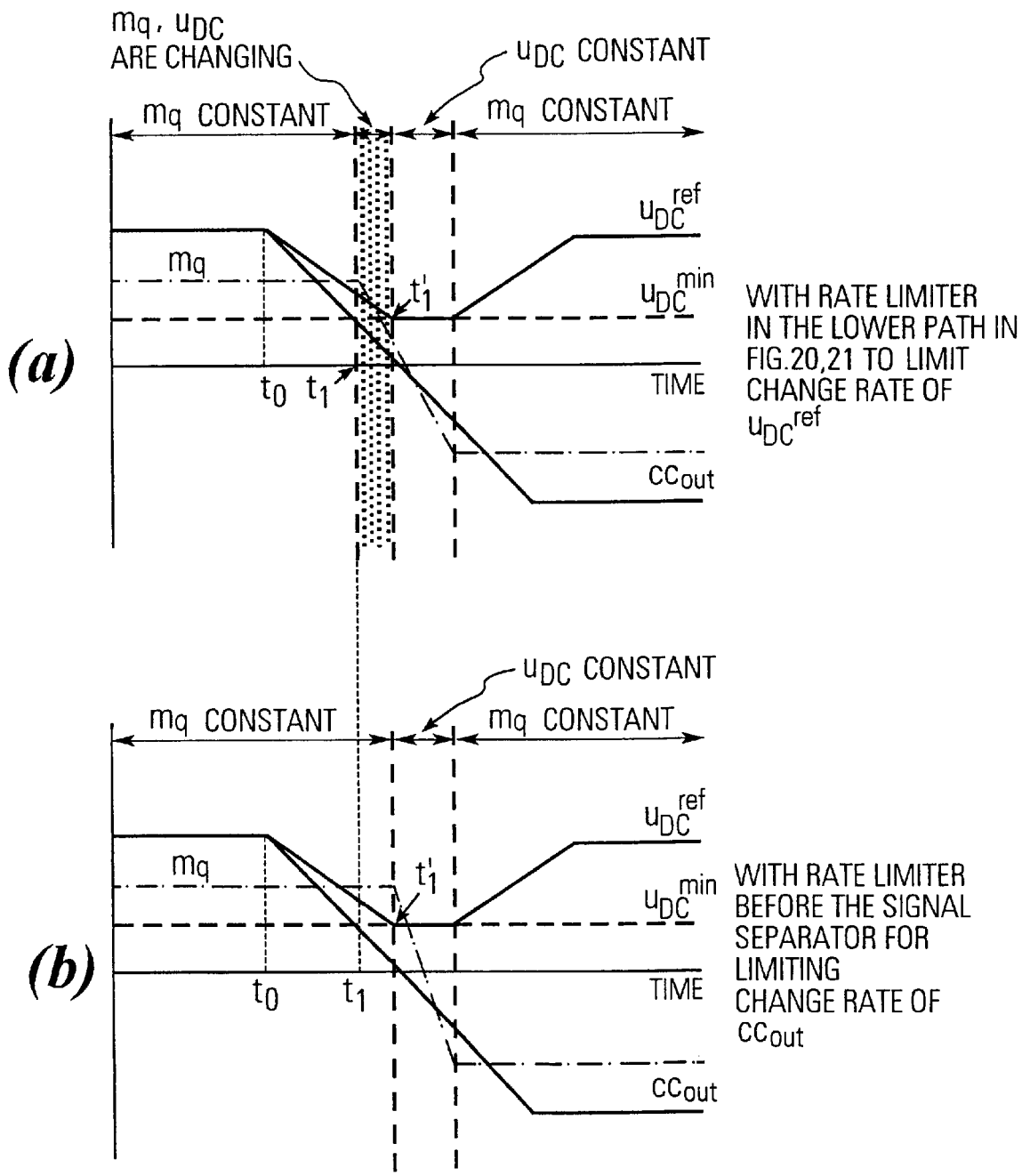
FIG. 25a shows the variation of variables over time when using the rate limiter in FIG. 23.
Figure 25B:
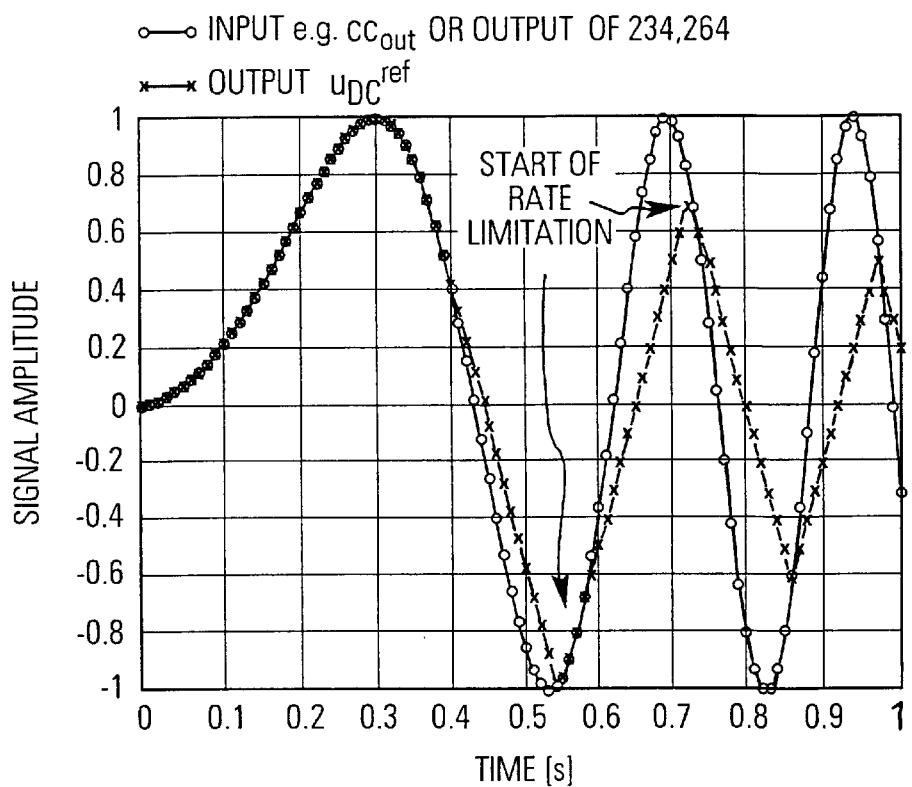
FIG. 25b shows the variation of variables over time when placing a rate limiter before the signal separator.
Figure 25C:
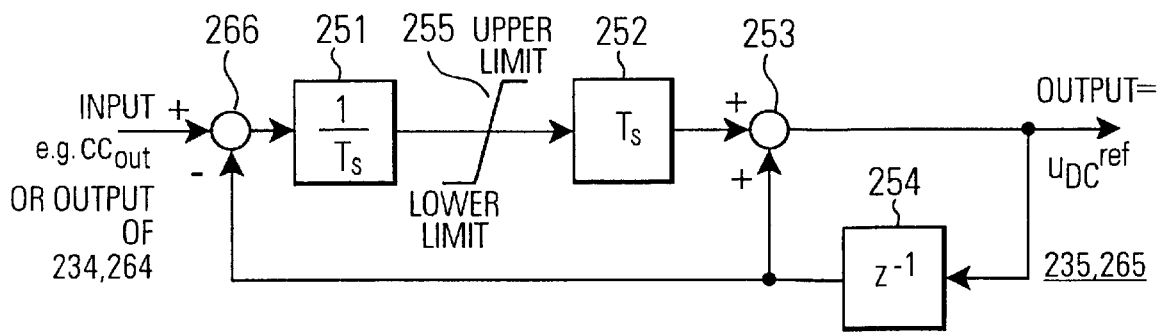
FIG. 25c shows an embodiment of the rate limiter in discrete time.

Furthermore, there is a grey zone in transient conditions from adjustable DC (constant index) to constant DC control and vice versa. In the grey zone, both the DC voltage and the modulation index $m_q$ are changed because for example in FIGS. 20, 21 the modulation index m is-not limited with respect to its change rate. To hold characteristics as in FIG. 22(a) even in transient conditions a rate limiter could be placed before the signal separator SS, that is the rate limiter could limit the change rate of the output signal $cc_{out}$ of the current controller. FIG. 25a(b) shows the time response with such limiter. In FIG. 25(a)(b) constant $m_q$ control is selected until $t_1'$ and the control method is switched instantaneously to constant $u_{DC}$ control. If the changing rate of $u_{DC}$ voltage is limited for a safe operation and the two control methods are just switched between each other, then, as shown in FIG. 25(a)(b) the resulting terminal voltage is not proportional to the desired signal $cc_{out}$, because the $u_{DC}$ voltage does not follow the desired signal and the modulation index still keeps constant between $t_0$ to $t_1'$.

Actually, the $m_q$ modulation index should start changing earlier such that the resulting terminal voltage is proportional to the desired signal $cc_{out}$.

For example, if both sources in the transmission line have constant voltage and phase, the current amplitude is mainly proportional to the voltage $u_1$ over the inductance of the simplified transmission line. The compensator can change the voltage $u_l$ by injecting a compensating voltage $u_c$. The change of the current amplitude $cc_{out}$ is therefore proportional to the amplitude of the injected voltage. This means, that the output voltage $cc_{out}$ of the current controller is desired to have a linear relationship with the injection voltage $u_c$. If the output of the current controller is proportional to the compensation voltage, the controller can operate linearity. For example, if a required change of the current amplitude is too times higher, the current controller should simply change its output $cc_{out}$ to twice the previous value since the current amplitude is proportional to ((overhead voltage $u_x$)–(injected voltage $u_c$)).

In the constant DC voltage control region ($u_c \geq u_{cth}$) the q-axis modulation index $m_q$ is proportional to the injection voltage $u_c$. Thus, the current controller can operate in an ideal way if the controller output $cc_{out}$ is used as the modulation index. In the adjustable DC voltage the output is thus proportional to the injection voltage if the output $cc_{out}$ of the current controller is used as the DC voltage reference.

However, as explained above and shown in FIG. 25$a(b)$ the modulation index $m_q$ still keeps constant and the $u_{DC}$ voltage does not follow the desired output signal $cc_{out}$ if the rate limiter is placed before the signal separator. Thus, it would be desirable if the q-axis modulation index $m_q$ would start changing earlier and would not be kept constant between $t_0$ to $t_1'$.

According to the second aspect of the invention a rate limiter is used for limiting a rate change in the voltage reference $u_{DC}^{ref}$ to a predetermined change rate. The rate limiter is placed in the lower path in FIGS. 20, 21 before the output of $u_{DC}^{ref}$ to only limit the change rate in the reference signal $u_{DC}^{ref}$. The operation of the rate limiter is shown in FIG. 25$a(a)$. That is, if the rate limiter is placed for limiting the change rate of the $u_{DC}$ voltage reference, the modulation index $m_q$ starts to go down earlier at t1. Although again the voltage reference $u_{DC}^{ref}$ does not follow the desired signal $cc_{out}$ directly, the output terminal voltage is controlled closer to the desired signal than the result in FIG. 25($a$) ($b$) since the modulation index $m_q$ starts changing in advance. Therefore, the grey zone in FIG. 25($a$) ($a$) has the effect to recover the transient performance better and the earlier changing of the modulation index $m_q$ compensates the slower change of $u_{DC}$ voltage. Thus, the rate limiter is effective for a safe operation in constant $m_q$ operation, but degrades the transient performance. However, the placing of the rate limiter only at the voltage reference $u_{DC}^{ref}$, that is, breaking characteristics of FIG. 22($a$) in the transient condition, helps recovery of the transient performance.

FIG. 25$c$ shows an actual implementation of a discrete-time rate limiter where Ts is a sampling period and $z^{-1}$ is a unit-sample delay. The rate limiter in FIG. 25$c$ comprises a first adder 266 having a first input for receiving the input signal, i.e. $cc_{out}$ or the output of the units 234, 264 shown in FIGS. 20, 21, a second input and an output for subtracting from the input the signal applied to the second input. A first divider 251 divides the output of the first adder 266 by the predetermined sampling period $T_s$. A third limiter 55 limits the output of the first divider 255 to an upper limit or a lower limit if the output respectively exceeds the upper limit or the lower limit. Thus, the third limiter is actually the circuit that restricts the change rate of the input signal. A third multiplier 252 multiplies the output of the third limiter 255 by the predetermined sampling time $T_s$. A second adder 253 having an input receiving the output of the third multiplier 252, a second input and an output constituting the output of the rate limiter is provided. The unit 254 is (in discrete sampling time) a unit-sample delay unit for shifting the output of the rate limiter to one sampling time. The output of the $z^{-1}$ circuit 254 is applied to the second input of the first adder 266 and a second input of the second adder 253. If the input is a time discrete signal as shown in FIG. 25$b$, the output will be the discrete time signal also shown in FIG. 25$b$.

THIRD EMBODIMENT

Figure 23:
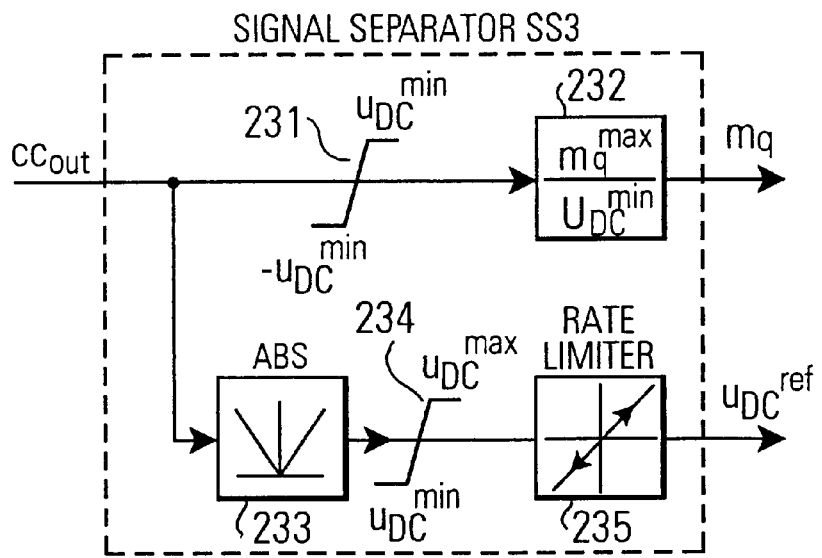
FIG. 23 shows a third embodiment of the signal separator, in particular a rate limiter according to the second aspect of the invention for avoiding zero voltages in transient conditions.

A third embodiment of the signal separator SS3 incorporating such a rate limiter is shown is FIG. 23. The rate limiter 235 is provided in the lower path (responsible for the DC capacitor voltage adjustable control region). It may be arranged before the limiter 234 or after the limiter 234. In FIG. 23 the units 231, 232, 233 and 234 correspond to the units 200, 201, 202, 203 of the first embodiment in FIG. 20. The arrangement of the rate limiter 235 after the limiter 234 is preferable, because it avoids a rise-up delay from constant DC voltage to adjustable DC voltage.

FOURTH EMBODIMENT

Figure 26:
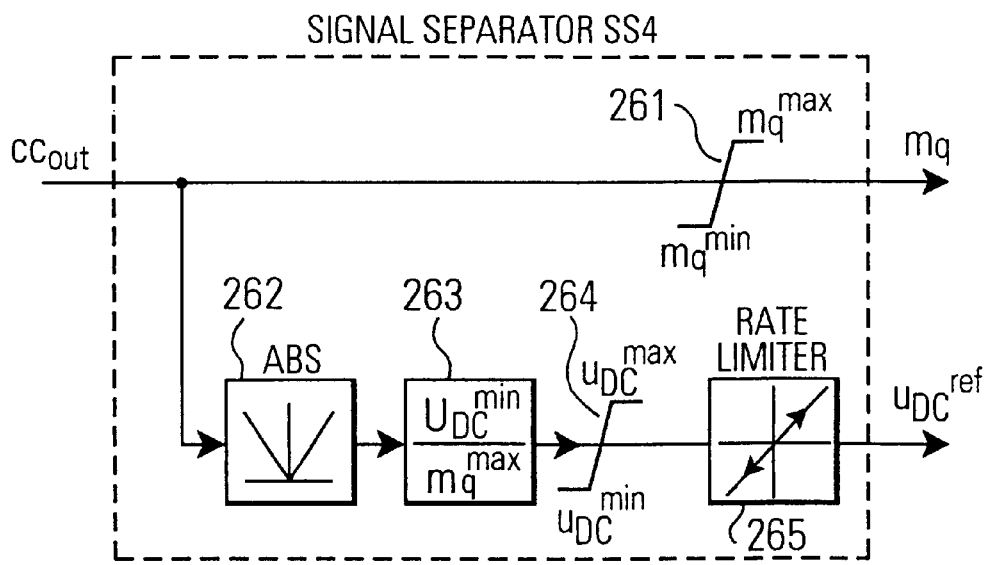
FIG. 26 shows a fourth embodiment of the signal separator in accordance with the second aspect of the invention.

A signal separator SS4 according to another embodiment incorporating a rate limiter 265 is shown in FIG. 26. In FIG. 26 the units 261, 262, 263 and 264 correspond to the units 211, 213, 212, 214 in FIG. 21 and therefore further explanation is omitted. As can be seen in FIG. 26, the rate limiter 265 is arranged after the limiter 264 in order to avoid a rise-up delay from a constant DC voltage to adjustable DC voltage control. However, the rate limiter 265 may be arranged before the limiter 264.

The multiplication constant K2 is determined by the ratio of the lower threshold voltage $u_{DC}^{min}$ divided by the maximum modulation index $m_q^{max}$ as used in the limiter 261 in the upper signal path.

The arrangements of the limiters in FIGS. 23, 26 allow to achieve the desired operation in the transient condition in FIG. 25$a(b)$.

Third Aspect of the Invention (Decoupling Control)

As explained above, the usage of a rate limiter avoids a steep reference drop in the signal separator in transient conditions. The rate limiter is configured in the path of the DC voltage reference to achieve the desired behaviour as shown in FIG. 25$a(b)$ in the transient operation. Whilst the rate limiter is arranged in the lower signal path or constant DC voltage control, it has no effect inside this constant DC voltage control. The rate limiter is applied for save operation in the transient conditions. Thus, if the current controller output $cc_{out}$ has a step change, the DC voltage reference changes slowly due to the rate limiter and the q-axis modulation index remains at the maximum value in this case. Thus, the rate limiter restricts the rate of the reference voltage to avoid a steep drop of the DC voltage to zero in transient conditions, especially at a sudden change of the current reference. For this purpose, it is preferable to select different values for the positive and negative rate of the rate limiter. Preferably, the negative rate is selected slower than the positive rate. That is, the rate limitation for the positive rate change is larger—in absolute value—than the rate change allowed for changes in the negative direction.

If the DC voltage reference is not proportional to $cc_{out}$ in transient conditions as is the case with the rate limiter in FIGS. 23, 26, the compensator output terminal voltage is also not proportional to it. As a consequence, whilst conditions are improved in transient conditions between variable DC voltage and constant DC voltage control, the transient performance of the control within the DC constant voltage control region is degraded.

Figure 25D:
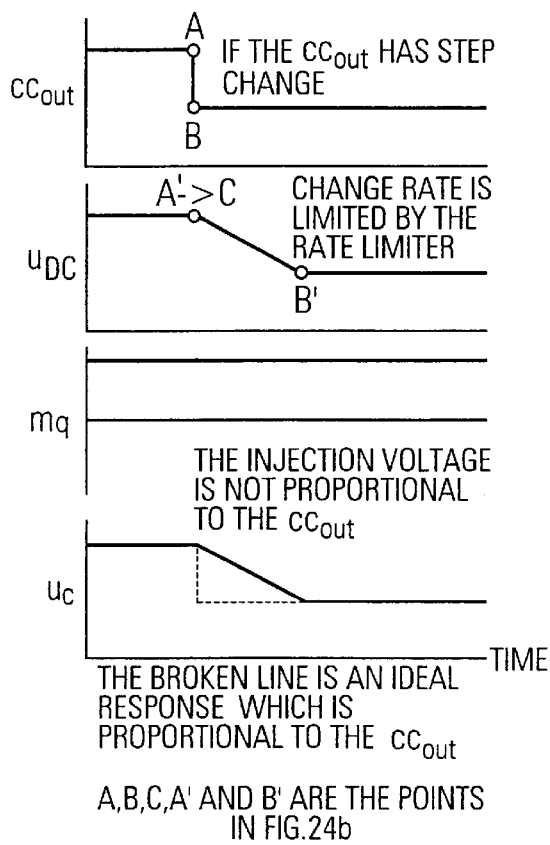
FIG. 25d shows the effects of the rate limiter similar as in FIG. 24.

As shown in FIGS. 24b and 25d, if the control voltage $cc_{out}$ has a step change, for example from point A to point B in FIG. 24a, then the DC voltage reference $u_{DC}^{ref}$ does not instantaneously change due to the rate limiting function. Therefore, the control trajectory first moves into a horizontal direction from A' to C as shown in FIG. 24b. Then the control trajectory moves down to the steady state point B'. However, the desired control trajectory in the constant DC voltage control region is a direct path from A' to B'. Of course, the fact that an operation is out of the desired control trajectory, can also happen without the rate limiter when the DC voltage does not follow its reference due to a slow response behaviour. However, of course the provision of the rate limiter enhances this problem.

As shown in the bottom graph in FIG. 25d, the result of the introduction of the rate limiter is that the injection voltage $u_c$ is not proportional to the control voltage $cc_{out}$ —even in the control region where only the variable DC capacitor control is used. The dashed line indicates the ideal response which is still proportional to the control voltage $cc_{out}$ despite the provision of the rate limiter.

Figure 16:
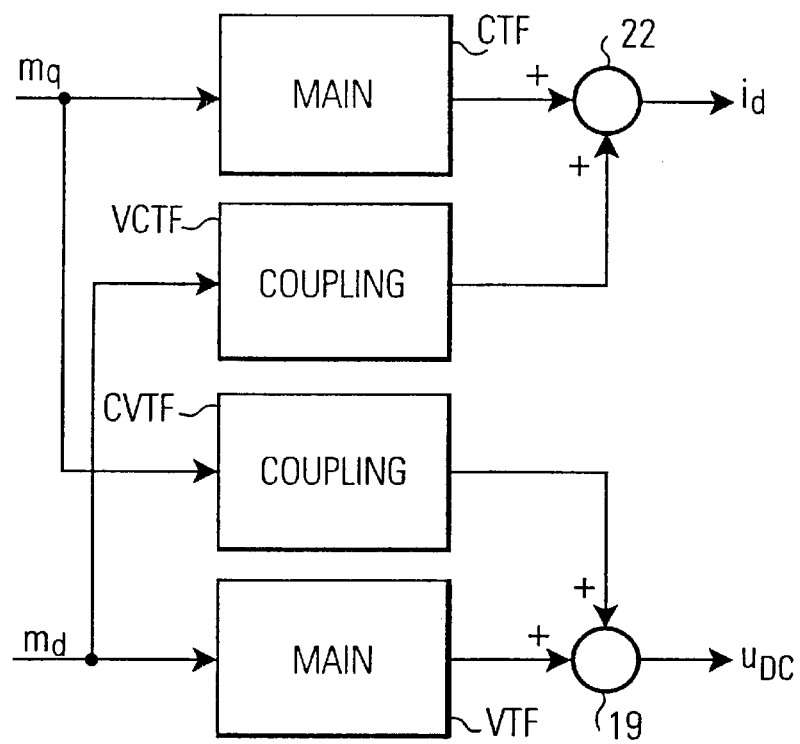
FIG. 16 shows a summary diagram of the coupling effects shown in FIG. 10.

As explained above, independently as to whether or not the rate limiter is provided the reason why the injection voltage $u_c$ does not directly follow the current control voltage $cc_{out}$ is due to the fact that the current and voltage control loops are coupled as shown in FIG. 16. Therefore, hereinafter it will be explained with reference to FIGS. 27–32 how the voltage and current control loops can be decoupled. As shown with FIG. 33a and FIG. 33b the signal separator SS can be used in connection with such a decoupling control means 25. In this case, the signal separator SS may or may not contain the rate limiter. However, in particular if the rate limiter is used this further deteriorates the response behaviour of the control loops and the use of the decoupling control will be particularly advantageous.

As already explained with reference to FIGS. 10, 16, two main control loops for the current and the voltage have a cross-coupling in the prior art, such that the decoupling control is required for an accurate control. The present invention according to a third aspect provides such a decoupling control and the principle thereof is based on a direct compensation which is based on non-linear differential equations.

Figure 10:
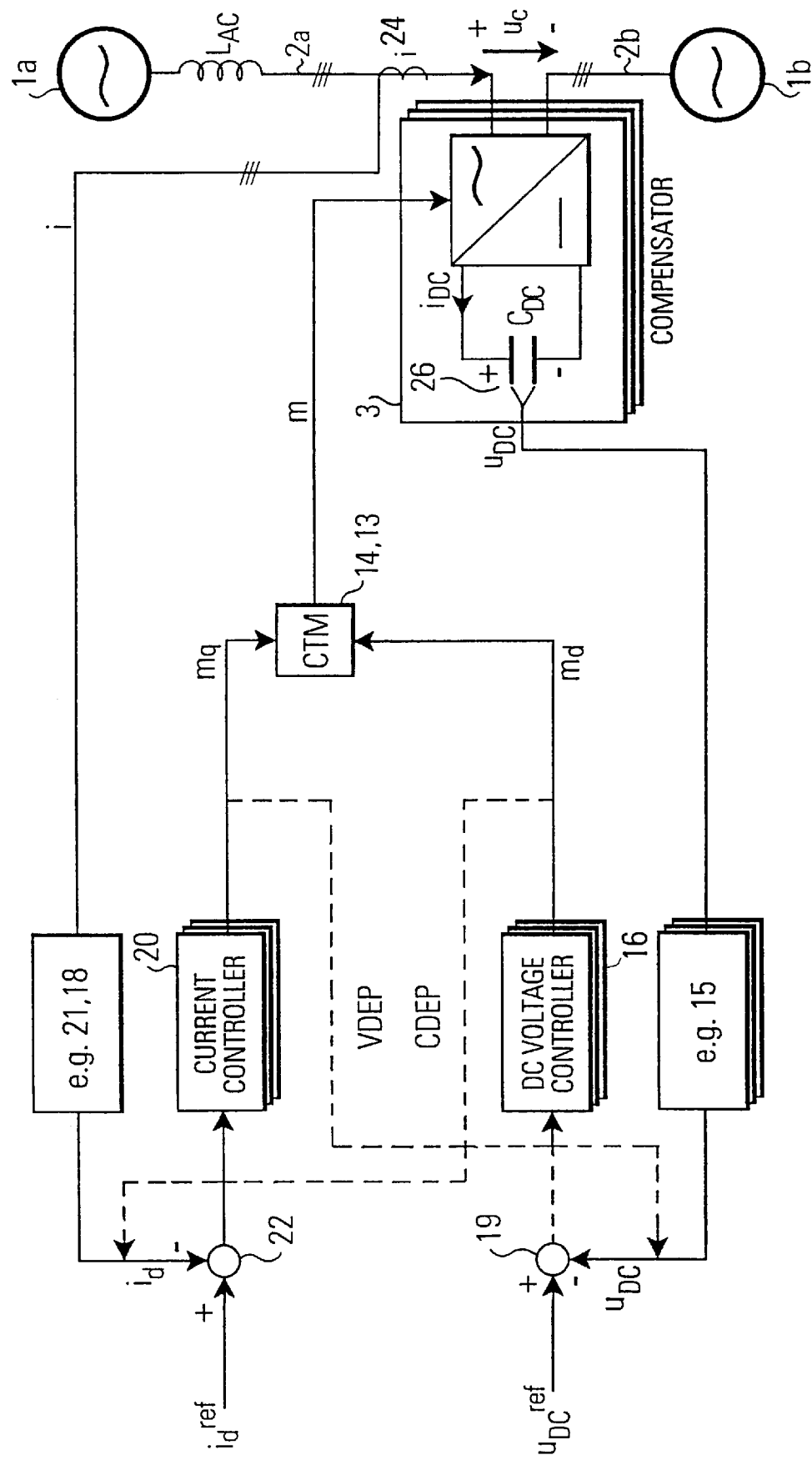
FIG. 10 an overview diagram of the coupling effects in the controllers of FIG. 8, FIG. 9.
Figure 27A:
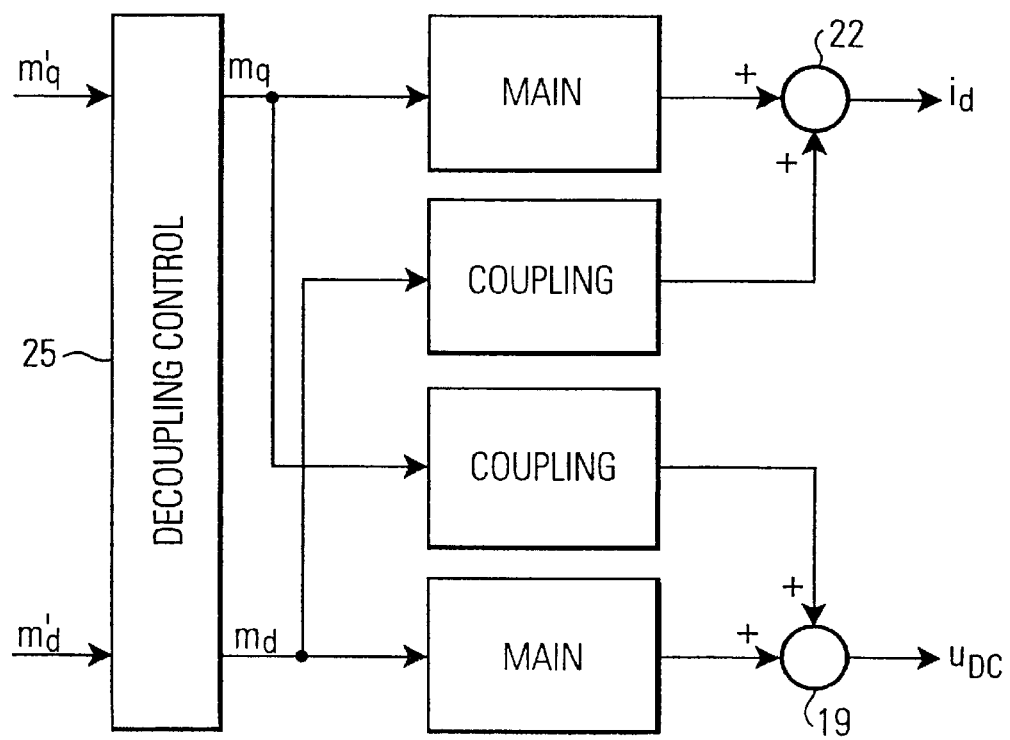
FIG. 27a shows a third aspect of the inventive controller according to the second aspect, in particular including a decoupling control means upstream of the coupling unit illustrated in FIG. 16.
Figure 27B:
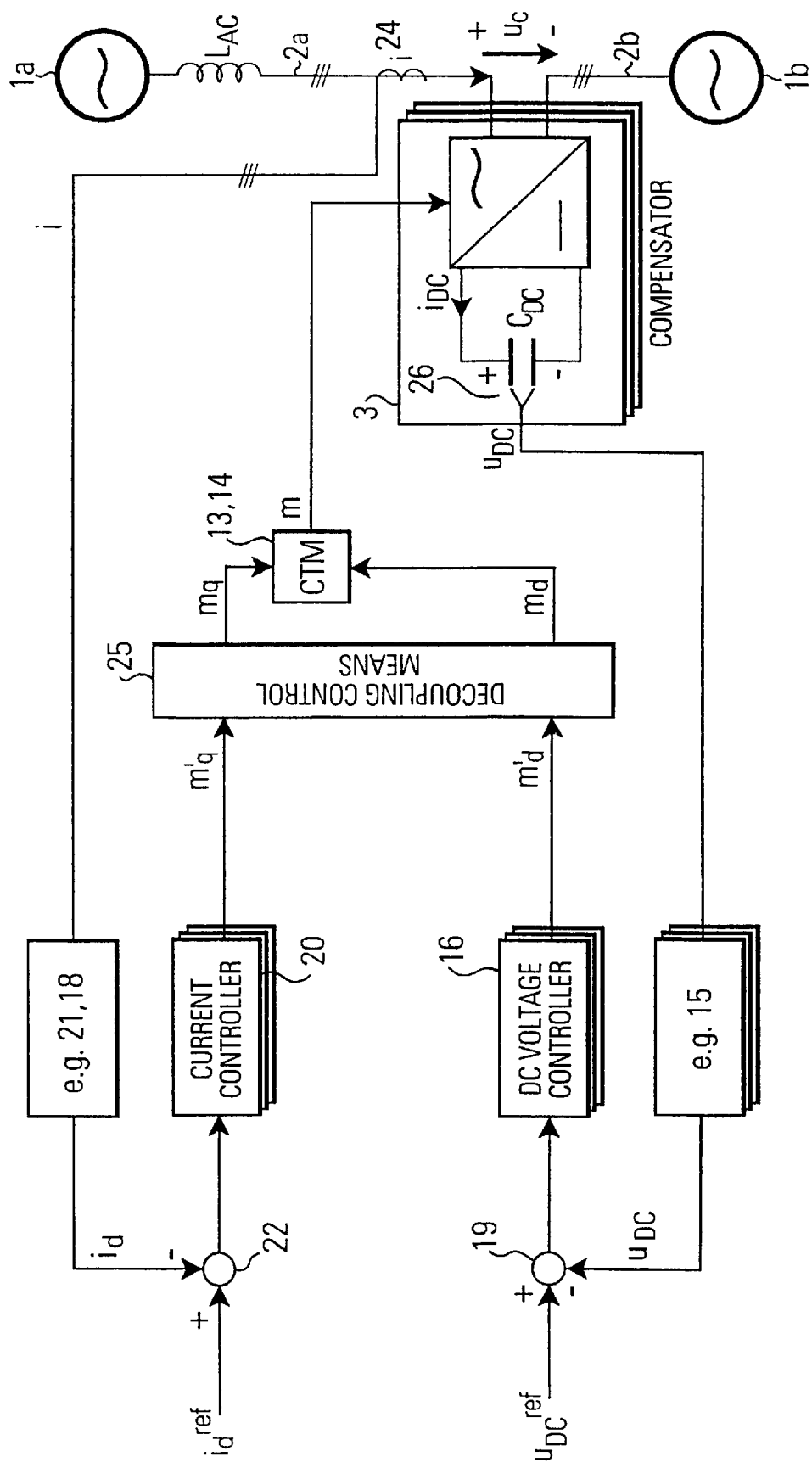
Figure 27C:
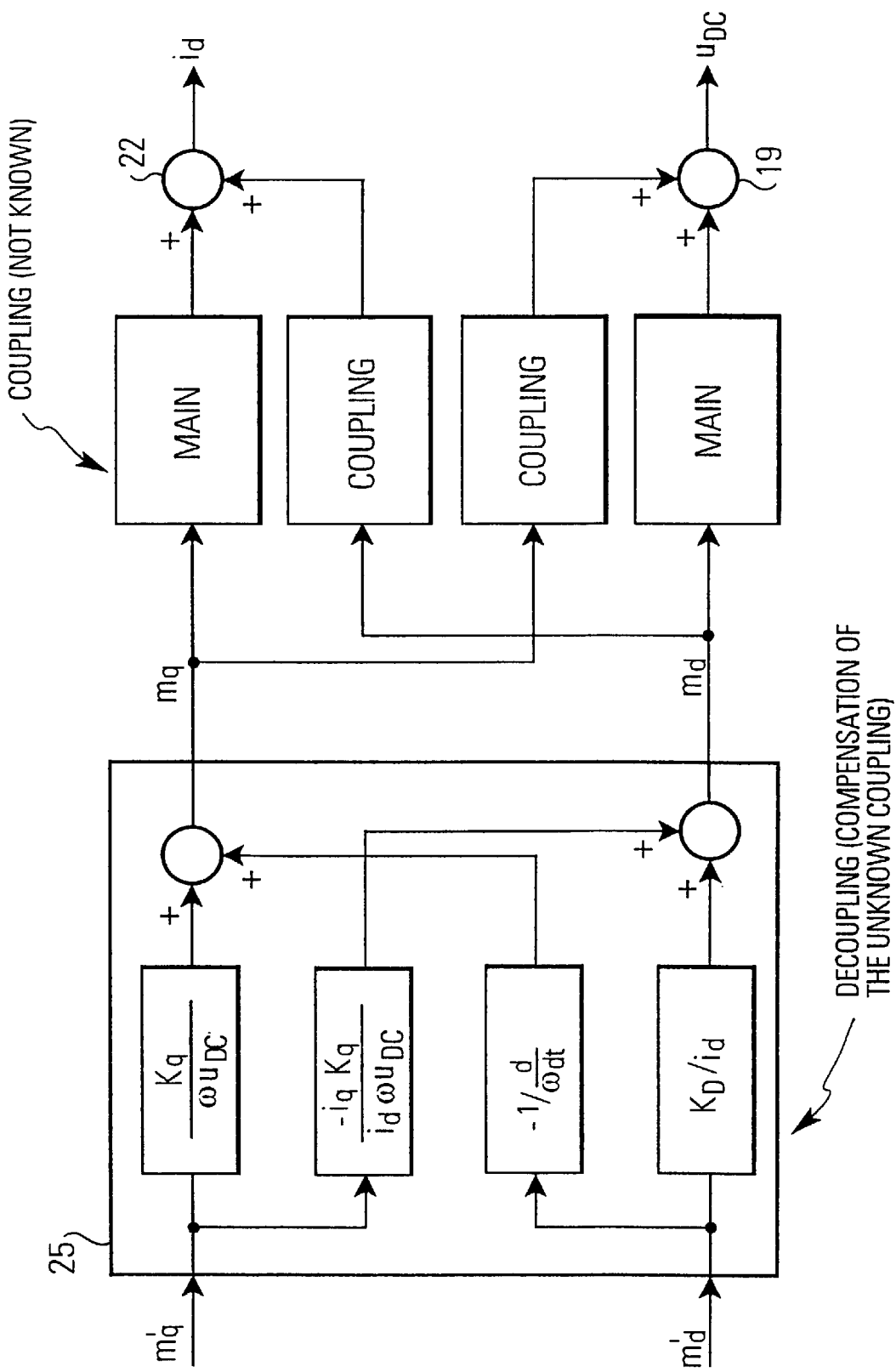
FIG. 27c shows the decoupling performed according to an approximation of the non-linear differential equation.

Before coming to a detailed derivation of how the coupled differential equations can be decoupled, some general considerations are made with respect to FIGS. 27a, 27b when compared with FIG. 10 and FIG. 16.

FIG. 27b shows the third aspect of principle block diagram of a controller according to the invention. As shown in FIG. 27b, the inventive controller comprises a current detector 24 and a current control loop formed by the feedback path 21, 18 and the forward path including the current controller 20. Similarly, a voltage control loop comprises the voltage detector 26, the feedback path 15 and a forward path comprising the DC voltage controller 16. By setting desired values for the reference current value $i_d^{ref}$ and the reference voltage $u_{Dc}^{ref}$ the line current i and the voltage $u_c$ can be adjusted via the modulation signal m, as was explained above with reference to FIGS. 5, 6, 7.

However, as shown in FIG. 27b, the inventive controller comprises a decoupling control means 25 downstream of the current controller 20 and the DC voltage controller 16. The decoupling control means 25 outputs a first modulation control signal mq for controlling the line AC current i and a second modulation control signal $m_d$ for controlling the compensator output voltage.

The first and second control signals $m_q$, $m_d$ are selected such that a change in the first control signal $m_q$ will not influence the DC control voltage $u_{DC}$, i.e. such that the capacitor voltage $u_{DC}$ is independent of the control signal $m_u$ output by the current controller 20. Similarly, the second control signal $m_d$ is selected such that it does not influence the line current, i.e. the line current i is independent from the second control signal $m_d$. Therefore, although only one modulation signal m is applied to the compensator (a complex signal having a predetermined amplitude and phase), a change of $i_d^{ref}$ will only alter the amplitude of the line current and a change in $u_{DC}^{ref}$ will only alter the DC capacitor voltage $u_{DC}$ and hence only the output voltage $u_c$ of the compensator. Therefore, current and voltage can be adjusted independently in the inventive controller due to the use of the decoupling control means 25. That is, in the inventive controller the current control loop operates independently of the voltage control loop.

Essentially, as seen by a comparison between FIG. 16 and FIG. 27a, the decoupling control means 25 must perform some kind of inverse operation such that the coupling effects due to the current transfer function block CTF, the voltage transfer function block VTF, the voltage current transfer block VCTF and the current voltage transfer function block CVTF are canceled. That is, if the current controller 20 and the voltage controller 16 operate as in the conventional system in FIG. 10, then the decoupling control means 25 will output some kind of predestorted modulation indices $m_q'$, $m_d'$ which—when transferred through the blocks CTF, VCTF, CVTF, VTF will precisely cancel the effects of these blocks. In particular, the decoupling control means 25 allows to get rid of the cross-coupling blocks VCTF, CVTF which cause the coupling of the current control loop and the voltage control loop.

Hereinafter, one example is given how a decoupling control means 25 can be preferably built on the basis of approximated non-linear differential equations. However, it should be noted that it is also possible to derive such a decoupling control means 25 on the basis of transfer functions of a linearized system. The direct compensation based on non-linear differential equations has the advantage that the operating point can be compensated directly and that it is only dependent on a few system parameters. It also has the advantage that only currents and voltages need to be measured and fed to the controller. Thus, the non-linear differential equation approach is the preferable approach with a wide range operation and possibilities of which most of the state variables can be measured.

To derive the relevant differential equations for the decoupling control the AC current equation has to be derived. This can be done by taking the derivative of equation (2.12) with respect to time which leads to the following equation:

$$L_{AC} \frac{d^2 i_d}{dt^2} = -R_{AC} \frac{di_d}{dt} + \frac{d\omega}{dt} L_{AC} i_q + \omega L_{AC} \frac{di_q}{dt} + \frac{du_{xd}}{dt} - \frac{dm_d}{dt} u_{DC} - m_d \frac{du_{DC}}{dt} \quad (4.1)$$

Using equations (2.13) and (2.16) the full differential equation for the line current—split in the $i_d$ and $i_q$ components—can be derived as follows:

$$L_{AC}\frac{d^2 i_d}{dt^2} + R_{AC}\frac{di_d}{dt} + \omega^2 L_{AC} i_d = \qquad (4.2)$$

$$-\left(\omega u_{DC} + \frac{m_d i_q}{2C_{DC}}\right)m_d - \frac{m_d^2}{2C_{DC}}i_q + \left(\frac{d\omega}{dt}L_{AC} - \omega R_{AC}\right)i_q -$$

$$\frac{dm_d}{dt}u_{DC} + \left(\frac{G_{DC} u_{DC}}{C_{DC}} - \frac{\Delta \tilde{i}_{DC}}{C_{DC}}\right)m_d + \omega u_{xq} + \frac{du_{xd}}{dt}$$

In equation (4.2) the expression in brackets before $m_q$ is the input to control the AC current $i_d$ and the expressions multiplied with $m_d$ or the derivative of $m_d$ are the coupling terms. The terms multiplied with the AC voltage components can be considered as disturbances. Comparing equation (4.2) with FIG. 11, it can be seen that the time derivative $dm_d/dt$ is the main transient coupling block VCTF and $\omega u_{DC}$ in the expression multiplied with $m_q$ is the influence of changing operation point. For a simplification, the DC current fluctuation $\Delta i_{DC}$ can be ignored, because usually the frequency of the fluctuation is much higher than the bandwidth of the controller. In addition, disturbances can be controlled by feedback or feedforward loops and frequency varying is regarded only a small influence by comparison to the coupling. Therefore, equations (4.2) and (2.16) can be approximated as follows:

$$L_{AC}\frac{d^2 i_d}{dt^2} + R_{AC}\frac{di_d}{dt} + \omega^2 L_{AC} i_d = -\left(\omega u_{DC} + \frac{m_d i_q}{2C_{DC}}\right)m_q - \qquad (4.3)$$

$$\frac{m_d^2}{2C_{DC}}i_d - \omega R_{AC} i_q - \frac{dm_d}{dt}u_{DC} + \frac{G_{DC} u_{DC}}{C_{DC}}m_d$$

$$C_{DC}\frac{du_{DC}}{dt} + G_{DC} u_{DC} = \frac{1}{2}(m_d i_d + m_q i_q) \qquad (4.4)$$

These two equations (4.3), (4.4) completely describe the dynamic behaviour of the coupling of the two control loops. According to the invention, modulation indices $m_q$, $m_d$ should be selected such that the current control loop becomes independent from the voltage control loop, i.e. that the AC current amplitude and the DC voltage can be controlled independently. This requirement can be expressed mathematically as follows:

$$L_{AC}\frac{d^2 i_d}{dt^2} + R_{AC}\frac{di_d}{dt} + \omega^2 L_{AC} i_d = -K_q m'_q \qquad (4.5)$$

$$C_{DC}\frac{du_{DC}}{dt} + G_{DC} u_{DC} = \frac{1}{2}K_d m'_d \qquad (4.6)$$

In these two equations (4.5), (4.6) it can simply be requested that $K_d$ and $K_q$ are constants, $m_d'$ and $m_q'$ are the new control signal inputs (or modulation indices) for the current amplitude control and the DC voltage control. Indeed, a perfect decoupling would be achieved if the system can be designed according to equations (4.5) and (4.6) as long as the compensator operates inside its limits. Comparing equations (4.3)—equations (4.5) and equations (4.4)—(4.6), $m_d$ and $m_q$ should satisfy the following equations:

$$K_q m'_q = \left(\omega u_{DC} + \frac{m_d i_q}{2C_{DC}}\right)m_q + \qquad (4.7)$$

$$\frac{m_d^2}{2C_{DC}}i_d + \omega R_{AC} i_q + \frac{dm_d}{dt}u_{DC} - \frac{G_{DC} u_{DC}}{C_{DC}}m_d$$

These equations can be solved for $m_d$ and $m_q$ as a function of $m_d'$, $m_q'$ as follows:

$$m_d = \frac{\omega R_{AC} i_q^2 + \omega u_{DC} K_d m'_d + \left(u_{DC}\frac{dm_d}{dt} - K_q m'_q\right)i_q}{\omega i_d u_{DC} + \frac{1}{C_{DC}}\left(G_{DC} u_{DC} - \frac{K_d m'_d}{2}\right)i_q} \qquad (4.9)$$

$$\frac{1}{C_{DC}}\left(G_{DC} u_{DC} - \frac{K_d m'_d}{2}\right)K_d m'_d - \qquad (4.10)$$

$$m_q = \frac{\left(\omega R_{AC} i_q + u_{DC}\frac{dm_d}{dt} - K_q m'_q\right)i_q}{\omega i_d u_{DC} + \frac{1}{C_{DC}}\left(G_{DC} u_{DC} - \frac{K_d m'_d}{2}\right)i_q}$$

Of course it is not possible to technically realize equation (4.9) in the controller directly, because there is an additional time dependent derivative of $m_d$. Even though equation (4.9) can be considered as a non-linear differential equation of $m_d$ it is not possible to realize this equation in an on-line controller because the coefficient of the derivative is $i_q$ which takes positive or negative values around zero. In any case, the time derivative of $m_d$ in equation (4.9) can be ignored such that the modulation $m_d$ can be calculated as follows:

$$m_d = \frac{\omega R_{AC} i_q^2 + \omega u_{DC} K_d m'_d - i_q K_q m'_q}{\omega i_d u_{DC} + \frac{1}{C_{DC}}\left(G_{DC} u_{DC} - \frac{K_d m'_d}{2}\right)i_q} \qquad (4.11)$$

However, with equation (4.11) and (4.10) a perfect decoupling control can not be realized since these equations still depend on the circuit parameters such as resistance, inductance and capacitance. In equation (4.10) the main coupling is still the time derivative of $m_d$. Moreover, the q-axis component $i_q$ of the current is kept zero by the reference frame detection (essentially the unit 17 makes $i_q$=0). $m_d'$ is usually small and the resistance and the conductance are also negligible. Therefore, $R_{AC}$=0 and $G_{DC}$=0 can be assumed in equations (4.10) and (4.11), leading to the following two equations (4.12), (4.13):

$$m_d = \frac{\omega u_{DC} K_d m'_d - i_q K_q m'_q}{\omega i_d u_{DC} - \frac{K_d m'_d}{2C_{DC}} i_q} \qquad (4.12)$$

$$m_q = \frac{-\frac{(K_d m'_d)^2}{2C_{DC}} - \left(u_{DC}\frac{dm_d}{dt} - K_q m'_q\right)i_d}{\omega i_d u_{DC} - \frac{K_d m'_d}{2C_{DC}} i_q} \qquad (4.13)$$

Now the decoupling control using equations (4.12), (4.13) with the simplification only depends on one system parameter $C_{DC}$ and this is much easier to realize then the more complicated equation. A further simplification can be made in equations (4.12), (4.13), namely neglecting $m_d'$, $i_q$ (because $m_d'$ is small and $i_q$ can be kept zero-by the reference frame detection) and $m'^2_d$ (since $m_d$ is small), equations (4.12) and (4.13) yield the following final equations for the decoupling controls:

$$m_d = \frac{1}{i_d}\left(K_d m'_d - \frac{i_q K_q m'_q}{\omega u_{DC}}\right) \quad (4.14)$$

$$m_q = \frac{K_q m'_q}{\omega u_{DC}} - \frac{1}{\omega}\frac{dm_d}{dt} \quad (4.15)$$

Since the reference frame detection is performed, $i_q=0$ in equation (4.14) (due to the unit 17) and the constant and real value $K_d$ and $K_q$ can be assumed to be part of the $m_d'$, $m_q'$ values (they only represent a further constant in the current and voltage control loops). Therefore, the following final set of decoupled equations can be used for the decoupling control means 25, namely:

$$m_d = \frac{1}{i_d}(K_d m'_d) \quad (4.16)$$

$$m_q = \frac{K_q m'_q}{\omega u_{DC}} - \frac{1}{\omega}\frac{dm_d}{dt} \quad (4.17)$$

Selecting $m_d$ and $m_q$ in accordance with the equation (4.16), (4.17) the current control and voltage control can be carried out independently as required by equation (4.5), (4.6). As shown in FIG. 13c, the coupling downstream of the means 25 is compensated by the decoupling according to equations (4.14), (4.15).

Hereinafter, a special embodiment of the decoupling means 25 as shown in FIG. 13c using a linearization and the three-phase system already discussed with reference to FIG. 9.

FIFTH EMBODIMENT (3-PHASE SYSTEM WITH VOLTAGE PLL)

FIG. 28 shows the controller according to FIG. 9 (i.e. including an AC voltage detector 23, a voltage PLL phase detector 18 and the phase rotation means 17) but also including—according to the fifth embodiment of the invention—a decoupling control means 25. As can be detected from the equations (4.14)–(4.17), the decoupling control means 25 receives the output (modulation index) $m_q'$ of the current controller 20, the DC capacitor voltage $u_{DC}$, the current amplitude $i_d$, the line frequency ωand the output $m_d'$ of the DC voltage controller 16. For a three-phase system the decoupling control means 25, the compensator 3, the 2f-filter 15 and the DC voltage controller 16 is provided three times. The other units in FIG. 28, i.e. the current detector 24, the current amplitude and phase detection units 21, 18, the capacitor voltage detector 26, the mean voltage detector 15, the reference phase generation unit 17 (keeping $i_q$ in the control system 0), the reference frame detection 18, the coordinate transformation 19, the DC ripple compensation unit 13 and the voltage phase detector 23 correspond to those units already described in FIG. 9.

It should be noted that the resulting AC current and output voltage of the compensator without the DC voltage fluctuation means 13 and the 2f filter 15 include some harmonics, however, the decoupling control is effective even without these units. These units can preferably used in certain applications to suppress the harmonics. For example, if the capacitance of the DC capacitor is large enough to suppress the fluctuation then no additional units are needed. Alternatively, if the 2f filter (e.g. an LC filter) is configured with the DC capacitor in parallel in the DC circuit of the compensator 3, the units 13, 15 are again not needed. The latter solution is practically a realistic solution for the transformerless series compensator.

It can be seen from FIG. 28 that there is no input of $i_q$ to the decoupling control means 25 despite the equations (4.14), (4.15) (as illustrated in FIG. 13c) comprise one term—$i_q K_q m_q'/\omega u_{DC}$. As explained above, in the inventive controller the q-axis component $i_q$ of the current is kept zero by the reference frame detection in the three-phase-polar transformation means 21. Therefore, it is justified to rewrite the equations (4.14), (4.15) into equations (4.16), (4.17) for describing the embodiment of the decoupling means 25 in FIG. 28.

All factors in equations (4.16), (4.17) with the exception of the time derivative can be realized by hardware multipliers and dividers. However, the time derivative can have a very high gain in high frequency conditions and thus $dm_d/dt$ in equation (4.17) is difficult to realize with hardware such as operation amplifiers or microprocessors. However, as will be seen below with the special embodiment of the decoupling control means 25 in FIG. 29, the time derivative can be handled by means of a filter with a small time constant. The precise construction of an embodiment of the decoupling control means 25 is shown in FIG. 29.

Figure 29:
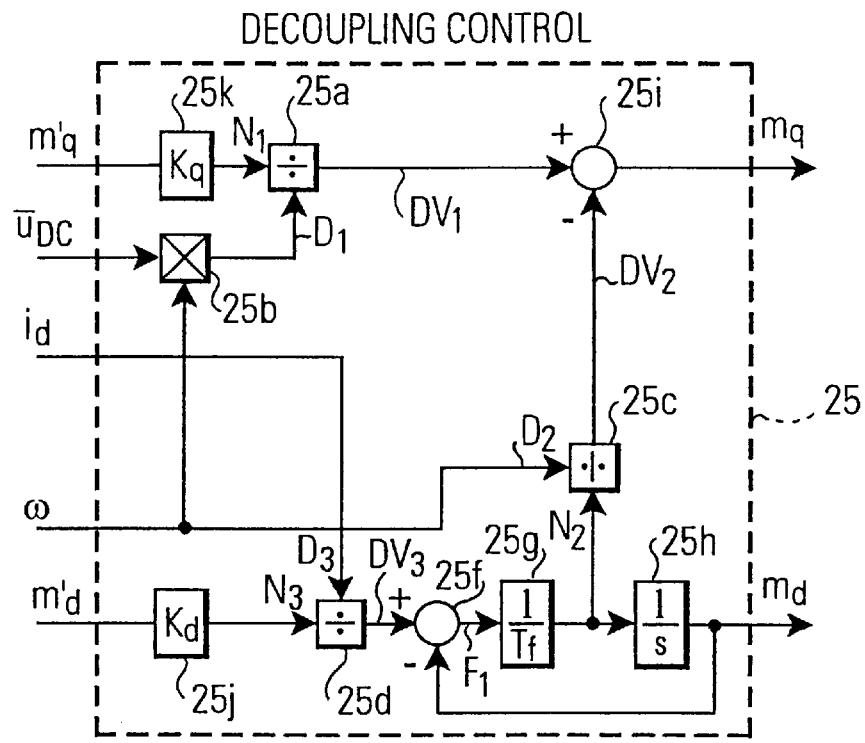
FIG. 29 shows a detailed block diagram of the decoupling control means according to an embodiment of the invention.

In FIG. 29 the output $m_d'$ is multiplied with the constant $K_d$ in the multiplier 25j. Of course, it should be understood that the equations (4.16), (4.17) can be rescaled such that $K_d$ is 1 such that the additional multiplier 25j is not necessarily needed, i.e. $K_d$ can be unity. Likewise, the output $m_q'$ of the current controller is multiplied with the constant $K_q$ in the multiplier 25k ($K_q$ can also be unity due to a normalization). The multiplied signal N1 forms the nominator of the first divider 25a. The detected DC voltage $u_{DC}$ is multiplied by the reference frame frequency ω in the multiplier 25b. The multiplied signal $D_1$ is the denominator used for the division in the divider 25a. The output DV1 of the first inverter is supplied to an adder 25i. The line frequency ω is the denominator for the division in the second divider 25c and a signal $N_2$ output from the filter is the nominator of the second divider 25c. The multiplied signal DV2 is applied as inverted input to the adder 25i.

The multiplied output $N_3$ (=$m_d' K_d$) is applied as the nominator signal $N_3$ to a third divider. The denominator of the divider 25d is the d-axis current component $i_d$. The output DV3 of the third divider is applied to a second adder 25f which receives the output signal of the integration unit 25h in an inverted manner. The output of the second adder 25f is supplied to the $dm_D/dt$ feedback circuit 25f, 25g and 25h. The units 25g, 25h, 25f are needed in order to determine the second term in equation (4.7).

Since the main loop of the capacitance voltage control is designed to a limited band width in its frequency characteristics, placing a filter 25f with a small time constant in the main loop does not affect the characteristics of the main loop. The integrator 25h, the gain 25g and the subtractor 25f act together as filter and the input of the filter is the pure differentiation of $m_d$ with respect to time. Therefore, this coupling can perform a compensation properly by a pure differentiation using the filter function. The coupling of the other side which is compensated by division of the current, is also filtered. However, response of the current is also limited because of the inductance of the transmission lines and responses of the feedback control of the current amplitude.

The filter 25f, 25g, 25h having a small time constant $T_f$ in the main loop does not affect the characteristics of the main loop. The integrator 25h, the gain 25g and the subtractor 25f act together as the filter and the input $N_2$ of the integrator 25h is the pure differentiation of Md with respect to time.

The input of the integrator 25h forms the nominator $M_2$ of the divider 25c. Thus, coupling can be compensated properly by the pure differentiation using the filter function. The coupling of the other side which is compensated by division of the current $i_d$ is also filtered and it could be degraded. However, the response of the current is also limited because of the inductance of the transmission lines and the response of the feedback control of the current amplitude.

Figure 17B:
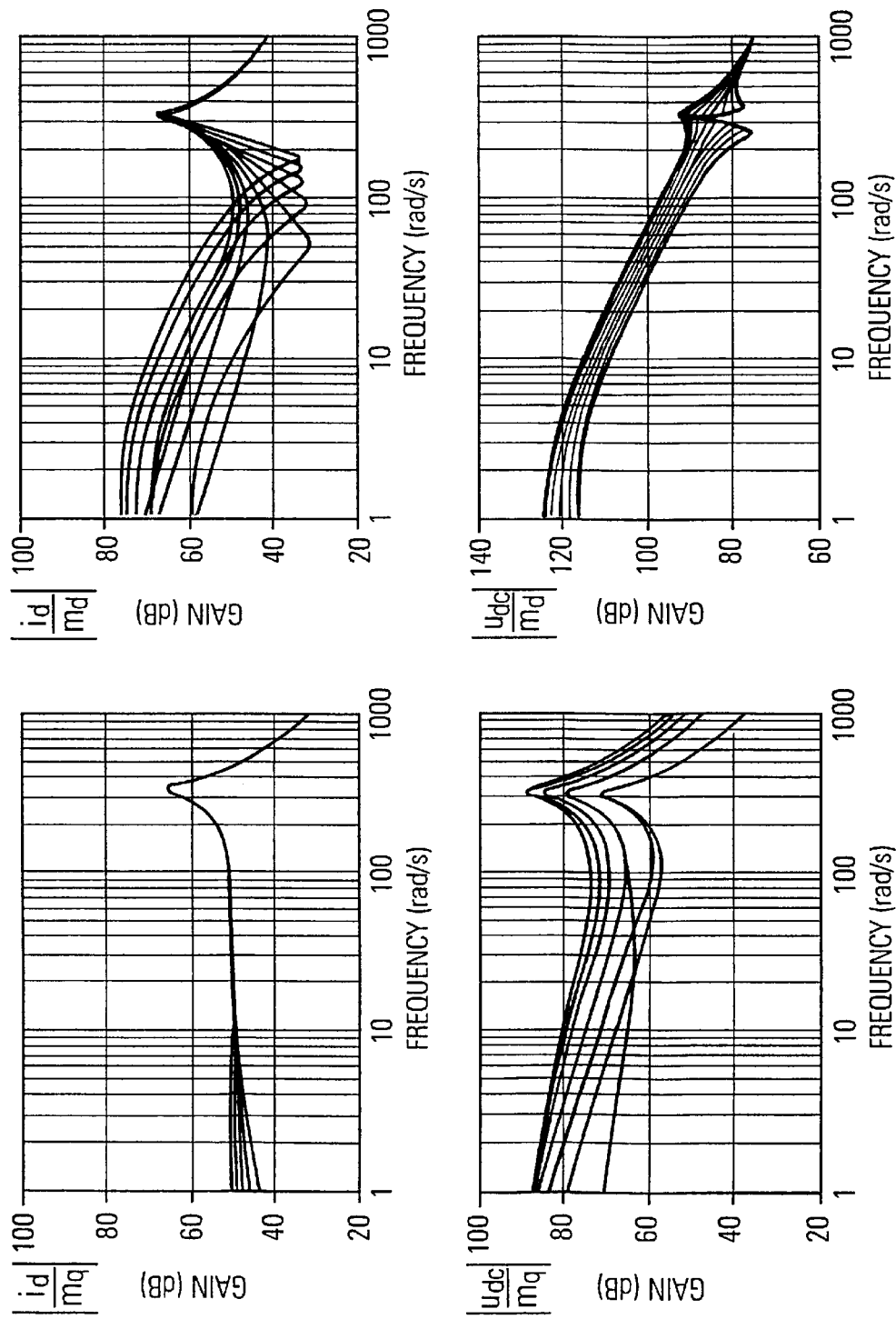
FIG. 17b shows gain characteristics of the conventional controllers in FIGS. 8, 9.

FIG. 17b shows examples of the frequency characteristic of the transfer function of the control system shown in FIG. 14 using the decoupling control means 25 of FIG. 15. The main transfer functions are not affected by an operating point and coupling is reduced over 20 dB. Therefore, the decoupling control of the current amplitude $i_d$ and the capacitor voltage $u_{DC}$ can be achieved. In addition, configuration of the decoupling control in FIG. 15 is independent from the system parameters such as inductance $L_{AC}$ of the transmission lines 2a, 2b and the capacitance $C_{DC}$ of the DC capacitor. This means that the controller of the compensator 3 requires- only local variables which can easily be detected by the current detection or the voltage detection.

FIG. 31a shows by contrast to FIG. 17a of the prior art the step responses using a decoupling control. Whilst at time point 0.1 in FIG. 17a the current amplitude $i_d$ shows a ripple due to coupling, there is no change whatsoever if a voltage step occurs in FIG. 31a at time point 0.1. Likewise, if the current has a step at time point 0.5 in FIG. 31a, there is no variation of the voltage at all. Thus, FIG. 31a shows that the current end voltage can be controlled independently on the basis of the equations (4.16), (4.17).

SIXTH EMBODIMENT (3-PHASE SYSTEM WITH CURRENT PLL)

Whilst FIG. 28 together with FIG. 29 shows an embodiment of the invention comprising a three-phase system using a voltage PLL and an independent and local control, it is also possible to provide the three-phase system controller of FIG. 28 with a current PLL. In this case, the controller does not need a AC voltage detector 26 shown in FIG. 28. The configuration of the sixth embodiment is therefore constructed like FIG. 28 and omitting the voltage detector 23 and the phase rotation means 17 and connecting the output of the current detector 24 also to the phase detector 18 which now acts as a current PLL unit 18. The three-phase polar transformation unit 21 is the same as in FIG. 28 and the phase detector 18 directly outputs the sin θ and cos θ functions. As in the fifth embodiment. However, the system is still a three-phase system. The inputs m'$_q$, u$_{DC}$, i$_d$, ω, m'$_d$ to the decoupling control 25 are the same as in FIG. 28 and thus also the block diagram in FIG. 29 for the decoupling control is applicable. Therefore, it should be understood that the embodiment in FIG. 32a operates—as far as the decoupling control is concerned—in exactly the same manner as the embodiment in FIG. 28.

SEVENTH EMBODIMENT (SINGLE-PHASE SYSTEM WITH CURRENT PLL)

Figure 30B:
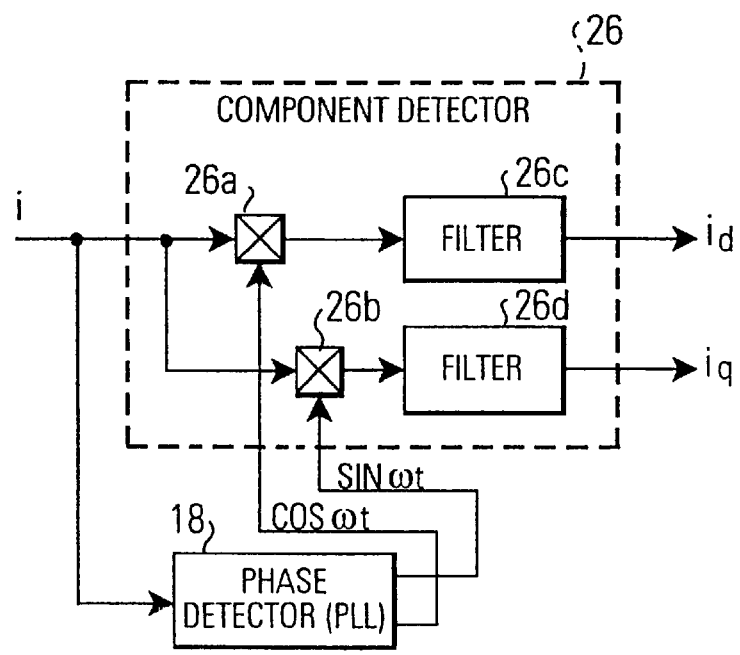
FIG. 30b shows a component detector according to an embodiment of the invention.

FIG. 30a shows a single phase system having the basic construction of FIG. 8 and having a decoupling control means 25 and a component detector 26 according to a seventh embodiment of the invention. In this single phase system the current detectinon is also phase. Since the current detection is single phase, it is not possible to provide the q-axis component of the current $i_q$ to be zero by a reference frame detection. Therefore, in FIG. 30a the equations shown in FIG. 27c, namely equations (4.14), (4.15) are realized. In the single-phase system a single phase to d-q coordinate transformation of the current is needed (see FIG. 30b) in order to provide the $i_d$ and $i_q$ components needed in the decoupling control means 25 as shown in FIG. 30a.

The decoupling control means 25 according to the third embodiment of the invention comprises, in addition to the units 25a–25k an additional multiplier 25l and an additional adder 25m. The multiplier 25l multiplies the q-axis current component $i_q$ with the output of the first divider 25a and feeds a multiplied output ML to the negative input of the adder 25m. The adder 25m subtracts $i_q*DV_1$, (i.e. $i_q*m_q'K_q/u_{DC}\omega$ from $m_d'K_d$). The output of the adder 25b forms the nominator signal $M_3$ of the third divider 25d. With such a configuration the full equations (4.14), (4.15) can be realized.

Whilst in the three-phase system with symmetrical operation instantaneous current components can be measured easily, in a single phase or unbalanced three-phase system, on the contrary some time delay is unavoidable for the measurement. There are several ways to detect these components of single phase current. One simple example is shown in FIG. 30b. The AC line current i detected by the current detector 24 is multiplied by the sinusoidal reference signals cos (ωt) and sin (ωt) which are produced by the phase detector 18. The component detector 26 comprises a first and second multiplier 26a, 26b for multiplying the detected line current i with the signals sin (ωt) and cos (ωt) to produce the orthogonal current components $i_d$, $i_q$. Due to the multiplication there are also components of twice the line frequency ω and filters 26c, 26d are used to only pass the fundamental frequency ω. It should be noticed that the reference signal cos (ωt) is a signal in-phase to the AC current, and therefore icos ωt and isin ωt include the amplitude of the AC current $i_d$ and the transient component $i_q$, respectively.

EIGHT EMBODIMENT (SINGLE-PHASE SYSTEM WITH VOLTAGE PLL)

It should be noted that in the seventh embodiment the current PLL is used for the current phase detection in the single-phase system. However, of course it is possible to use the voltage PLL in the single-phase system as explained above for the three-phase system as explained above. A single-phase system using a voltage PLL instead of the current PLL is shown in FIG. 32b.

Figure 32A:
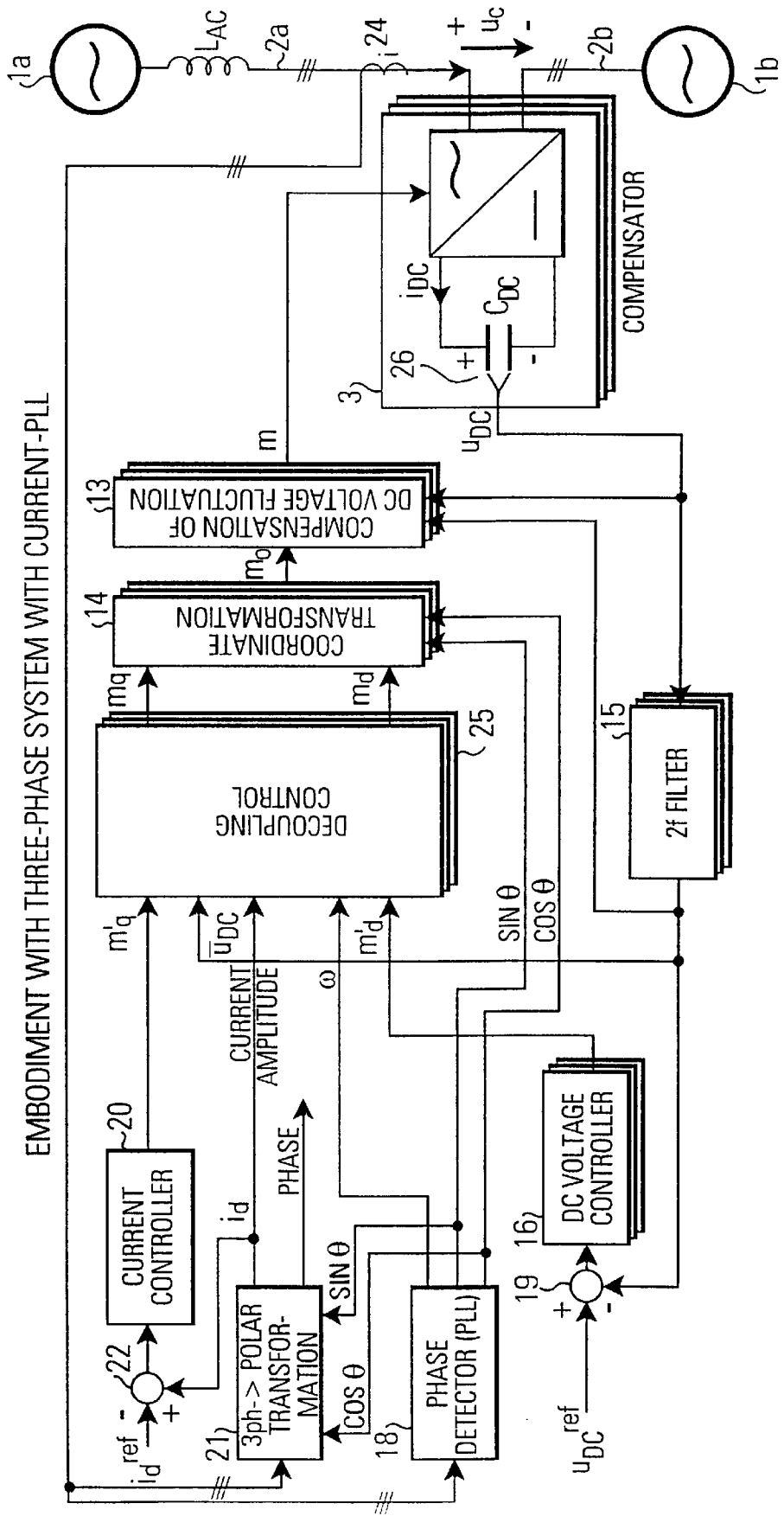
FIG. 32a shows a three-phase system as in FIG. 14 but using a current PLL for the line current phase detection, according to a second embodiment of the invention.
Figure 32B:
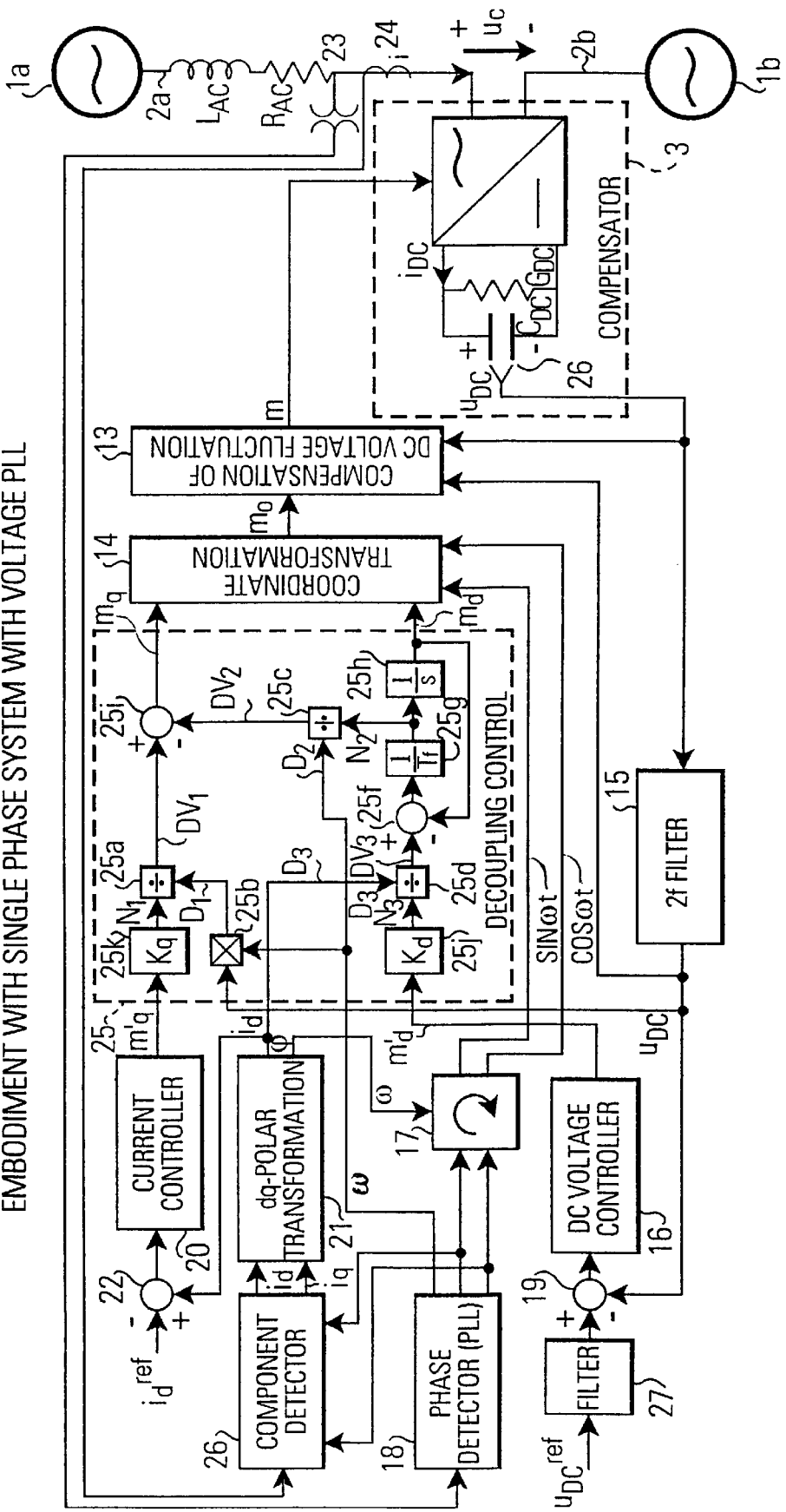
FIG. 32b shows a single-phase system as in FIG. 16a but using a voltage PLL for the line current phase detection, according to a fourth embodiment of the invention.

As shown in FIG. 32b, the component detector 26 outputs the $i_d$ and $i_q$ components. The 3-phase-polar transformation unit 21, the phase detector 18 and the phase rotation unit 17 correspond to those units already described with reference to FIG. 28. It is interesting to note that the decoupling control of the single-phase system with the voltage PLL version can be simplified just like in the case of the three-phase system with voltage PLL in FIG. 28 and FIG. 29. Because there is employed a phase correction from the voltage phase to the current phase this control makes the decoupling just a simple as in FIG. 29. Of course, by contrast to FIG. 28, there is an additional delay in the control loop because of the component detection in the component detector 26. However, the decoupling control 25 operates with the corrected reference frame in which the q-component of the current is made zero.

NINTH EMBODIMENT (ADDITIONAL FILTERS)

As already indicated in FIG. 30a, a further filter 27 can be used for filtering the input reference voltage $u_{DC}^{ref}$. Such a filter 27 can also be used in each of the fifth, sixth and seventh and eighth embodiments as illustrated in FIGS. 18–32 and explained above.

The filter has the effect of reducing the amplitude of the modulation index and thus a decoupling control is achieved with a restricted output voltage capacity. Since the high frequency components of the input reference voltage are reduced by the filter, these components are not transferred to the decoupling control units. As a result, the output of the gain unit 25g will be reduced. This means, if the gain of the DC voltage controller is low and/or the input reference voltage is slow, the decoupling control unit DV2 can be neglected.

TENTH EMBODIMENTS: COMBINATIONS (THREE PHASE/SINGLE PHASE)

As explained above, according to the third aspect of the present invention a decoupling control means is applied to two different systems, namely a single phase or a three phase system. Furthermore, essentially two different phase detection means (with voltage detector PLL and without voltage detector) can be used. Furthermore, a filter can optionally be used. Moreover, in the three-phase system it is easy to keep $i_q=0$ as explained above. However, since it is difficult to ensure $i_q=0$ in a single phase system because of the detection delay in transient, a different internal structure of the decoupling control means is employed (as shown in FIG. 30a for the single phase system).

In the three-phase system according to the fifth embodiment a voltage PLL is used because the usage of the voltage PLL is generally known. The sixth embodiment has no voltage PLL and its advantage is a reduction of components. Furthermore, in a single-phase system, the seventh embodiment uses no voltage PLL to illustrate simply the application of the invention in a single phase system. However, it should be understood that also the single phase system can operate with the voltage PLL and the voltage detector as shown in FIG. 32b according to the eighth embodiment. The additional filter according to the ninth embodiment can be used in any of the other embodiments. Of course the embodiments can be combined. Finally, it should be noted that the 2f filter and the DC voltage fluctuation compensation means are optional units as explained above.

As explained above, the third aspect of the present invention is based on a decoupling control by approximating the non-linear differential equations of the current and voltage loop. Thus, an independent voltage and current control can be achieved. Such a decoupling means can be used for a controller in a single phase system or a three-phase system for controlling compensators, preferably transformerless reactive series compensators. It should be noted that the third aspect is not restricted to the control of transformerless reactive series compensators and that equally well-the control can be applied to compensators which indeed comprise a transformer. Even in such devices there is a need for controlling the compensator output voltage and the current and a representation of the line voltage as detected by the DC capacitor in the transformerless reactive series compensator will be available. Therefore, all controls described above can also be applied compensators having transformers.

ELEVENTH EMBODIMENT (RATE LIMITER/DECOUPLING CONTROL)

The above-described sixth to tenth embodiments of the third aspect of the invention allow to decouple the current control from the voltage control. This is in particular useful in connection with the above-described embodiments of the rate limiter.

Figure 33A:
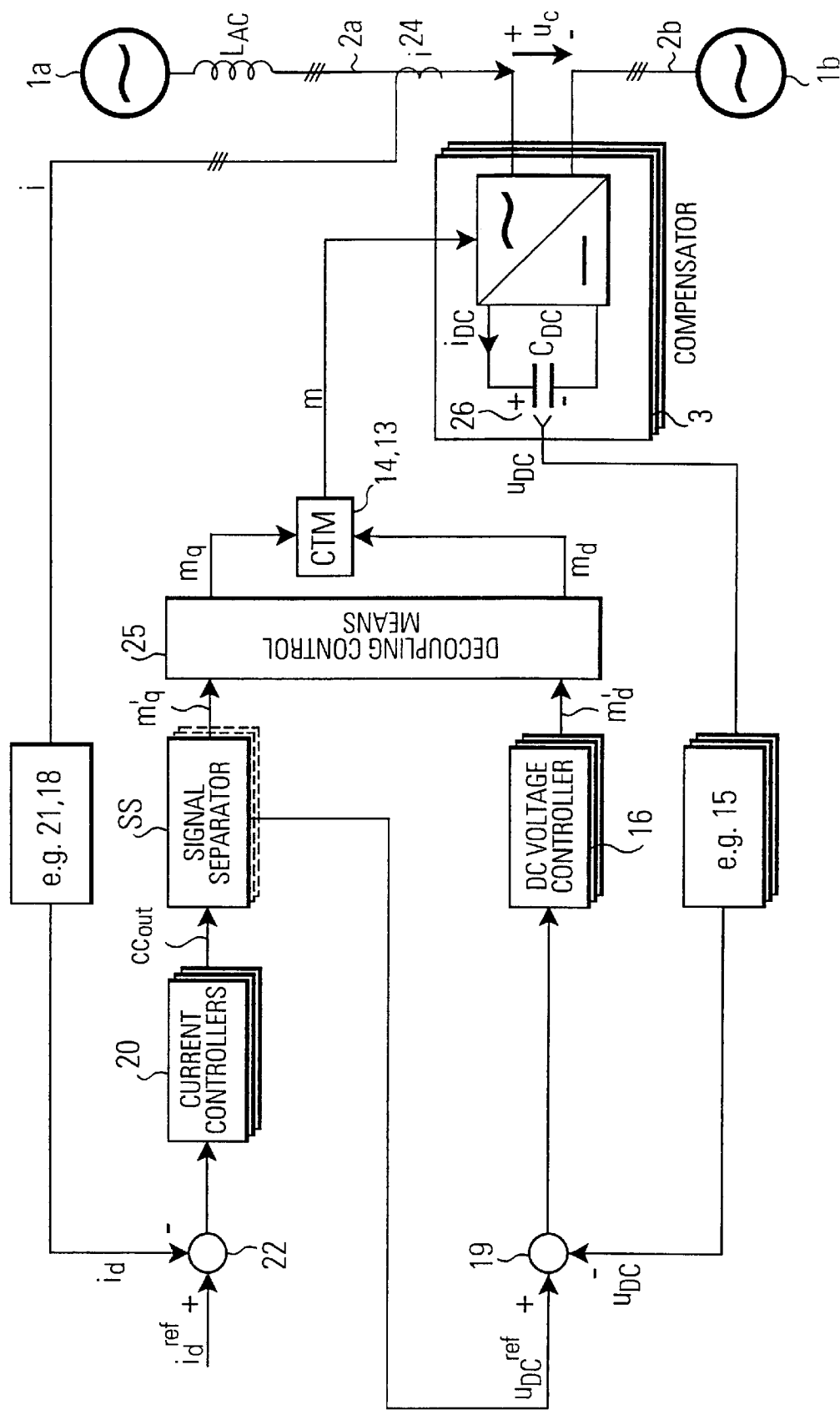
FIG. 33 shows controllers in accordance with the third aspect of the invention which uses a signal separator together with the decoupling control shown in FIGS. 27–32.

As shown in FIG. 33a the signal separator SS in accordance with the first and second aspect of the invention (first to fifth embodiments) can be used in connection with the decoupling control means. That is, the current controller 20 outputs the control voltage $cc_{out}$ and the signal separator outputs the modulation index $m_q'$ whilst the decoupling control means outputs new modified modulation indices $m_q$ and $m_d$ as explained above. FIG. 33a shows a similar block diagram as FIG. 33a, for a single phase system.

Figure 35B:
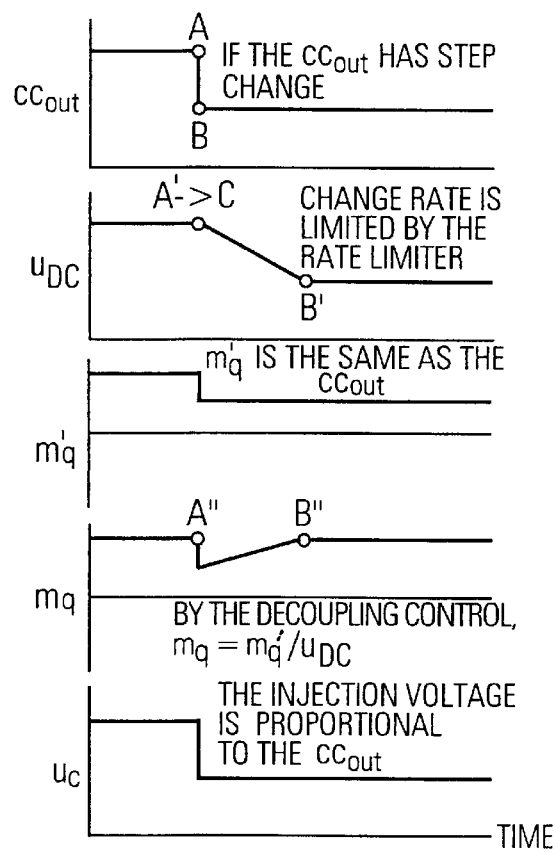
FIG. 35 shows the transient characteristics when using a signal separator in the decoupling controller of FIG. 33.
Figure 34:
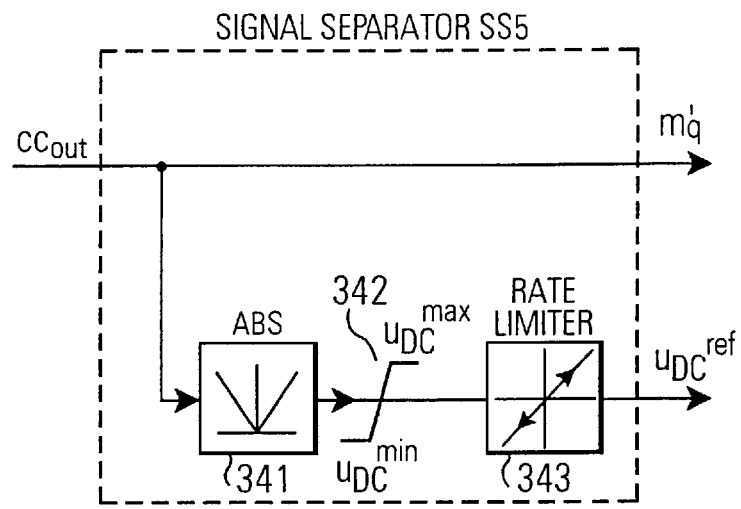
FIG. 34 shows a fifth embodiment of the signal separator.
Figure 35A:
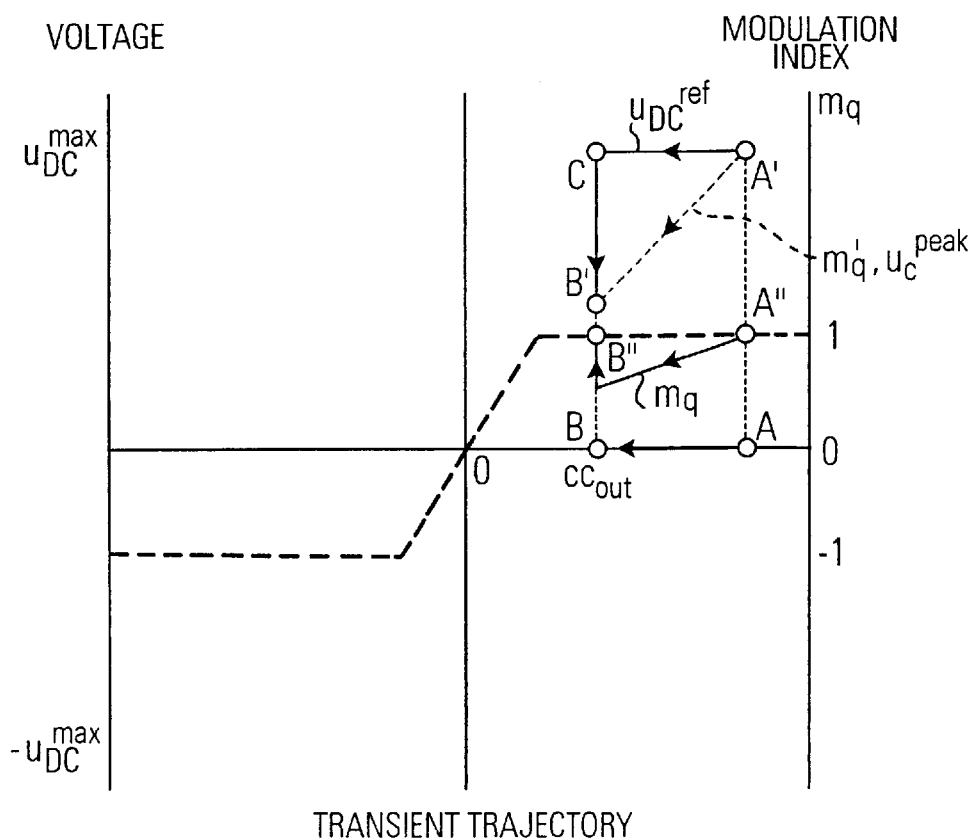

A preferable signal separator to be used in FIGS. 33a, 33b is illustrated in accordance with the eleventh embodiment in FIG. 34. It comprises in the lower signal path an absolute value circuit 341 and a limiter 342 and a rate limiter 343 which perform the similar functions as the units 233, 234 and 235 in FIG. 23. The modulation index $m_q'$ output by the signal separator SS5 is the control voltage $cc_{out}$. In steady state, the modulation indices $m_q$ and $m_q'$ have a relation of $m_q=m_q'/u_{DC}$ due to the decoupling control. Therefore, the static characteristics are the same as in FIG. 22 for the constant DC voltage control. On the other hand, the dynamic characteristics are shown in FIG. 35a and FIG. 35b. Whilst the control trajectory goes from point A' to point B' through C, in FIG. 35a and FIG. 35b the control trajectory of the modulation index $m_q$ directly moves from A" to B" due to the decoupling control. As shown in FIG. 35b, this means that the modulation index is not constant in transient and consequently the output terminal voltage (in the lowest diagram in FIG. 35b) is directly proportional to $cc_{out}$ which equals $m_q'$. Therefore, the current response can be improved by the signal separator in FIG. 34 together with the decoupling control.

As mentioned above, however, the decoupling control can also be advantageously used in combination with the embodiments in FIGS. 20, 21 since intrinsically already due to the coupling effects on a transmission line there will be a coupling of the current and voltage control loops.

TWELFTH EMBODIMENT (ADJUSTABLE DC VOLTAGE/RATE LIMITER)

Above, it has been described that advantageously, in order to reduce the transient effects in the embodiments described with reference to FIGS. 18–21 a rate limiter is used in the lower signal path, as shown in FIG. 23, FIG. 26 or FIG. 34, possibly combined with a decoupling control. However, as will be understood from FIG. 23, FIG. 26 and FIG. 34, the rate limiter is only inserted into the control path for the adjustable DC voltage control.

It will be appreciated that any controller which does not even use the first aspect of the invention, i.e. a controller which uses the conventional DC adjustable control method over the complete compensator terminal output voltage range will benefit from the use of a rate limiter and possibly of the use of a rate limiter together with a decoupling control. That is, any controller in FIG. 18a which outputs a permanently constant modulation index $m_q$ but which outputs a variable DC reference voltage $u_{DC}^{ref_q}$ may only use the lower signal path elements in FIGS. 23, 26 and FIG. 34, possibly in combination with the decoupling control means. This will allow in a controller which only uses the adjustable DC voltage control method to avoid zero voltages when there is a sudden large decrease in the current controller output $cc_{out}$.

Industrial Applicability

As explained above, the first aspect of the invention relates to the usage of two different control methods in a respective lower and higher output voltage range of the compensator. This reduces harmonics, avoids zero voltages and decreases the switching losses (at least in the higher output voltage range). The second aspect of the invention avoids zero voltages during sudden changes of the current controller output and in transient conditions between the two control regions. The third aspect relates to a decoupling of the current and voltage control loops and can be used in connection with the first and/or second aspect. Finally, the embodiments relating to the rate limiter and the decoupling control means can also be used in a controller which only performs a control with a constant modulation index and a variable DC capacitor reference voltage $u_{DC}^{ref}$.

Whilst above the invention has been described with reference to applying a capacitor voltage to an output of the compensator terminals for controlling a transformerless reactive series compensator or a compensator even using a transformer, it should be understood that the principle idea of the invention may also applied to other circumstances where there is a need for supplying a voltage with a predetermined phase to a transmission line.

It should be understood that the teachings and descriptions herein only relate to a preferred mode of operation and that further embodiments are possible on the basis of the teachings disclosed herein. Therefore, a skilled person can perform further modifications and variations on the basis of the above teachings. Furthermore, the invention can comprise embodiments which are based on features which have been independently described in the description and claimed in the claims. Therefore, all such variations and modifications are construed to fall under the scope of the attached claims.

In these attached claims, reference numerals only serve clarification purposes and do not limit the scope of protection.

What is claimed is:

1. A controller (FIG. 18b, SS) for controlling a reactive series compensator (3) serially inserted at compensator terminals (3a, 3b) into a power transmission line (2a, 2b), comprising:
   a) a line current detection means (24) for detecting the line current (i) flowing in the power transmission line (2a, 2b);
   b) a DC voltage detection means (26) for detecting a DC voltage ($u_{DC}$) of a capacitor ($C_{DC}$) connected to a modulator (10, C) of the inverter (7) of the reactive series compensator (3), said modulator (10, C) controlling the application of the capacitor DC voltage ($u_{DC}$) of the capacitor ($C_{DC}$) via said inverter (7) dependent on a modulation signal;
   c) a modulation signal generation means (11, 13, 14) for generating a signal m in the form of $m = m_d \cos(\omega t) - m_q \sin(\omega t)$, where $\omega$ is the line frequency, to be supplied as said modulation signal to the modulator (10, C, 7);
   d) a current control loop (18, 21, 22, 20) for controlling the line current (i) to a reference value ($i_d^{ref}$), a current controller (20) of said current control loop outputting a control signal ($cc_{out}$) corresponding to the desired compensator terminal output voltage ($u_c$) of the compensator (3);
   e) a voltage control loop (15, 19, 16) for controlling the DC voltage ($u_{DC}$) of the DC capacitor ($C_{DC}$) to a predetermined reference voltage ($u_{DC}^{ref}$), a DC voltage controller (16) of said voltage control loop outputting the modulation index $m_d$ for said modulation signal m;
   f1) a control method selection means (SS) receiving as input said control signal ($cc_{out}$) outputted by the current controller (15, 19, 16) and having a first output for outputting said modulation index $m_q$ of said modulation signal m and having a second output outputting said predetermined reference voltage ($u_{DC}^{ref}$) of said voltage control loop (15, 19, 16);
   f21) said control method selection means (SS) outputting a constant modulation index $m_q$ and a reference voltage ($u_{DC}^{ref}$) increasing and decreasing dependent on an increase or decrease of the compensator terminal output voltage ($u_c$) as indicated by said current controller output ($cc_{out}$) when the compensator terminal output voltage ($u_c$) is larger than a predetermined compensator terminal output voltage threshold ($u_{cth}$); and
   f22) said control method selection means (SS) outputting a substantially constant reference voltage ($u_{DC}^{ref}$) and a modulation index $m_q$ increasing and decreasing dependent on an increase or decrease of the compensator terminal output voltage ($u_c$) as indicated by said current controller output ($cc_{out}$) when the compensator terminal output voltage ($u_c$) is smaller than said predetermined compensator terminal output voltage threshold ($u_{cth}$).

2. A controller (FIG. 20; SS1) according to claim 1, wherein
said control method selection means (SS) comprises a first signal separator (SS1) comprising:
a first limiter (200) for limiting the control voltage to a predetermined limit voltage ($u_{DC}^{min}$, $-u_{DC}^{min}$);
a first divider (201) for multiplying the output of the first limiter (200) with a maximum modulation index ($m_q^{max}$) and dividing the result by the first limit voltage ($u_{DC}^{min}$);
a first absolute value circuit (202) for determining the absolute value of the control voltage ($cc_{out}$); and
the second limiter (203) for limiting the output of the absolute value circuit (202) to an upper threshold value ($u_{DC}^{max}$) and a lower voltage value ($u_{DC}^{min}$) when the output of the absolute value circuit (202) exceeds and falls below said upper and lower threshold voltages.

3. A controller (FIG. 21, SS2) according to claim 1, wherein
said control method selection means (SS) is a second signal separator (SS2) comprising:
a third limiter (211) for limiting the control voltage to a maximum modulation index ($m_q^{max}$) and a minimum modulation index ($m_q^{min}$) when the control voltage respectively exceeds or falls below the maximum and minimum modulation indices, respectively;
a second absolute value circuit (213) for determining the absolute value of the control voltage;
a first multiplier (212) for multiplying the output of the absolute value circuit with a predetermined constant ($K_2$); and
a fourth limiter (214) for limiting the output of the second multiplier (212) to an upper threshold voltage ($u_{DC}^{max}$) and a lower threshold voltage ($u_{DC}^{min}$) when the output of the second multiplier (212) respectively exceed said upper and lower threshold voltages ($u_{DC}^{max}$, $u_{DC}^{min}$).

4. A controller (FIG. 23, SS3) according to claim 2, wherein
said first signal separator (SS1, SS3) further comprises a rate limiter (235) for limiting a change rate of the output of the first absolute value circuit (233).

5. A controller (FIG. 26, SS4) according to claim 3, wherein
said second signal separator (SS4) further comprises:
a rate limiter (264) for limiting a change rate of the output of the second multiplier (603); wherein said multiplication constant ($K_2$) is determined by the ratio of the lower threshold voltage ($u_{DC}^{min}$) divided by the maximum modulation index ($m_q^{max}$).

6. A controller (FIG. 25c; 235, 265) according to claim 5, wherein
said rate limiter (233, 243) comprises:
a first adder (266) having a first input for receiving the input signal, a second input and an output, for subtracting from the input the signal applied to the second input;
a first divider (251) for dividing the output of the first adder (266) by a predetermined time constant ($T_S$);
a third limiter (255) for limiting the output of the first divider (251) to an upper limit or lower limit if the output respectively exceeds the upper limit or lower limit;
a third multiplier (252) for multiplying the output of the third limiter (255) by a predetermined time constant ($T_S$);
a second adder (253) having an input receiving the output of the third multiplier (252), a second input and an output constituting the output of the rate limiter; and
a $Z^{-1}$ circuit (254) for shifting the output of the rate limiter to one sampling time;
wherein the output of the $Z^{-1}$ circuit (254) is applied to the second input of the first adder (266) and the second input of the second adder (253).

7. A controller (FIGS. 27–34; SS5) according to claim 1, further comprising
decoupling control means (25) receiving the modulation index ($m_q'$) from the control method selection means (SS) and the modulation index (mq') from the DC voltage controller (16) and outputting new modulation indices $m_q$ and $m_d$ to the modulation signal generation means (13, 14), such that the line current (i) is independent from the output (md') of the DC voltage controller (16) and the DC capacitor voltage ($u_{DC}$) is independent from the output (mq') from the control method selection means (SS), wherein the AC current amplitude ($i_D$) and the DC capacitor voltage ($u_{DC}$) can be controlled independently.

8. A controller (FIG. 34, S55) according to claim 7, wherein
said control method selection means (SS) comprises a third signal separator (SS5), comprising:
a third absolute value circuit (341) for determining the absolute value of the control voltage ($cc_{out}$);
a fourth limiter (342) for limiting the output of the absolute value circuit (341) to a maximum threshold voltage ($u_{DC}^{max}$) and a minimum threshold voltage ($u_{DC}^{min}$) when the output of the third absolute value circuit (341) respectively exceeds or falls below said maximum and minimum threshold voltages; and
a rate limiter (343) for limiting the change rate of the output of the third limiter (342) to a predetermined change rate.

9. A controller for controlling a reactive series compensator (3) serially inserted at compensator terminals (3a, 3b) into a power transmission line (2a, 2b), comprising:
a) a line current detection means (24) for detecting the line current (i) flowing in the power transmission line (2a, 2b);
b) a DC voltage detection means (26) for detecting a DC voltage ($u_{DC}$) of a capacitor ($C_{DC}$) connected to a modulator (10, C) of the inverter (7) of the reactive series compensator (3), said modulator (10, C) controlling the application of the capacitor DC voltage ($u_{DC}$) of the capacitor ($C_{DC}$) via said inverter (7) dependent on a modulation signal;
c) a modulation signal generation means (11, 13, 14) for generating a signal m in the form of $m = m_d \cos(\omega t) - m_q \sin(\omega t)$, where $\omega$ is the line frequency, to be supplied as said modulation signal to the modulator (10, C, 7);
d) a current control loop (18, 21, 22, 20) for controlling the line current (i) to a reference value ($i_d^{ref}$), a current controller (20) of said current control loop outputting a control signal ($cc_{out}$) corresponding to the desired compensator terminal output voltage ($u_c$) of the compensator (3);
e) a voltage control loop (15, 19, 16) for controlling the DC voltage ($u_{DC}$) of the DC capacitor ($C_{DC}$) to a predetermined reference voltage ($u_{DC}^{ref}$), a DC voltage controller (16) of said voltage control loop outputting the modulation index $m_d$ for said modulation signal m;
f1) a control method setting means (SS) for setting a control method in which the compensator terminal output voltage ($u_c$) is controlled via the increase (decrease) of the DC capacitor voltage ($u_{DC}$) (adjustable DC voltage control);
f21) wherein said control method setting means (SS) is adapted for setting the modulation index (m) to a constant modulation index and for outputting a reference voltage ($u_{DC}^{ref}$) to the voltage control loop (15, 19, 16), said reference voltage ($u_{DC}^{ref}$) increasing and decreasing dependent on an increase or decrease of the compensator terminal output voltage ($u_c$) as indicated by said current controller output ($cc_{out}$); and
f22) wherein said control method selection means (SS) further comprises a signal separator (SS3, SS4, SS5) including a rate limiter (235, 265, 343) for limiting the change rate of the current controller output ($cc_{out}$) to a predetermined change rate.

10. A controller (FIGS. 23, 26, 34; SS3, SS4, SS5) according to claim 9, wherein
said control method setting means (FS) further comprises:
an absolute value circuit (233, 262, 341) for determining the absolute value of the current controller output ($cc_{out}$); and
a limiter (234, 264, 342) for limiting the output of the absolute value circuit (233) to a maximum threshold voltage ($u_{DC}^{max}$) or a minimum threshold voltage ($u_{DC}^{min}$) when the output of the absolute value circuit (233, 262, 341) exceeds or falls below said maximum or minimum threshold voltages.

11. A controller (FIG. 26; SS4) according to claim 10, wherein
said control method setting means (SS) further comprises a multiplier (263) for multiplying the output of the absolute value circuit (262) with a predetermined constant, said constant being the ratio of the minimum voltage threshold ($u_{DC}^{min}$) by a maximum modulation index ($m_q^{max}$), wherein the output of the divider (263) is set to the limiter (264).

12. A controller (FIG. 25; 235, 265) according to claim 9, wherein
said rate limiter (235, 265, 343) comprises:
the third limiter (255) by a predetermined time constant ($T_S$)
a second adder (253) having an input receiving the output of the third multiplier (252), a second input and an output constituting the output of the rate limiter; and
a $Z^{-1}$ circuit (254) for shifting the output of the rate limiter to one sampling time;
wherein the output of the $Z^{-1}$ circuit (254) is applied to the second input of the first adder (266) and the second input of the second adder (253).

13. A controller according to claim 9,
further comprising decoupling control means (25) receiving the modulation index ($m_q'$) from the control method selection means (SS) and the modulation index (md') from the DC voltage controller (16) and outputting new modulation indices $m_q$ and $m_d$ to the modulation signal generation means (13, 14), such that the line current (i) is independent from the output (md') of the DC voltage controller (16) and the DC capacitor voltage ($u_{DC}$) is independent from the output (mq') from the control method selection means (SS), wherein the AC current amplitude ($i_D$) and the DC capacitor voltage ($u_{DC}$) can be controlled independently.

14. A controller according to claim 7,
wherein
said current control loop comprises a current subtractor (22) for subtracting an active current amplitude ($i_d$) of the line current (i) from said reference value ($i_d^{ref}$) and for outputting the result to the current controller (20).

15. A controller according to claim 14,
wherein
said voltage control loop comprises an voltage subtractor (19) for subtracting the capacitor DC voltage ($u_{DC}$) of said capacitor ($C_{DC}$) from said predetermined reference voltage ($u_{DC}^{ref}$) and for outputting the result to the DC voltage controller (16).

16. A controller according to claim 15,
wherein
said modulation signal generation means (13, 14) comprises a coordinate transformation means (14) receiving a first reference signal (sin (ωt)) and a second reference signal (cos (ωt)) and the output $m_q'$ of the current controller (20) and the output $m_d'$ of the voltage controller (16) and for outputting the modulation signal (m).

17. A controller according to claim 16,
wherein
the power transmission line (2a, 2b) is a three-phase system, wherein said compensator (3), said DC voltage controller (16), said decoupling means (25), said coordinate transformation means (14) and said modulation signal m are provided for three times for each phase and said current controller (20) is provided once.

18. A controller according to claim 17,
further comprising
   a voltage detector (23) for detecting the line voltage of each phase;
   a voltage PLL detector unit (18) for receiving the line voltage from the voltage detector (23) and for outputting a third reference signal sin ωt and a fourth reference signal cos ωt each synchronized to the phase of the line voltage and the line frequency (ω);
   a phase rotation means (17) for receiving said third and fourth reference signals and a phase signal (Φ) and for generating said first and second reference signal to be supplied to said coordinate transformation means (14); and
   a three-phase polar transformation unit (21) for receiving the line current (i) for each phase and for outputting the active current amplitude ($i_d$) to said current subtractor (22) and said decoupling means (25) and the phase signal (Φ) to said phase rotation means (17).

19. A controller according to claim 17,
further comprising
   a current PLL detector unit (18) for receiving the line current (i) from the line current detection means (24) and for outputting as said first reference signal sin ωt, as said second reference signal cos ωt each synchronized to the phase of the line current (i) and the line frequency (ω) to said decoupling means (25); and
   a component detector (21) for receiving the line current (i) and for outputting the active current amplitude ($i_d$) to said current subtractor (22) and said decoupling means (25) and the reactive current amplitude ($i_q$) to said decoupling means (25).

20. A controller according to claim 16,
wherein
the power transmission lines (2a, 2b) is a single-phase system, wherein said compensator (3), said DC voltage controller (16), said decoupling means (25) and said coordinate transformation means (14) and said current controller (20) is provided once.

* * * * *